US012772167B2

(12) United States Patent
Ma et al.

(10) Patent No.: US 12,772,167 B2
(45) Date of Patent: Oct. 20, 2026

(54) APPARATUSES AND METHODS FOR COMMUNICATING ON AI ENABLED AND NON-AI ENABLED AIR INTERFACES

(71) Applicant: HUAWEI TECHNOLOGIES CO., LTD., Shenzhen (CN)

(72) Inventors: Jianglei Ma, Kanata (CA); Hao Tang, Shenzhen (CN); Wen Tong, Kanata (CA); Peiying Zhu, Kanata (CA); Xiaoyan Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 18/318,371

(22) Filed: May 16, 2023

(65) Prior Publication Data

US 2023/0284139 A1 Sep. 7, 2023

Related U.S. Application Data

(63) Continuation of application No. PCT/CN2020/138865, filed on Dec. 24, 2020.

(51) Int. Cl.
*H04W 52/02* (2009.01)
*H04W 24/02* (2009.01)
(Continued)

(52) U.S. Cl.
CPC ....... *H04W 52/0216* (2013.01); *H04W 24/02* (2013.01); *H04W 28/0205* (2013.01); *H04W 72/232* (2023.01); *H04W 92/10* (2013.01)

(58) Field of Classification Search
CPC ............. H04W 52/0216; H04W 24/02; H04W 28/0205; H04W 72/232; H04W 92/10;
(Continued)

(56) References Cited

U.S. PATENT DOCUMENTS

2019/0158665 A1* 5/2019 Cho ........................ G05B 15/02
2019/0208057 A1 7/2019 Cho et al.
2020/0396760 A1* 12/2020 Yi ......................... H04L 1/1812

FOREIGN PATENT DOCUMENTS

CN 109831549 A 5/2019
WO 2018102742 A1 6/2018

OTHER PUBLICATIONS

3rd Generation Partnership Project; Technical Specification Group Services and System Aspects; Study on traffic characteristics and performance requirements for AI/ML model transfer in 5GS (Release 18). 3GPP TR 22.874 v0.2.0 (Nov. 2020). total 65 pages.

(Continued)

*Primary Examiner* — Ayanah S George
(74) *Attorney, Agent, or Firm* — Slater Matsil, LLP

(57) ABSTRACT

An air interface is the wireless communications link between two or more communicating devices. An air interface generally includes a number of components that specify how a transmission is to be sent and/or received, e.g. components defining a waveform, a frame structure, a multiple access scheme, a coding scheme, etc. Artificial intelligence (AI) may be implemented in relation to one or more components of the air interface. Therefore, a network may need to accommodate operation for both air interfaces that are not AI enabled and air interfaces that are AI enabled. In some embodiments, methods are provided for switching between different AI modes and a non-AI mode. In some embodiments, a measurement signaling mechanism and related feedback channel configuration is provided so that the same measurement signaling mechanism and related feedback channel may be used regardless of whether a device implements an AI-enabled air interface.

20 Claims, 24 Drawing Sheets

(51) Int. Cl.
*H04W 28/02* (2009.01)
*H04W 72/232* (2023.01)
*H04W 92/10* (2009.01)

(58) Field of Classification Search
CPC ............. H04W 52/0219; H04B 7/0626; H04B 7/0645; H04L 1/0026; Y02D 30/70
See application file for complete search history.

(56) References Cited

OTHER PUBLICATIONS

Samsung(moderator), "Summary of Offline Discussion on Standards Impact on Existing Nodes, Functions, and Interfaces," R3-206875. 3GPP TSG-RAN WG3#110-e, online, Jun. 2-12, 2020. total 13 pages.
ZTE, "Discussion on the Usage of AI Model," SA WG2 Meeting #135, S2-1908945, Split, Croatia, Oct. 14-18, 2019, 3 pages.

* cited by examiner

APPARATUSES AND METHODS FOR COMMUNICATING ON AI ENABLED AND NON-AI ENABLED AIR INTERFACES

CROSS-REFERENCE TO RELATED APPLICATION

The present application is a continuation of PCT International Application PCT/CN2020/138865, titled "Apparatuses and Methods for Communicating on AI Enabled and non-AI Enabled Air Interfaces", filed on Dec. 24, 2020, and incorporated herein by reference.

FIELD

The present application relates to network communication, and more specifically to air interfaces.

BACKGROUND

An air interface is the wireless communications link between two or more communicating devices, such as between a user equipment (UE) and a base station. Typically, both communicating devices need to know the air interface in order to successfully transmit and receive a transmission.

An air interface generally includes a number of components and associated parameters that collectively specify how a transmission is to be sent and/or received over the wireless channel between the two or more communicating devices. For example, an air interface may include one or more components defining a waveform, a frame structure, a multiple access scheme, a protocol, a coding scheme, and/or a modulation scheme for conveying information (e.g. data) over the wireless channel. The air interface components may be implemented using one or more software and/or hardware components on the communicating devices, e.g. a processor may perform channel encoding/decoding to implement the coding scheme of the air interface. Implementing the air interface may involve operations in different network layers, e.g. the physical layer and the medium access control (MAC) layer.

Some previous wireless communication networks implement an air interface that has some flexibility, e.g. to try to accommodate different service or application requirements, such as service or network slice-based optimization. However, flexibility is still relatively limited. Many components of previous air interfaces are either fixed or limited to a relatively small number of options within a predefined paradigm. This limited flexibility might not optimally accommodate all of the respective different transmission conditions, capabilities, and/or requirements of each of the communicating devices.

SUMMARY

To try to provide more flexibility in an air interface, artificial intelligence (AI) may be implemented in relation to one or more components of the air interface. AI, as used herein, includes (but is not limited to) machine learning (ML). The implementation of AI may provide more flexible options for the configuration of the air interface, possibly on a UE-specific basis. For example, an air interface may possibly be implemented that is tailored or personalized on a UE-specific basis, e.g. using AI to provide UE-specific air interface optimization. Using AI to optimize an air interface may achieve a new air interface configuration that satisfies the requirement of one or more UEs on an individual basis. AI may also or instead be used to improve performance and/or efficiency of the wireless communication system, e.g. to enhance overall system capacity and meet service requirements with reduced power consumption.

As discussed herein, the AI may be implemented in relation to air interface components in the physical layer and/or in the medium access control (MAC) layer, possibly with joint optimization between one or more physical layer and MAC layer components.

An air interface implemented between two or more devices, and which uses AI as part of the implementation, e.g. to optimize one or more components of the air interface, will be referred to herein as an "AI enabled air interface".

It might not always be the case that an air interface is AI enabled. For example, AI might not be implemented in the air interface for some UEs due to the capabilities or service or traffic requirements of those UEs. For example, a particular UE might not be AI capable. That is, a particular UE might only be capable of communicating on a conventional air interface that does not implement AI. As another example, the network or UE might not always want to implement AI, e.g. to reduce power consumption or because performance is acceptable without AI. As another example, the AI operation may need to be disabled because it is not working as intended and/or because training or retraining of the AI algorithm is needed.

Therefore, a network may need to accommodate operation for both air interfaces that are not AI enabled, and air interfaces that are AI enabled, possibly on a device-by-device specific basis, depending upon the scenario.

In some embodiments herein, a method for controlling and enabling the switching between different modes of operation are disclosed, including methods for switching between different AI modes and a fallback or default non-AI mode. The following technical benefit may be achieved in some embodiments: accommodating UEs that are both AI capable and non-AI capable, and accommodating switching between different AI capable modes.

Different types of AI may be associated with the transmission of different control information over the wireless channel and/or may be associated with different channel measurements and feedback, which may be different from the control information, measurement, and/or feedback associated with a non-AI enabled air interface. Control and related signaling may become overly complicated and/or of high overhead if not properly considered.

In some embodiments, a unified control signaling procedure is disclosed that provides for signaling (e.g. in the physical layer, such as in DCI) that may accommodate different sizes and content of control information, so that the same signaling procedure may be used whether a UE is AI-capable and implements an AI-enabled air interface, or whether a UE is non AI-capable and implements an air interface that is not AI-enabled. In some embodiments, a unified measurement signaling mechanism and related feedback channel configuration is provided that accommodates the different types of measurements and feedback that may be associated with AI training, AI operation post-training, and non-AI operation, so that the same measurement signaling mechanism and related feedback channel may be used whether a UE is AI-capable and implements an AI-enabled air interface, or whether a UE is non AI-capable and implements an air interface that is not AI-enabled.

In some embodiments, there is provided a method performed by an apparatus (e.g. a UE). The method may include communicating over an air interface in a first mode of operation. The method may further include receiving signaling indicating a second mode of operation, where the second mode of operation is different from the first mode of operation. The method may further include, in response to receiving the signaling, communicating over the air interface in the second mode of operation. In some embodiments, the first mode of operation is implemented using AI and the second mode of operation is not implemented using AI. In some embodiments, the first mode of operation is not implemented using AI and the second mode of operation is implemented using AI.

By way of the method above, the ability to control the switching of modes of operation for the air interface may be provided on an apparatus-specific (e.g. UE-specific) basis. More flexibility may thereby be provided. For example, depending upon the scenario encountered for an apparatus, that apparatus may be configured to implement AI and/or fall back to a non-AI conventional mode in relation to communicating over an air interface.

In some embodiments, the apparatus may request a mode switch, whereas in other embodiments a device (e.g. network device) may initiate the mode switch. In some embodiments, the mode switch may be in response to different circumstances, e.g. entering a training mode, a change in KPI, etc.

In some embodiments, there is provided a corresponding method performed by a device that may include receiving, from the apparatus, an indication that the apparatus has a capability to implement AI in relation to an air interface. The method may further include communicating with the apparatus over the air interface in a first mode of operation. The method may further include transmitting, to the apparatus, signaling indicating a second mode of operation, where the second mode of operation is different from the first mode of operation. The method may further include subsequent to transmitting the signaling, communicating with the apparatus over the air interface in the second mode of operation. In some embodiments, the first mode of operation is implemented using AI and the second mode of operation is not implemented using AI. In some embodiments, the first mode of operation is not implemented using AI and the second mode of operation is implemented using AI.

In some embodiments, a method performed by an apparatus (e.g. a UE) may include receiving a measurement request. The measurement request may include an indication of content to transmit to a device (e.g. a network device, such as a base station). The content may be obtained from a measurement performed by the apparatus. The method may further include receiving a signal (e.g. a reference signal), performing the measurement using the signal, and obtaining the content based on the measurement. The method may further include transmitting the content to the device. In some embodiments, the content is different depending upon whether or not the apparatus communicates over an air interface that is implemented using AI. In embodiments, the measurement request is of a same format regardless of whether the air interface is implemented with or without AI.

By using the method above, the measurement may be performed on demand, with different apparatuses (e.g. different UEs) possibly being instructed to perform measurements at different times or different intervals, and possibly transmitting back different content. Different modes of operation, including a non-AI mode and different AI implementations may be accommodated. For example, measurement and feedback for a UE implementing an air interface that is not AI-enabled may be different from measurement and feedback for another UE implementing an AI-enabled air interface, and both may be accommodated via a single unified mechanism.

In some embodiments, there is provided a corresponding method performed by a device that may include transmitting a measurement request to the apparatus. The measurement request may include an indication of content to be transmitted by the apparatus. The content may be obtained from a measurement performed by the apparatus. The method may further include subsequently receiving the content from the apparatus.

Corresponding apparatuses and devices are disclosed for performing the methods.

BRIEF DESCRIPTION OF THE DRAWINGS

Embodiments will be described, by way of example only, with reference to the accompanying figures wherein.

DETAILED DESCRIPTION

For illustrative purposes, specific example embodiments will now be explained in greater detail below in conjunction with the figures.

Example Communication Systems and Devices

Figure 1:
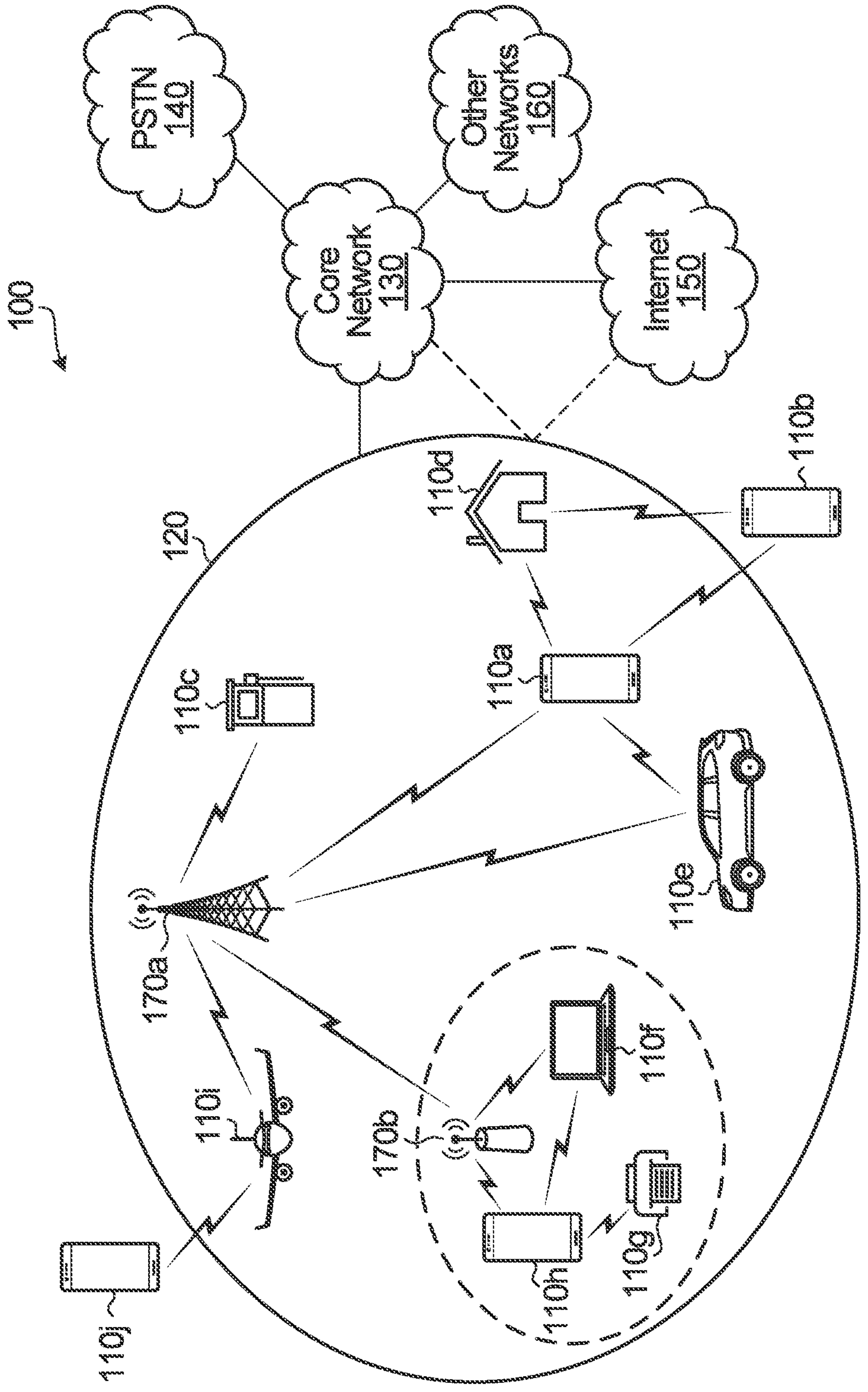
FIG. 1 is a simplified schematic illustration of a communication system, according to one example.

Referring to FIG. 1, as an illustrative example without limitation, a simplified schematic illustration of a communication system 100 is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another or connected to one or more network nodes (170*a*, 170*b*, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
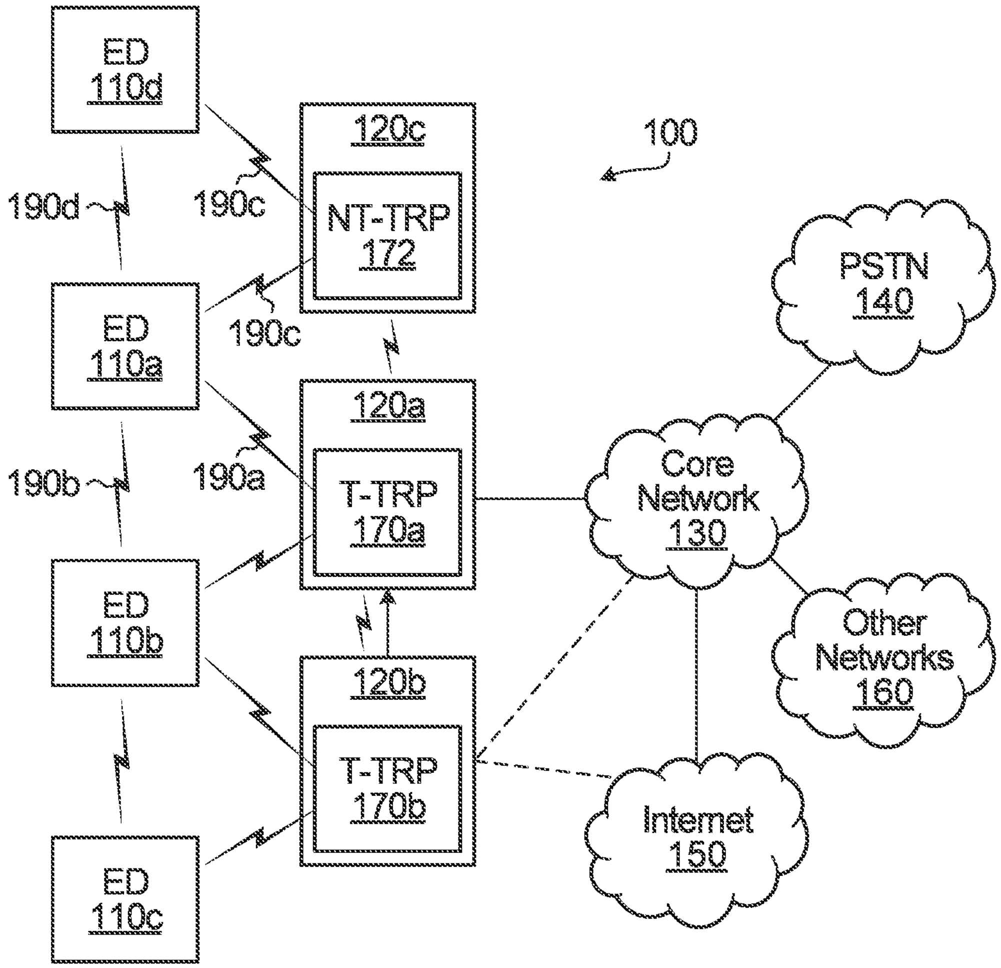
FIG. 2 illustrates another example of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110*a*-110*d* (generically referred to as ED 110), radio access networks (RANs) 120*a*-120*b*, non-terrestrial communication network 120*c*, a core network 130, a public switched telephone network (PSTN) 140, the internet 150, and other networks 160. The RANs 120*a*-120*b* include respective base stations (BSs) 170*a*-170*b*, which may be generically referred to as terrestrial transmit and receive points (T-TRPs) 170*a*-170*b*. The non-terrestrial communication network 120*c* includes an access node 120*c*, which may be generically referred to as a non-terrestrial transmit and receive point (NT-TRP) 172.

Any ED 110 may be alternatively or additionally configured to interface, access, or communicate with any other T-TRP 170*a*-170*b* and NT-TRP 172, the internet 150, the core network 130, the PSTN 140, the other networks 160, or any combination of the preceding. In some examples, ED 110*a* may communicate an uplink and/or downlink transmission over an interface 190*a* with T-TRP 170*a*. In some examples, the EDs 110*a*, 110*b* and 110*d* may also communicate directly with one another via one or more sidelink air interfaces 190*b*. In some examples, ED 110*d* may communicate an uplink and/or downlink transmission over an interface 190*c* with NT-TRP 172.

The air interfaces 190*a* and 190*b* may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190*a* and 190*b*. The air interfaces 190*a* and 190*b* may utilize other higher dimension signal spaces, which may involve a combination of orthogonal and/or non-orthogonal dimensions.

The air interface 190*c* can enable communication between the ED 110*d* and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120*a* and 120*b* are in communication with the core network 130 to provide the EDs 110*a* 110*b*, and 110*c* with various services such as voice, data, and other services. The RANs 120*a* and 120*b* and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120*a* and 120*b* or EDs 110*a* 110*b*, and 110*c* or both, and (ii) other networks (such as the PSTN 140, the internet 150, and the other networks 160). In addition, some or all of the EDs 110*a* 110*b*, and 110*c* may include functionality for communicating with different wireless networks over different wireless links using different wireless technologies and/or protocols. Instead of wireless communication (or in addition thereto), the EDs 110*a* 110*b*, and 110*c* may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110*a* 110*b*, and 110*c* may be multimode devices capable of operation according to multiple radio access technologies, and incorporate multiple transceivers necessary to support such.

Figure 3:
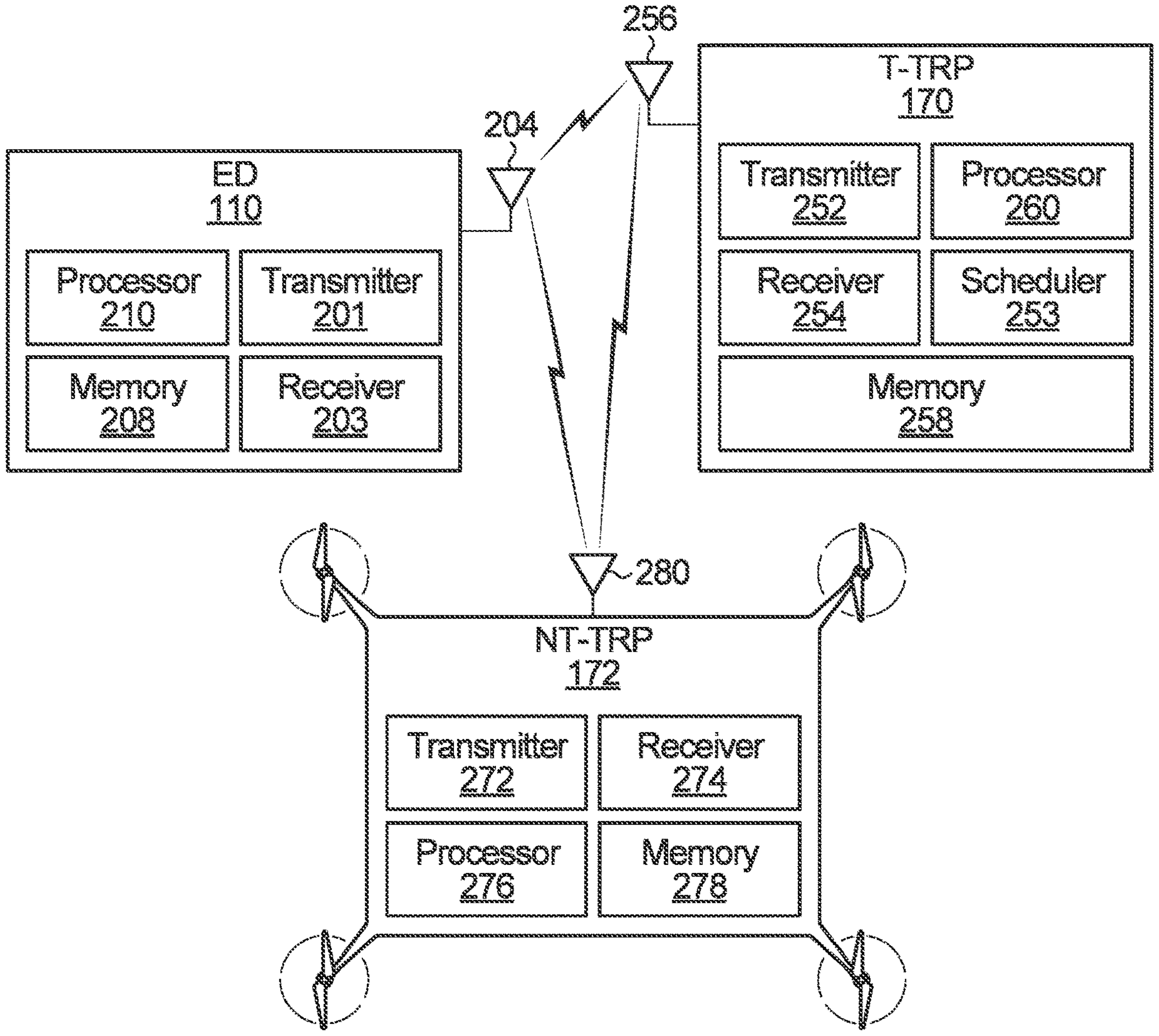
FIG. 3 illustrates an example of an electronic device (ED), a terrestrial transmit and receive point (T-TRP), and a non-terrestrial transmit and receive point (NT-TRP)

FIG. 3 illustrates another example of an ED 110, a base station 170 (e.g. 170*a*, and/or 170*b*), which will be referred to as a T-TRP 170, and a NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (JOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. Each ED 110 connected to T-TRP 170 and/or NT-TRP 172 can be dynamically or semi-statically turned-on (i.e., established, activated, or enabled), turned-off (i.e., released, deactivated, or disabled)

and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transmitter (or transceiver) is configured to modulate data or other content for transmission by the at least one antenna 204 or network interface controller (NIC). The receiver (or transceiver) is configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations which may be described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170. The scheduler 253 may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone, it is only as an example. The NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

Note that "TRP", as used herein, may refer to a T-TRP or a NT-TRP.

The T-TRP 170, the NT-TRP 172, and/or the ED 110 may include other components, but these have been omitted for the sake of clarity.

Figure 4:
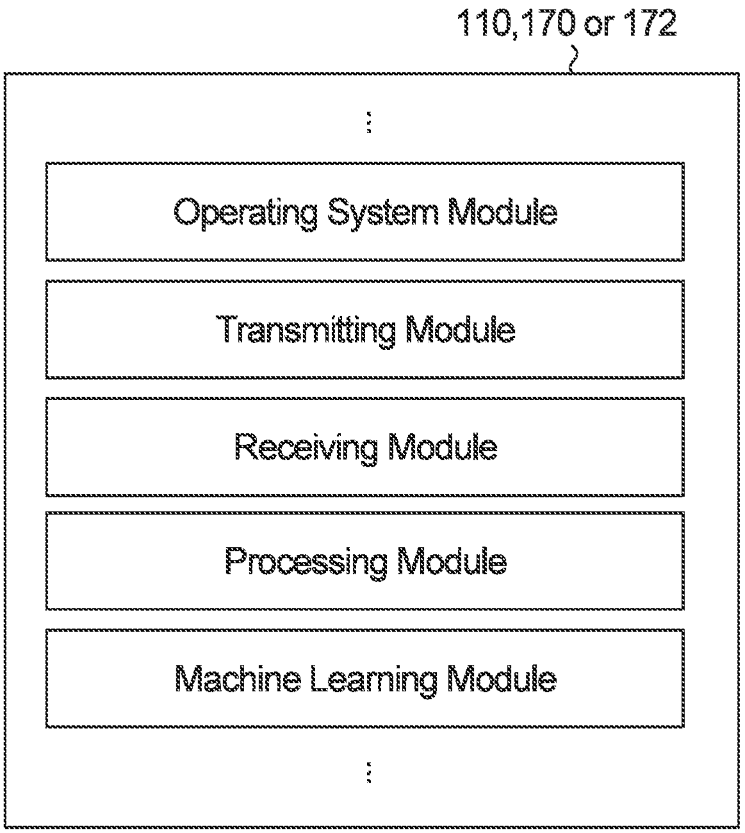
FIG. 4 illustrates example units or modules in a device.

One or more steps of the embodiment methods provided herein may be performed by corresponding units or modules, e.g. according to FIG. 4. FIG. 4 illustrates example units or modules in a device, such as in ED 110, in T-TRP 170, or in NT-TRP 172. For example, operations may be controlled by an operating system module. As another example, a signal may be transmitted by a transmitting unit or a transmitting module. A signal may be received by a receiving unit or a receiving module. A signal may be processed by a processing unit or a processing module. Some operations/steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Control signaling is discussed herein in some embodiments. Control signaling may sometimes instead be referred to as signaling, or control information, or configuration information, or a configuration. In some cases, control signaling may be dynamically indicated, e.g. in the physical layer in a control channel. An example of control signaling that is dynamically indicated is information sent in physical layer control signaling, e.g. downlink control information (DCI). Control signaling may sometimes instead be semi-statically indicated, e.g. in RRC signaling or in a MAC control element (CE). A dynamic indication may be an indication in lower layer, e.g. physical layer/layer 1 signaling (e.g. in DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

Figure 5:
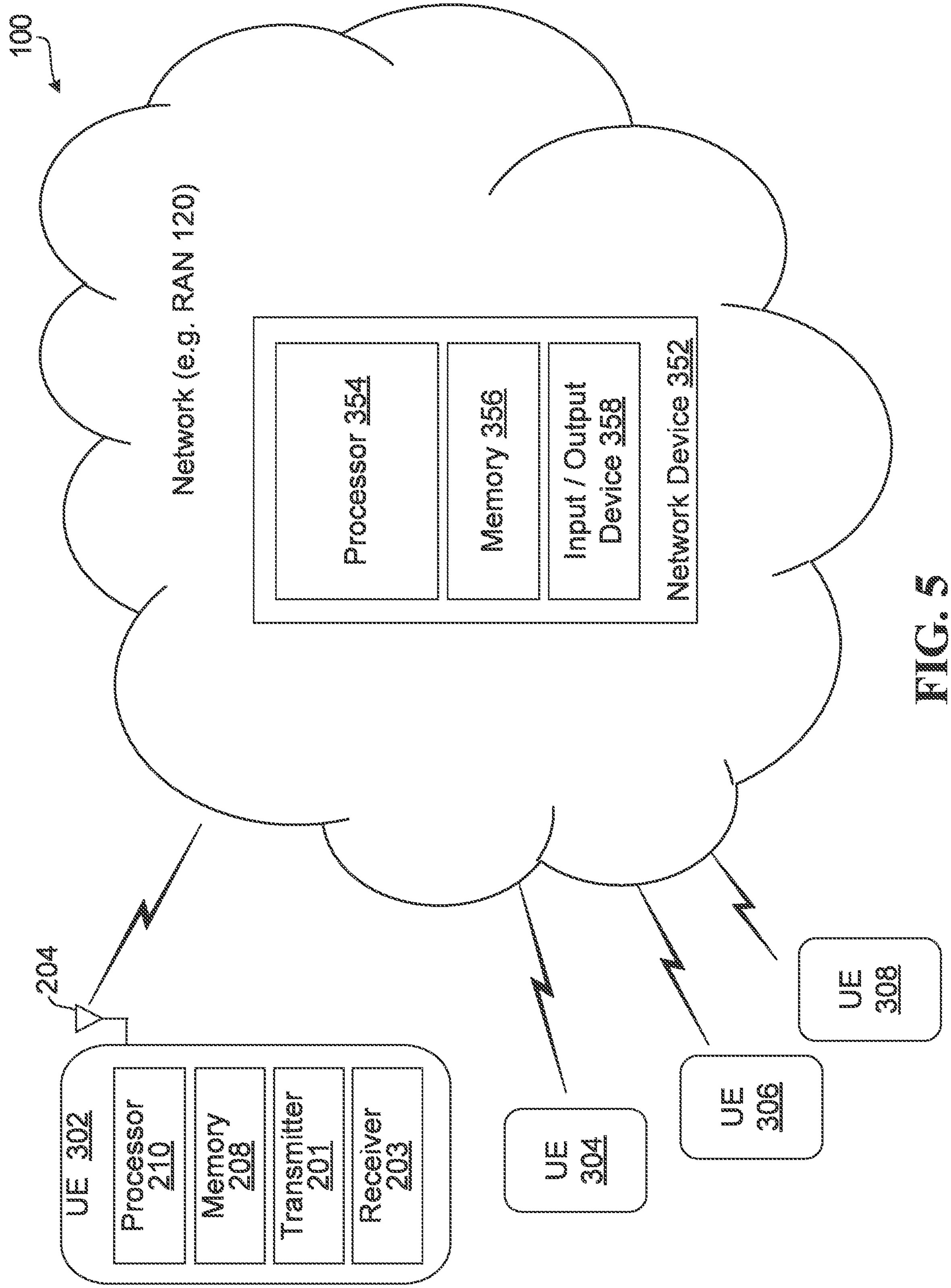
FIG. 5 illustrates three user equipments (UEs) communicating with a network device, according to one embodiment.

FIG. 5 illustrates four EDs communicating with a network device 352 in the communication system 100, according to one embodiment. The four EDs are each illustrated as a respective different UE, and will hereafter be referred to as UEs 302, 304, 306, and 308. However, the EDs do not necessarily need to be UEs.

The network device 352 is part of a network (e.g. a radio access network 120). The network device 352 might be (or be part of) a T-TRP or a server. In some embodiments, the components of the network device 352 might be distributed. The UEs 302, 304, 306, and 308 might directly communicate with the network device 352, e.g. if the network device 352 is part of a T-TRP serving the UEs 302, 304, 306, and 308. Alternatively, the UEs 302, 304, 306, and 308 might communicate with the network device 352 via one or more intermediary components, e.g. via a T-TRP and/or via a NT-TRP, etc. For example, the network device 352 may send and/or receive information (e.g. control signaling, data, training sequences, etc.) to/from one or more of the UEs 302, 304, 306, and 308 via a backhaul link and wireless channel interposed between the network device 352 and the UEs 302, 304, 306, and 308.

Each UE 302, 304, 306, and 308 includes a respective processor 210, memory 208, transmitter 201, receiver 203, and one or more antennas 204 (or alternatively panels), as described above. Only the processor 210, memory 208, transmitter 201, receiver 203, and antenna 204 for UE 302 is illustrated for simplicity, but the other UEs 304, 306, and 308 also include the same respective components.

For each UE 302, 304, 306, and 308, the communications link between that UE and a respective TRP in the network is an air interface. The air interface generally includes a number of components and associated parameters that collectively specify how a transmission is to be sent and/or received over the wireless medium.

The processor 210 of a UE in FIG. 5 implements one or more air interface components on the UE-side. The air interface components configure and/or implement transmission and/or reception over the air interface. Examples of air interface components are described herein. An air interface component might be in the physical layer, e.g. a channel encoder (or decoder) implementing the coding component of the air interface for the UE, and/or a modulator (or demodulator) implementing the modulation component of the air interface for the UE, and/or a waveform generator implementing the waveform component of the air interface for the UE, etc. An air interface component might be in or part of a higher layer, such as the MAC layer, e.g. a module that implements channel prediction/tracking, and/or a module that implements a retransmission protocol (e.g. that implements the HARQ protocol component of the air interface for the UE), and/or that implements a link adaptation protocol, etc. The processor 210 also directly performs (or controls the UE to perform) the UE-side operations described herein, e.g. implementing an AI-enabled air interface, switching between different modes of operation (e.g. an AI mode and a convention non-AI mode) based on received signaling, receiving a measurement request, performing the measurement, transmitting feedback based on the measurement, etc.

The network device 352 includes a processor 354, a memory 356, and an input/output device 358. The processor 354 implements or instructs other network devices (e.g. T-TRPs) to implement one or more of the air interface components on the network side. An air interface component may be implemented differently on the network-side for one UE compared to another UE. The processor 354 directly performs (or controls the network components to perform) the network-side operations described herein, e.g. implementing an AI-enabled air interface, switching between different modes of operation (e.g. an AI mode and a conventional non-AI mode), transmitting signaling indicating the mode of operation, transmitting a measurement request, etc.

The processor 354 may be implemented by the same or different one or more processors that are configured to execute instructions stored in a memory (e.g. in memory 356). Alternatively, some or all of the processor 354 may be implemented using dedicated circuitry, such as a programmed FPGA, a GPU, or an ASIC. The memory 356 may be implemented by volatile and/or non-volatile storage. Any suitable type of memory may be used, such as RAM, ROM, hard disk, optical disc, on-processor cache, and the like.

The input/output device 358 permits interaction with other devices by receiving (inputting) and transmitting (outputting) information. In some embodiments, the input/output device 358 may be implemented by a transmitter and/or a receiver (or a transceiver), and/or one or more interfaces (such as a wired interface, e.g. to an internal network or to the internet, etc). In some implementations, the input/output device 358 may be implemented by a network interface, which may possibly be implemented as a network interface card (NIC), and/or a computer port (e.g. a physical outlet to which a plug or cable connects), and/or a network socket, etc., depending upon the implementation.

AI technologies (which encompass ML technologies) may be applied in communication, including AI-based communication in the physical layer and/or AI-based communication in the MAC layer. For the physical layer, the AI communication may aim to optimize component design and/or improve the algorithm performance. For example, AI may be applied in relation to the implementation of: channel coding, channel modelling, channel estimation, channel decoding, modulation, demodulation, MIMO, waveform, multiple access, physical layer element parameter optimization and update, beam forming, tracking, sensing, and/or positioning, etc. For the MAC layer, the AI communication may aim to utilize the AI capability for learning, prediction, and/or making a decision to solve a complicated optimization problem with possible better strategy and/or optimal solution, e.g. to optimize the functionality in the MAC layer. For example, AI may be applied to implement: intelligent TRP management, intelligent beam management, intelligent channel resource allocation, intelligent power control, intelligent spectrum utilization, intelligent MCS, intelligent HARQ strategy, and/or intelligent transmission/reception mode adaption, etc.

In some embodiments, an AI architecture may involve multiple nodes, where the multiple nodes may possibly be organized in one of two modes, i.e., centralized and distributed, both of which may be deployed in an access network, a core network, or an edge computing system or third party network. A centralized training and computing architecture is restricted by possibly large communication overhead and strict user data privacy. A distributed training and computing architecture may comprise several frameworks, e.g., distributed machine learning and federated learning. In some embodiments, an AI architecture may comprise an intelligent controller which can perform as a single agent or a multi-agent, based on joint optimization or individual optimization. New protocols and signaling mechanisms are desired so that the corresponding interface link can be personalized with customized parameters to meet particular requirements while minimizing signaling overhead and maximizing the whole system spectrum efficiency by personalized AI technologies.

In some embodiments herein, new protocols and signaling mechanisms are provided for operating within and switching between different modes of operation, including between AI and non-AI modes, and for measurement and feedback to accommodate the different possible measurements and information that may need to be fed back, depending upon the implementation.

Figure 6:
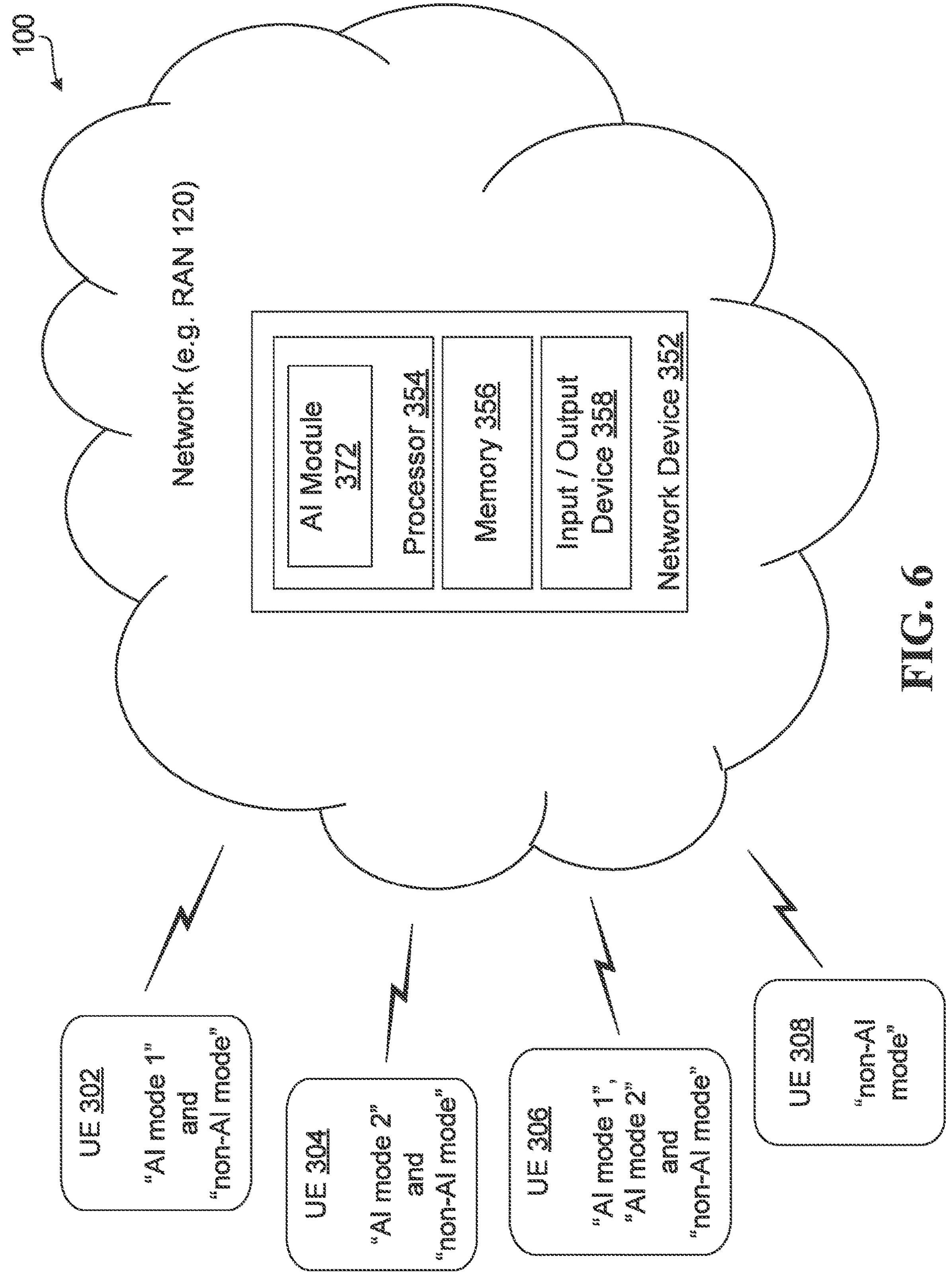
FIG. 6 illustrates a variation of FIG. 5 in which the UEs have different capabilities, according to one embodiment.

FIG. 6 illustrates an example in which network device 352 may be deployed in an access network, a core network, or an edge computing system or third party network, depending upon the implementation. In one example, the network device 352 may implement an intelligent controller which can perform as a single agent or multi-agent, based on joint optimization or individual optimization. In one example, the network device 352 can be (or be implemented within) T-TRP 170 or NT-TRP 172. In some embodiments, the network device 352 may perform communication with AI operation, based on joint optimization or individual optimization. In another example, the network device 352 can be a T-TRP controller and/or a NT-TRP controller which can manage T-TRP 170 or NT-TRP 172 to perform communication with AI operation, based on joint optimization or individual optimization.

An air interface that uses AI as part of the implementation, e.g. to optimize one or more components of the air interface, will be referred to herein as an "AI enabled air interface". In some embodiments, there may be two types of AI operation in an AI enabled air interface: both the network and the UE implement learning; or learning is only applied by the network.

In the embodiment in FIG. 6, the network device 352 has the ability to implement an AI-enabled air interface for communication with one or more UEs. However, a given UE might or might not have the ability to communicate on an AI-enabled interface. If certain UEs do have the ability to communicate on an AI-enabled interface, then the AI capabilities of those UEs might be different. For example, different UEs may be capable of implementing or supporting different types of AI, e.g. an autoencoder, reinforcement learning, neural network (NN), deep neural network (DNN), etc. As another example, different UEs may implement AI in relation to different air interface components. For example, one UE may be able to support an AI implementation for one or more physical layer components, e.g. for modulation and coding, and another UE might not, but might instead be able to support AI implementation for a protocol at the MAC layer, e.g. for a retransmission protocol. Some UEs may implement AI themselves in relation to one or more air interface components, e.g. perform learning, whereas other UEs may not perform learning themselves but may be able to operate in conjunction with an AI implementation on the network side, e.g. by receiving configurations from the network for one or more air interface components that are optimized by the network device 352 using AI, and/or by assisting other devices (such as a network device or other AI capable UE) to train an AI algorithm (such as a neural network or other ML algorithm) by providing requested measurement results or observations.

FIG. 6 illustrates an example in which network device 352 includes an AI module 372. The AI module 372 is implemented by processor 354, and is therefore shown as being within processor 354 of FIG. 6. The AI module 372 executes one or more AI algorithms (e.g. ML algorithms) to try to optimize one or more air interface components in relation to one or more UEs, possibly on a UE-specific and/or service-specific basis. In some embodiments, the AI module 372 may implement the intelligent air interface controller described later. The AI module 372 may implement AI in relation to physical layer air interface components and/or MAC layer air interface components, depending upon the implementation. Different air interface components may be jointly optimized, or each separately optimized in an autonomous fashion, depending upon the implementation. The specific AI algorithm(s) executed are implementation and/or scenario specific and may include, for example, a neural network, such as a DNN, an autoencoder, reinforcement learning, etc.

For the sake of example, the four UEs 302, 304, 306, and 308 in FIG. 6 are each illustrated as having different capabilities in relation to implementing one or more air interface components.

UE 302 has the capability to support an AI-enabled air interface configuration, and can operate in a mode referred to herein as "AI mode 1". AI mode 1 refers to a mode in which the UE itself does not implement learning or training. However, the UE is able to operate in conjunction with the network device 352 in order to accommodate and support the implementation of one or more air interface components optimized using AI by the network device 352. For example, when operating in AI mode 1, the UE 302 may transmit, to the network device 352, information used for training at the network device 352, and/or information (e.g. measurement results and/or information on error rates) used by the network device 352 to monitor and/or adjust the AI optimization. The specific information transmitted by the UE 302 is implementation specific and may depend upon the AI algorithm and/or specific AI-enabled air interface components being optimized. In some embodiments, when operating in AI mode 1, the UE 302 is able to implement an air interface component at the UE-side in a manner different from how the air interface component would be implemented if the UE 302 was not capable of supporting an AI-enabled air interface. For example, the UE 302 might itself not be able to implement ML learning in relation to its modulation and coding, but the UE 302 may be able to provide information to the network device 352 and receive and utilize parameters relating to modulation and coding that are different from and possibly better optimized compared to the limited set of fixed options for modulation and coding defined in a conventional non-AI enabled air interface. As another example, the UE 302 might not be able to directly learn and train to realize an optimized retransmission protocol, but the UE 302 may be able to provide the needed information to the network device 352 so that the network device 352 can perform the required learning and optimization, and post-training the UE 302 can then follow the optimized protocol determined by the network device 352. As another example, the UE 302 might not be able to directly learn and train to optimize modulation, but a modulation scheme may be determined by the network device 352 using AI, and the UE 302 may be able to accommodate an irregular modulation constellation determined and indicated by the network device 352. The modulation indication method may be different from a non-AI based scheme.

In some embodiments, when operating in AI mode 1, although UE 302 itself does not implement learning or training, the UE 302 may receive an AI model determined by the network device 352 and execute the model.

Besides AI mode 1, the UE 302 can also operate in a non-AI mode in which the air interface is not AI enabled. In non-AI mode, the air interface between the UE 302 and the network may operate in a conventional non-AI manner. During operation, the UE 302 may switch between AI mode 1 and non-AI mode.

UE 304 also has the capability to support an AI-enabled air interface configuration. However, when implementing an AI-enabled air interface, UE 304 operates in a different AI mode, referred to herein as “AI mode 2”. AI mode 2 refers to a mode in which the UE implements AI learning or training, e.g. the UE itself may directly implement a ML algorithm to optimize one or more air interface components. When operating in AI mode 2, the UE 304 and network device 352 may exchange information for the purposes of training. The information exchanged between the UE 304 and the network device 352 is implementation specific, and it might not have a meaning understandable to a human (e.g. it might be intermediary data produced during execution of a ML algorithm). It might also or instead be that the information exchanged is not predefined by a standard, e.g. bits may be exchanged, but the bits might not be associated with a predefined meaning. In some embodiments, the network device 352 may provide or indicate, to the UE 304, one or more parameters to be used in the AI model implemented at the UE 304 when the UE 304 is operating in AI mode 2. As one example, the network device 352 may send or indicate updated neural network weights to be implemented in a neural network executed on the UE-side, in order to try to optimize one or more aspects of the air interface between the UE 304 and a T-TRP or NT-TRP.

Although the example in FIG. 6 assumes AI capability on the network side, it might be the case that the network does not itself perform training/learning, and a UE operating in AI mode 2 may perform learning/training itself, possibly with dedicated training signals sent from the network. In other embodiments, end-to-end (E2E) learning may be implemented by the UE operating in AI mode 2 and the network device 352, e.g. to jointly optimize on the transmission and receive side.

Besides AI mode 2, the UE 304 can also operate in a non-AI mode in which the air interface is not AI enabled. In non-AI mode, the air interface between the UE 304 and the network may operate in a conventional non-AI manner. During operation, the UE 304 may switch between AI mode 2 and non-AI mode.

UE 306 is more advanced than UE 302 or UE 304 in that UE 306 can operate in AI mode 1 or AI mode 2. UE 306 is also able to operate in a non-AI mode. During operation, the UE 306 may switch between the three modes of operation.

UE 308 does not have the capability to support an AI-enabled air interface configuration. The network device 352 might still use AI to try to better optimize or configure one or more air interface components for communicating with the UE 308, e.g. to select between different possible predefined options for an air interface component. However, the air interface implementation, including the exchanges between the UE 308 and the network, are limited to a conventional non-AI air interface and its associated predefined options. The associated predefined options may be defined by a standard, for example. In other embodiments, the network device 352 does not implement AI at all in relation to UE 308, but instead implements the air interface in a fully conventional non-AI manner. The mechanisms for measurement, feedback, link adaptation, MAC layer protocols, etc. operate in a conventional non-AI manner. For example, measurement and feedback happens regularly for the purposes of link adaptation, MIMO precoding, etc.

In addition to the above, different UEs having the ability to support an AI-enabled air interface may have different levels of AI capabilities. For example, UE 302 might only support AI implementation in relation to a few air interface components in the physical layer, e.g. modulation and coding, whereas UE 304 may support AI implementation in relation to several air interface components in both the physical layer in MAC layer. Also, sometimes a UE may support joint AI optimization of multiple air interface components, whereas other UEs might only support AI optimization of individual air interface components on a component-by-component basis.

Although two possible modes of operation (AI mode 1 and AI mode 2) are explained above for a UE supporting an AI-enabled interface, there may be other and/or more modes of operation when supporting an AI-enabled interface. For example, instead of a single AI mode 2, there may be two modes: a more advanced higher-power mode in which the UE can support joint optimization of several air interface components via AI, and a simpler lower-power mode in which the UE can support an AI-enabled air interface, but only for one or two air interface components, and without joint optimization between those components. As another example, instead of AI mode 1 and AI mode 2 described above, there may be three AI modes: (1) UE assists the network with training (e.g. by providing information) and the UE can operate with AI optimized parameters; (2) UE cannot perform AI training itself but can run a trained AI module that was trained by a network device; (3) the UE itself can perform AI training. Other or additional modes of operation related to an AI-enabled air interface may include modes such as (but not limited to): a training mode, a fallback non-AI mode, a mode in which only a reduced subset of air interface components are implemented using AI, etc.

In the example in FIG. 6, the network device 352 configures the air interface for different UEs having different capabilities. Some UEs, e.g. UE 308, do not support an AI-enabled air interface. Other UEs do support an AI-enabled interface, e.g. UEs 302, 304, and 306. Even if a UE does support an AI-enabled air interface, the UE might not always implement an AI-enabled air interface, e.g. operation of the air interface in a conventional non-AI manner might be necessary if there is an error or during training or retraining. Therefore, in general the network device 352 accommodates air interface configuration for both non-AI enabled air interface components and AI-enabled air interface components. Embodiments are presented herein relating to switching between different AI modes, including a fallback or default non-AI mode. Embodiments are also presented herein relating to unified control signaling and measurement signaling and related feedback channel configuration, e.g. in order to have a unified signaling procedure for the variety of different signaling and measurement that may be performed depending upon the AI or non-AI capabilities of UEs. However, first an overview is provided that discusses some of the intelligence that may be implemented in an AI-enabled interface and an example network architecture in which some or all of the intelligence may be implemented.

Examples of Intelligence in Relation to the Air Interface

Advances continue to be made in antenna and bandwidth capabilities, thereby allowing for possibly more and/or better communication over a wireless link. Additionally, advances continue in the field of computer architecture and computational power, e.g. with the introduction of general-purpose graphics processing units (GP-GPUs). Future generations of communication devices may have more computational and/or communication ability than previous generations, which may allow for the adoption of AI for implementing air interface components. Future generations of networks may also have access to more accurate and/or new information (compared to previous networks) that may form the basis of inputs to AI models, e.g.: the physical speed/velocity at which a device is moving, a link budget of the device, the channel conditions of the device, one or more device capabilities and/or a service type that is to be supported, sensing information, and/or positioning information, etc. To obtain sensing information, a TRP may transmit a signal to target object (e.g. a suspected UE), and based on the reflection of the signal the network device 352 computes the angle (for beamforming for the device), the distance of the device from the TRP, and/or doppler shifting information. Positioning information is sometimes referred to as localization, and it may be obtained in a variety of ways, e.g. a positioning report from a UE (such as a report of the UE's GPS coordinates), use of positioning reference signals (PRS), using the sensing described above, tracking and/or predicting the position of the device, etc.

One or more air interface components may be implemented using an AI model. The term AI model may refer to a computer algorithm that is configured to accept defined input data and output defined inference data, in which parameters (e.g., weights) of the algorithm can be updated and optimized through training (e.g., using a training dataset, or using real-life collected data). An AI model may be implemented using one or more neural networks (e.g., including deep neural networks (DNN), recurrent neural networks (RNN), convolutional neural networks (CNN), and combinations thereof) and using various neural network architectures (e.g., autoencoders, generative adversarial networks, etc.). Various techniques may be used to train the AI model, in order to update and optimize its parameters. For example, backpropagation is a common technique for training a DNN, in which a loss function is calculated between the inference data generated by the DNN and some target output (e.g., ground-truth data). A gradient of the loss function is calculated with respect to the parameters of the DNN, and the calculated gradient is used (e.g., using a gradient descent algorithm) to update the parameters with the goal of minimizing the loss function.

In some embodiments, an AI model encompasses neural networks, which are used in machine learning. A neural network is composed of a plurality of computational units (which may also be referred to as neurons), which are arranged in one or more layers. The process of receiving an input at an input layer and generating an output at an output layer may be referred to as forward propagation. In forward propagation, each layer receives an input (which may have any suitable data format, such as vector, matrix, or multidimensional array) and performs computations to generate an output (which may have different dimensions than the input). The computations performed by a layer typically involves applying (e.g., multiplying) the input by a set of weights (also referred to as coefficients). With the exception of the first layer of the neural network (i.e., the input layer), the input to each layer is the output of a previous layer. A neural network may include one or more layers between the first layer (i.e., input layer) and the last layer (i.e., output layer), which may be referred to as inner layers or hidden layers. Various neural networks may be designed with various architectures (e.g., various numbers of layers, with various functions being performed by each layer).

A neural network is trained to optimize the parameters (e.g., weights) of the neural network. This optimization is performed in an automated manner, and may be referred to as machine learning. Training of a neural network involves forward propagating an input data sample to generate an output value (also referred to as a predicted output value or inferred output value), and comparing the generated output value with a known or desired target value (e.g., a ground-truth value). A loss function is defined to quantitatively represent the difference between the generated output value and the target value, and the goal of training the neural network is to minimize the loss function. Backpropagation is an algorithm for training a neural network. Backpropagation is used to adjust (also referred to as update) a value of a parameter (e.g., a weight) in the neural network, so that the computed loss function becomes smaller. Backpropagation involves computing a gradient of the loss function with respect to the parameters to be optimized, and a gradient algorithm (e.g., gradient descent) is used to update the parameters to reduce the loss function. Backpropagation is performed iteratively, so that the loss function is converged or minimized over a number of iterations. After a training condition is satisfied (e.g., the loss function has converged, or a predefined number of training iterations have been performed), the neural network is considered to be trained. The trained neural network may be deployed (or executed) to generate inferred output data from input data. In some embodiments, training of a neural network may be ongoing even after a neural network has been deployed, such that the parameters of the neural network may be repeatedly updated with up-to-date training data.

Using AI, e.g. by implementing an AI model as described above, one or more air interface components may be AI-enabled In some embodiments, the AI may be used to try to optimize those aspects of the air interface for communication between the network and devices, possibly on a device-specific basis. Some examples of possible AI-enabled air interface components are described below.

Figure 7:
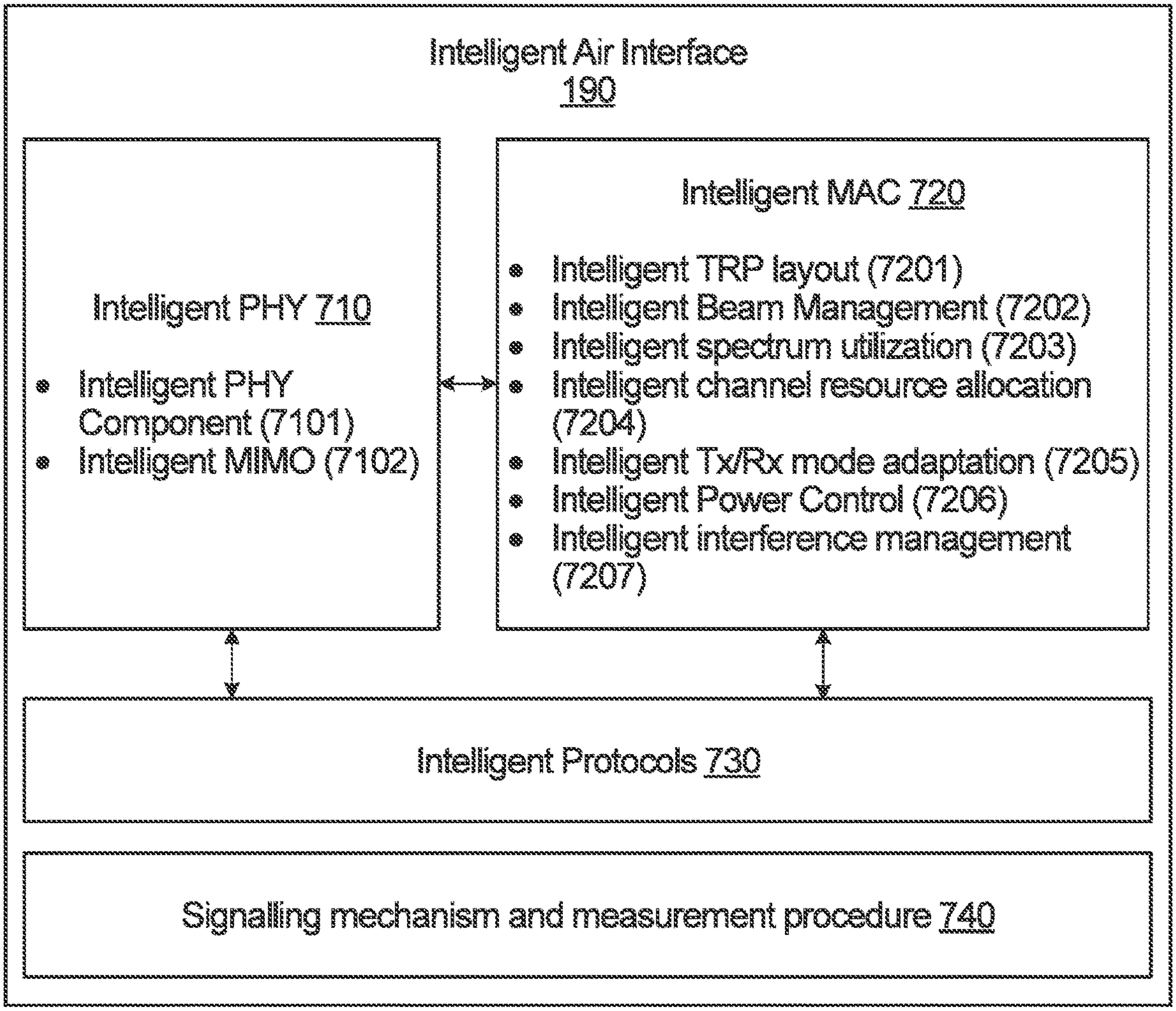
FIG. 7 illustrates an intelligent air interface, according to one embodiment.

FIG. 7 illustrates an intelligent air interface 190, according to one embodiment. The intelligent air interface 190 is a flexible framework which can support AI implementation in relation to one, some, or all of the items illustrated, which are each shown within one of three groups: intelligent PHY 710, intelligent MAC 720, and intelligent protocols 730. Although illustrated as a separate box, the intelligent protocols 730 might involve MAC and/or PHY layer components or operations. Signaling mechanisms and measurement procedures 740, e.g. as described herein, may support communication related to implementation of the intelligent PHY 710 and/or intelligent MAC 720 and/or intelligent protocols 730. In some examples, intelligent PHY 710 provides AI assisted physical layer component optimization/designs to achieve intelligent PHY components (7101) and/or intelligent MIMO (7102). In some examples, intelligent MAC 720 provides optimization/designs for intelligent TRP layout (7201), intelligent beam management (7202), intelligent spectrum utilization (7203), intelligent channel resource allocation (7204), intelligent transmission/reception mode adaptation (7205), intelligent power control (7206), and/or intelligent interference management (7202). In some examples, intelligent protocols 730 provide optimization/designs relating to protocols implemented in the air interface, e.g. retransmission, link adaptation, etc. In some examples, the signaling and measurement procedure 740 may support the communication of information in an air interface implementing intelligent protocols 730, intelligent MAC 720 and/or intelligent PHY 710.

In some embodiments, intelligent PHY 710 includes a number of components and associated parameters that collectively specify how a transmission is to be sent and/or received over a wireless communications link between two or more communicating devices.

In some embodiments, an AI-enabled air interface implementing intelligent PHY 710 may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (e.g. a "Uu" link), and/or the wireless communications link may support a link between device and device, such as between two UEs (e.g. a "sidelink"), and/or the wireless communications link may support a link between a non-terrestrial (NT)-communication network and a UE. When an intelligent air interface (e.g. intelligent PHY 710) is implemented, the wireless communications link may support a new link between an AI component in a radio access network and user equipment.

The followings are some examples of air interface components, e.g. which may be implemented using AI:

- A waveform component, which may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF). The waveform component may be implemented using AI.
- A frame structure component, which may specify a configuration of a frame or group of frames. The frame structure component may indicate one or more of a time, frequency, pilot signature, code, or other parameter of the frame or group of frames. The frame structure component may be implemented using AI.
- A multiple access scheme component, which may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access. The multiple access scheme component may be implemented using AI.
- A hybrid automatic repeat request (HARQ) protocol component, which may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism. The HARQ protocol component may be implemented using AI.
- A coding and modulation component, which may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation. The coding and modulation component may be implemented using AI.

Note that an air interface component in the physical layer (e.g. implemented in intelligent PHY 710) may sometimes alternatively be referred to as a "model" rather than a component.

In some implementations, intelligent PHY components 7101 may obtain parameter optimization, optimization for coding and decoding, modulation and demodulation, MIMO and receiver, waveform and multiple access. In some implementations, intelligent MIMO 7102 may obtain intelligent channel acquisition, intelligent channel tracking and predication, intelligent channel construction, and intelligent beamforming. In some implementations, intelligent protocols 730 may obtain intelligent link adaptation and intelligent re-transmission protocol. In some implementations, intelligent MAC 720 may implement an intelligent controller.

More details relating to an AI enabled/assisted air interface are described in the following:

Intelligent Physical Layer Air Interface Components:

One or more air interface components in the physical layer may be AI-enabled, e.g. implemented as intelligent PHY component 7101. The physical layer components implemented using AI, and the details of the AI algorithms or models, are implementation specific. However, a few examples are described below for completeness.

As one example, for communication between the network and a particular UE, AI may be used to provide optimization of channel coding without a predefined coding scheme.

Self-learning/training and optimization may be used to determine an optimal coding scheme and related parameters. For example, in some embodiments, a forward error correction (FEC) scheme is not predefined and AI is used to determine a UE-specific customized FEC scheme. In some such embodiments, autoencoder based ML may be used as part of an iterative training process during a training phase in order to train an encoder component at a transmitting device and a decoder component at a receiving device. For example, during such a training process, an encoder at a TRP and a decoder at a UE may be iteratively trained by exchanging a training sequence/updated training sequence. In general, the more trained cases/scenarios, the better performance. After training is done, the trained encoder component at the transmitting device and the trained decoder component at the receiving device can work together based on changing channel conditions to provide encoded data that may outperform results generated from a non-AI based FEC scheme. In some embodiments, the AI algorithms for self-learning/training and optimization may be downloaded by the UE from a network/server/other device. For individual optimization of channel coding with predefined coding schemes, such as low density parity check (LDPC) code, Reed-Muller (RM) code, polar code or other coding schemes, the parameters for the coding scheme may be optimized. In one example, an optimized coding rate is obtained by AI running on the network side, the UE side, or both the network and UE sides. The coding rate information might not need to be exchanged between the UE and the network. However, in some cases, the coding rate may be signaled to receiver (which may be the UE or the network, depending upon the implementation). In some embodiments, the parameters for channel coding may be signaled to a UE (possibly periodically or event triggered), e.g., semi-statically (such as via RRC signaling) or dynamically (such as via DCI) or possibly via other new physical layer signaling. In some implementations, training may be done all on the network side or assisted by UE side training or mutual training between the network side and the UE side.

As another example, for communication between the network and a particular UE, AI may be used to provide optimization of modulation without a predefined constellation. Modulation may be implemented using AI, with the optimization targets and/or algorithms of which being understood by both the transmitter and the receiver. For example, the AI algorithm may be configured to maximize Euclidian or non-Euclidian distance between constellation points.

As another example, for communication between the network and a particular UE, AI may be used to provide optimization of waveform generation, possibly without a predefined waveform type, without a predefined pulse shape, and/or without predefined waveform parameters. Self-learning/training and optimization may be used to determine optimal waveform type, pulse shape and/or waveform parameters. In some implementations, the AI algorithm for self-learning/training and optimization may be downloaded by the UE from a network/server/other device. In some implementations, there may be a finite set of predefined waveform types, and selection of a predefined waveform type from the finite set and determination of the pulse shape and other waveform parameters may be done through self-optimization. In some implementations, an AI based or assisted waveform generation may enable per UE based optimization of one or more waveform parameters, such as pulse shape, pulse width, subcarrier spacing (SCS), cyclic prefix, pulse separation, sampling rate, PAPR, etc.

Individual or joint optimization of physical layer air interface components may be implemented using AI, depending upon the AI capabilities of the UE. For example, the coding, modulation, and waveform may each be implemented using AI and independently optimized, or they may be jointly (or partly jointly) optimized. Any parameter updating as part of the AI implementation may be transmitted through unicast, broadcast, or groupcast signaling, depending upon the implementation. Transmission of updated parameters may occur semi-statically (e.g. in RRC signaling or a MAC CE) or dynamically (e.g. in DCI). The AI might be enabled or disabled, depending upon the scenario or UE capability. Signaling related to enabling or disabling AI may be sent semi-statically or dynamically.

In some implementations of AI-enabled physical components, the following procedure may be followed. The transmitting device sends training signals to the receiving device. The training may relate to and/or indicate single parameter/components or combinations of multiple parameters/components. The training might be periodic or trigger-based. In some implementations, for the downlink channel, UE feedback might provide the best or preferred parameter(s), and the UE feedback might be sent using default air interface parameters and/or resources. "Default" air-interface parameters and/or resources may refer to either: (i) the parameters and/or resources of a conventional non-AI enabled air interface known by both the transmitting and receiving device, or (ii) the current air interface parameters and/or resources used for communication between the transmitting and receiving device. In some implementations, the TRP sends, to the UE, an indication of a chosen parameter, or the TRP applies the parameter without indication, in which case blind detection may need to be performed by the UE. In some implementations, for the uplink, the TRP may send information (e.g. an indication of one or more parameters) to the UE, for use by the UE. Examples of such information may include measurement result, KPIs, and/or other information for AI training/updating, data communication, or AI operation performance monitoring, etc. In some embodiments, the information may be sent using default air interface parameters and/or resources. In some implementations, there may be personalized AI training/implementation for different UE capabilities. For example, AI-capable UEs having high-end functionality may accommodate larger training sets or parameters with possibly less air-interface overhead. For example, less overhead may be required for maintaining optimal communication link quality, e.g. reduced cyclic prefix (CP) overhead, fewer redundant bits, etc. For example, CP overhead may be set as 1%, 3%, or 5% for high end AI capable UEs, and may instead be set as 4% or 5% for low end AI capable UEs. In some implementations, there may be a combination/joint optimization of CP and reference signal training for high end AI capable UEs, but not for low end AI capable UEs. Low end AI capable UEs might have fewer training sets or parameters (which may be beneficial for reduced training overhead and/or fast convergence), but possibly with larger air-interface overhead (e.g. post-training).

Further to the above, and for the sake of completeness, the following is a list of air interface components/models in the physical layer that may benefit from an AI implementation by intelligent PHY 710:

- Channel coding and decoding: Channel coding is used for more reliable data transmission over noisy channels. For fading channels in particular, AI may be implemented for the channel coding. The decoding might also be difficult because it might involve high computational complexity. Impractical assumptions sometimes must be made to decode codes with affordable complexity, which sacrifices performance in exchange. In one example, AI may also (or instead) be implemented in a channel decoder, e.g, the decoding process may be modeled as a classification task.

Modulation and demodulation: The main goal of a modulator is mapping multiple bits into a transmitted symbol, e.g. to try to achieve higher spectral efficiency given limited bandwidth. In one example, modulation schemes such as M-QAM are used in wireless communication systems. Such square-shaped constellations may assist with low complexity for demodulation at the receiver. However, there exists some other constellation designs with additional geometric, such as non-euclidean distance, and probabilistic shaping gains. In some embodiments, AI is implemented in the modulation/demodulation to exploit the shaping gains and possibly design suitable constellations for specific application scenarios. In some embodiments, AI is implemented to optimize an irregular constellation (perhaps in terms of optimizing Euclidean distance), where the optimization may incorporate factors such as PAPR reduction and/or robustness to impairments from devices or the communication channel (e.g. phase noise, Doppler, power amplifier (PA) non-linearity, etc.).

MIMO and receiver: AI-driven techniques may be used to design MIMO-related modules, such as a CSI feedback schemes, antenna selection, channel tracking and prediction, pre-coding, and/or channel estimation and detection. In some implementations, an AI algorithm may be deployed in an offline-training/online-inference way, which may address the issue of potentially large training overhead caused by AI methods.

Waveform and multiple access: Waveform generation is responsible for mapping the information symbols into signals suitable for electromagnetic propagation. In one example, deep learning may be implemented for waveform generation. For example, without using an explicit discrete Fourier transform (DFT) module, deep learning or other learning-based methods may be used to design advanced waveforms. In some implementations, it may be possible to directly design a new waveform to replace standard OFDM by setting some particular requirements, for example, PAPR constraint or low level of out-of-band emission. This may support asynchronous transmission to possibly avoid the large overhead of synchronization signaling caused by massive terminals, and/or it may be robust to UE collision. It may also entail implementing a good localization property in the time domain to provide low-latency services and to support small packet transmission efficiently.

Optimization of parameters: Parameters, such as coding, modulation, MIMO parameters, may be optimized using AI to try to have a positive impact on the performance of the communication systems. In some implementations, optimized parameters might dynamically change due to fast time-varying channel characteristics of the physical layer in the real environment. By utilizing AI methods, optimized parameters may possibly be obtained, e.g. by neural networks, possibly with much lower complexity than traditional schemes. In addition, traditional parameter optimization is per building block, such as, bit-interleaved coded modulation (BICM) model, while joint optimization of multiple blocks may provide additional performance gains by an AI neural network, e.g. joint source and channel optimization. Furthermore, to adapt to fast time-varying channel status, self-learning of optimized parameters by AI may be utilized to try to further improve performance.

Physical layer components of an air interface that are not implemented using AI (e.g. that are not part of intelligent PHY 710) may operate in a conventional non-AI manner and may still aim to have (more limited) optimization within the parameters defined. For example, particular modulation and/or coding and/or waveform schemes, technologies, or parameters may be predefined, with selection being limited to predefined options, e.g. based on channel conditions determined from measuring transmitted reference signals.

Intelligent MIMO:

One or more air interface components related to transmission or reception over multiple antennas (or panels) may be AI-enabled, e.g. air interface components implementing beamforming, and/or precoding, and/or channel acquisition/tracking/prediction/construction, etc. Such air interface components may be part of intelligent MIMO 7102.

The specific components implemented using AI, and the details of the AI algorithms or models, are implementation specific. However, a few examples are described below for completeness.

As one example, in non-AI implementations, precoding parameters may be determined in a conventional fashion, e.g. based on transmission of a reference signal and measurement of that reference signal. In one example, a TRP transmits, to a UE, a reference signal (such as a channel state information reference signal (CSI-RS)). The reference signal is used by the UE to perform a measurement and thereby obtain a measurement result, e.g. the measurement may be measuring CSI to obtain the CSI. The UE then transmits a measurement report to report some or all of the measurement result, e.g. to report some or all of the CSI. The TRP then selects and implements one or more precoding parameters based on the measurement result, e.g. to perform digital beamforming. Alternatively, instead of sending the measurement results, the UE might send an indication of the precoding parameters corresponding to the measurement results, e.g. the UE might send an indication of a codebook to be used for the precoding. In some embodiments, the UE might instead or additionally send a rank indicator (RI), channel quality indicator (CQI), CSI-RS resource indicator (CRI), and/or SS/PBCH resource block indicator. In another example, the UE might send a reference signal to the TRP, which is used to obtain CSI and determine precoding parameters. Methods of this nature are currently employed in non-AI air interface implementations. However, in an AI implementation, the network device 352 may use AI to determine precoding parameters for a TRP for communication with a particular UE. The inputs to the AI may include information such as the UE's current location, speed, beam direction (angle of arrival/angle of departure info), etc. The output is the precoding parameters, e.g. for digital beamforming, analog beamforming, and/or hybrid beamforming (digital+analog beamforming). Transmission of a reference signal and associated feedback of a measurement result might not even be necessary in an AI implementation.

In another example, in non-AI implementations, channel information may be acquired for a wireless channel between a TRP and a particular UE in a conventional fashion, e.g. by transmission of a reference signal and using the reference signal to measure CSI. However, in an AI implementation, a channel may be constructed and tracked using AI. For example, in general a channel between a UE and a TRP changes due to movement of the UE or changes in environment. An AI algorithm may incorporate sensing information that detects changes in the environment, such as the introduction or removal of an obstruction between the TRP and the UE. The AI algorithm may also incorporate the current location, speed, beam direction, etc. of the UE. The output of the AI algorithm may be a prediction of the channel, and in this way the channel may be constructed and tracked over time. There might not need to be a transmission of a reference signal/determining CSI in the way implemented in conventional non-AI implementations.

In another example, AI (for example in the form of an auto-encoder) may be applied to the transmission and/or reception to compress the channel and reduce channel feedback overhead. For example, an auto-encoded neural network may be trained and executed at the UE and TRP. The UE measures the CSI according to a downlink reference signal and compresses the CSI, which is then reported to the TRP with less overhead. After receiving the compressed CSI at the TRP, the network uses AI to restore the original CSI.

The AI might be enabled or disabled, depending upon the scenario or UE capability. Signaling related to enabling or disabling AI may be sent semi-statically or dynamically.

In the AI implementations, the AI inputs may include sensing and/or positioning information for one or more UEs, e.g. to predict/track the channel for the one or more UEs. The measurement mechanisms used (e.g. transmission of reference signals, measuring and feedback, channel sounding mechanisms, etc.) may be different for AI implementation versus a non-AI implementation. However, as discussed later, in some embodiments, there is a unified measuring and feedback channel configurations designed to accommodate both AI and non-AI capable devices, including AI capable devices having different types of AI implementations resulting in different needs for measurement and/or feedback.

Further to the above, and for the sake of completeness, the following are some examples of components/models in the air interface that may benefit from an AI implementation, e.g. by intelligent MIMO 7102:

- Channel acquisition: In one example, historic channel data and sensing data is stored as data sets, based on which a radio environment map is drawn through AI methods. Based on the radio map, channel information might be obtained not only through common measurement, but also by inference with other information, such as location given.
- Beamforming and tracking: As the carrier frequency reaches millimeter wave or even THz range, beam-centric design, such as beam-based transmission, beam alignment, beam tracking, may be extensively applied in wireless communication. In this context, efficient beamforming and tracking algorithms becomes important. In some embodiments, and relying on prediction capability, AI methods may be implemented to optimize the antenna selection, beamforming and precoding procedures jointly.
- Sensing and positioning: In some embodiments, both measured channel data and sensing and positioning data may be obtained, e.g. due to large bandwidth, new spectrum, dense network and/or more line-of-sight (LOS) links. Based on this data, in some embodiments a radio environmental map may be drawn through AI methods, where channel information is linked to its corresponding positioning or environmental information. As a result, the physical layer and/or MAC layer design may possibly be enhanced.

Intelligent Protocols and Signaling:

One or more air interface components related to executing protocols (e.g. possibly in the MAC layer) may be AI-enabled, e.g. via intelligent protocols 730. For example, AI may be used to implement air interface components implementing link adaptation, radio resource management (RRM), retransmission schemes, etc. The specific components implemented using AI, and the details of the AI algorithms or models, are implementation specific. However, a few examples are described below for completeness.

As one example, in non-AI implementations, link adaptation may be performed in which there are a predefined limited number of different modulation and coding (MCS) schemes, and a look up table (LUT) or the like may be used to select one of the MCS schemes based on channel information. A reference signal (e.g. a CSI-RS) may be transmitted and used for measurement to determine the channel information. Methods of this nature are currently employed in non-AI air interface implementations. However, in an AI implementation, the network and/or UE may use AI to perform link adaptation, e.g. based on the state of the channel as may be determined using AI. Transmission of a reference signal might not be needed at all or as often.

As another example, in non-AI implementations, retransmissions may be governed according to a protocol defined by a standard, and particular information may need to be signaled, such as process ID, and/or redundancy version (RV), and/or the type of combining that may be used (e.g. chase combining or incremental redundancy), etc. Methods of this nature are currently employed in non-AI air interface implementations. However, in an AI implementation, the network device 352 may determine a customized retransmission protocol on a UE-specific basis (or for a group of UEs), e.g. possibly dependent upon the UE position, sensing information, determined or predicted channel conditions for the UE, etc. Post-training, the control information needed to be dynamically indicated for the customized retransmission protocol may be different from (e.g. less than) control information needed to be dynamically indicated in convention HARQ protocols. For example, the AI-enabled retransmission protocol might not need to signal process ID or a RV, etc.

The AI might be enabled or disabled, depending upon the scenario or UE capability. Signaling related to enabling or disabling AI may be sent semi-statically or dynamically.

Intelligent MAC:

The network may include a controller in the MAC layer that may make decisions during the life cycle of the communication system, such as TRP layout, beaming and beam management, spectrum utilization, channel resource allocation (e.g. scheduling time/frequency/spatial resources for data transmission), MCS adaption, hybrid automatic repeat request (HARM) management, transmission/reception mode adaption, power control, and/or interference management. Wireless communication environments may be highly dynamic due to the varying channel conditions, traffic conditions, loading, interference, etc. In general, system performance may be improved if transmission parameters are able to adapt to a fast-changing environment. However, conventional non-AI methods mainly rely on optimization theory, which may be NP-hard and too complicated to implement. In this context, AI may be used to implement an intelligent controller for air transmission optimization in the MAC layer.

For example, the network device 352 may implement an intelligent MAC controller in which any one, some, or all of the following might be determined (e.g. optimized), possibly on a joint basis depending upon the implementation:

(1) TRP layout and TRP activation/deactivation (as mentioned above, a TRP, as used herein, may be a T-TRP (e.g. a base station) or a NT-TRP (e.g. a drone, satellite, high altitude platform station (HAPS) etc)). The TRP layout and TRP activation/deactivation may be implemented by intelligent TRP layout 7201. In some embodiments, the TRP selection may be made for each of one or more UEs (e.g. a selection of which TRP(s) to serve which UE(s)).

(2) Beam forming and beam management in relation to each of one or more UEs. The beam forming and beam management may be implemented by intelligent beam management 7202.

(3) Spectrum utilization in relation to each of one or more UEs. The spectrum utilization procedure may be implemented by intelligent spectrum utilization 7203.

(4) Channel resource allocation in relation to each of one or more UEs. The channel resource allocation procedure may be implemented by intelligent channel resource allocation 7204.

(5) Transmit/receive mode adaptation in relation to each of one or more UEs. The transmit/receive mode adaptation may be implemented by intelligent transmit/receive mode adaptation 7205.

(6) Power control in relation to each of one or more UEs. The power control may be implemented by intelligent power control 7206.

(7) Interference management in relation to each of one or more UEs. The interference management may be implemented by intelligent interference management 7207.

Figure 8:
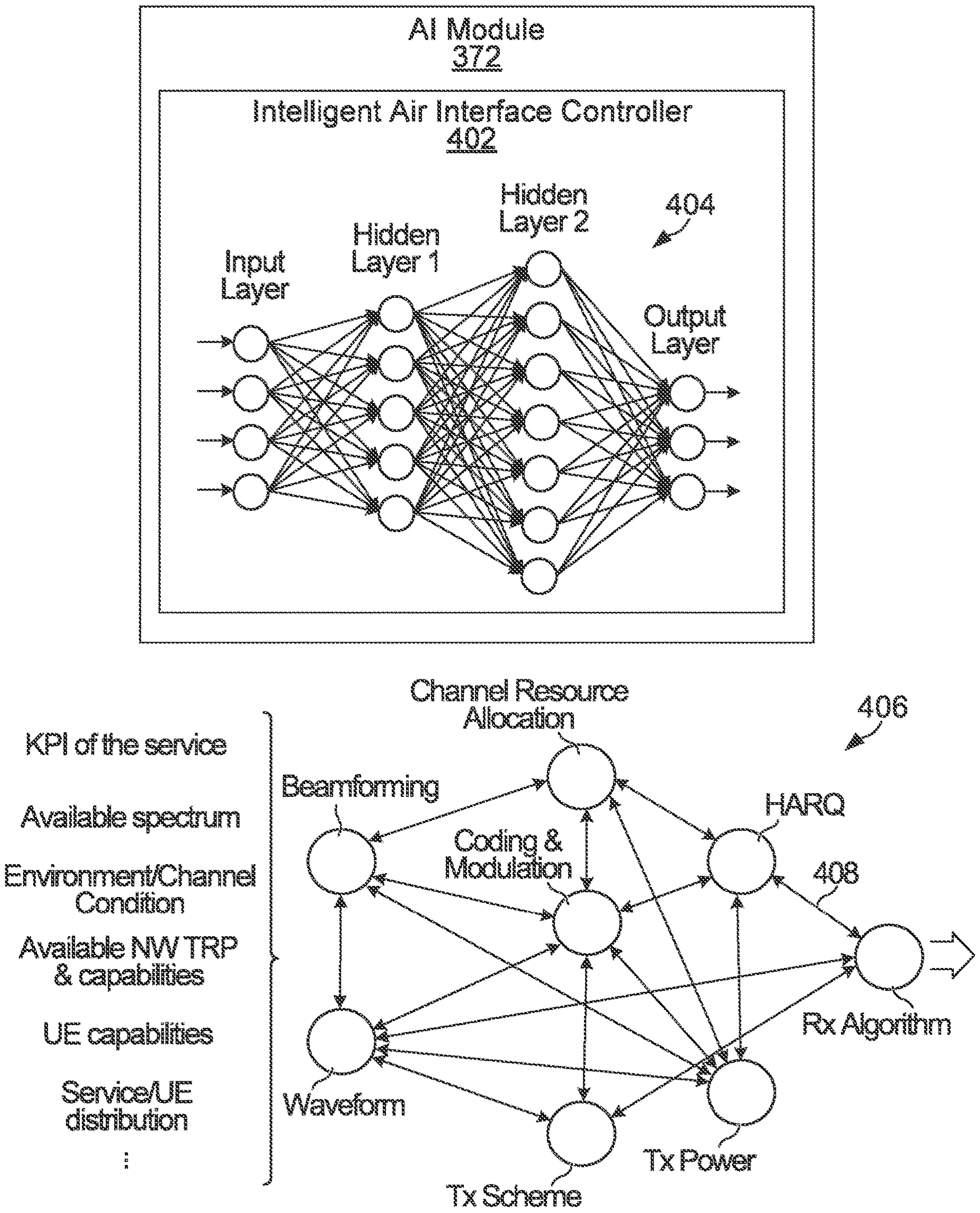
FIG. 8 illustrates an intelligent air interface controller, according to one embodiment.

FIG. 8 illustrates an intelligent air interface controller 402 implemented by the AI module 372 of the network device 352, according to one embodiment. The intelligent air interface controller 402 may be based on the intelligent PHY 710, intelligent MAC 720, and/or intelligent protocols 730.

In one embodiment, the intelligent air interface controller 402 implements AI, e.g. in the form of a neural network 404, in order to optimize or jointly optimize any one, some, or all of items (1) to (7) listed immediately above, and possibly as well as other air interface components, which may include scheduling and/or control functions. The illustration of a neural network 404 is only an example. Any type of AI algorithms or models may be implemented. The complexity and level of AI-based optimization is implementation specific. In some implementations, the AI may control one or more air interface components in a single TRP or for a group of TRPs (e.g. jointly optimized). In some implementations, one, some, or all of items (1) to (7) above or other air interface components may be individually optimized, whereas in other implementations, one, some, or all of items (1) to (7) above or other air interface components may be jointly optimized. In some implementations, only certain related components may be jointly optimized, e.g. optimizing spectrum utilization and interference management for one or more UEs. In some embodiments, optimization of one or more items may be done jointly for a group of TRPs, where the TRPs in the group of TRPs may all be of the same type (e.g. all T-TRPs) or of different types (e.g. a group of TRPs including a T-TRP and a NT-TRP).

Graph 406 is a schematic high-level example of factors that may be considered in the AI, e.g. by neural network 404, to produce the output controlling the air interface components. Inputs to the neural network 404 schematically illustrated via graph 406 may include, for each UE, factors such as:

(A) Key performance indicators (KPIs) of the service, e.g. block error rate (BLER), packet drop rate, energy efficiency (power consumptions and network devices and terminal devices), throughput, coverage (link budget), QoS requirements (such as latency and/or reliability of the service), connectivity (the number of connected devices), sensing resolution, position accuracy, etc.

(B) Available spectrum, e.g. some UEs might have the capability to transmit on different or more spectrum compared to other UEs. For example, the carriers available for each service and/or each UE may be considered.

(C) Environment/channel conditions, e.g. between the UE and a TRP.

(D) Available TRPs and their capabilities, e.g. some TRPs might support more advanced functionality than other TRPs.

(E) Capability of the UE, e.g. non-AI capable, AI capable, AI mode 1, AI mode 2, etc.

(F) Service/UE distribution, e.g. for supporting different services.

The AI algorithm/model may take these inputs and consider and jointly optimize different air interface components on a UE-by-UE specific basis, e.g. for the example items listed in the schematic graph 406, such as beamforming, waveform generation, coding and modulation, channel resource allocation, transmission scheme, retransmission protocol, transmission power, receiver algorithms, etc. In some embodiments, the optimization may instead be done for a group of UEs, rather than UE-by-UE specific. In some embodiments, the optimization may be on a service-specific basis. An arrow (e.g. arrow 408) between nodes indicates a joint consideration/optimization of the components connected by arrows. Outputs of the neural network 404 schematically illustrated via graph 406 may include, for each UE (or group of UEs and/or each service), items such as: rules/protocols, e.g. for link adaptation (the determination, selection and signaling of coding rate and modulation level, etc.); procedures to be implemented, e.g. a retransmission protocol to follow; parameter settings, e.g. such as for spectrum utilization, power control, beamforming, physical component parameters, etc. For example, the intelligent air interface controller 402 may select an optimal waveform, beamforming, MCS, etc. for each UE (or group of UEs or service) at each T-TRP or NT-TRP. The optimization may be on a TRP and/or UE-specific basis, and parameters to be sent to UEs are forwarded to the appropriate TRPs to be transmitted to the appropriate UEs.

In some implementations, optimization targets for the intelligent air interface controller 402 might not only be for meeting the performance requirements of each service or each UE (or group of UEs), but may also (or instead) be for overall network performance, such as system capacity, network power consumption, etc.

In some implementations, the intelligent air interface controller 402 may include control to enable or disable AI-enabled air interface components used for communication between the network and one or more UEs. In some implementations, like in the example illustrated in FIG. 8, the intelligent air interface controller 402 may integrate (e.g. jointly optimize) air interface components in both the physical and MAC layers.

For completeness, the following are examples of components that may be jointly or individually optimized using AI, some of which are introduced above. Some of these may be implemented by intelligent MAC 720 and/or intelligent protocols 730

- Intelligent TRP management: Single TRP and multi-TRP joint transmission, for example, macro-cells, small cells, pico-cells, femto-cells, remote radio heads, relay nodes and so on, may possibly be implemented. It has previously been a challenge to design an efficient TRP management scheme while considering tradeoffs between performance and complexity. The typical problems, including TRP selection, TRP turning on/off, power control and resource allocation, may be difficult to solve. In some embodiments, instead of using the complicated mathematical optimization method, AI is implemented to possibly provide a better solution that has less complexity and that may adapt to network conditions. In some embodiments, the TRP management may be implemented by intelligent TRP layout 7201.
- Intelligent beam management: Multiple antennas (or phase shift antenna array) may dynamically form one or more beams based on channel conditions for directional transmissions to one or more devices. The receiver may also tune the receiver antenna (panel) to the direction of the arrival beam. In some implementations, AI may be used to learn environment changes and perform the beam steering, possibly more accurately within a short period of time. In some implementations, rules may be generated and guide the operation of phase shifts of radio frequency devices, e.g., the antenna elements, which may then work smarter by learning different policies under different situations. In some embodiments, the beam management may be performed by intelligent beam management 7202.
- Intelligent MCS: In some embodiments, adaptive modulation and coding (AMC) algorithms may be implemented that rely on the feedback from the receiver to make a decision reactively. However, the fast-varying channel, together with scheduling delay, may render the feedback out-of-date. To address this issue, AI may be employed, e.g. to decide the MCS settings. Through learning from the experience and interaction with other agents, a smart agent may be more likely to make a better decision and to make it proactively.
- Intelligent HARQ strategy: Besides the combining algorithms for multiple redundancy versions in the physical layer, the operation of HARQ procedure may also have impacts on performance, such as on the finite transmission opportunity and on the resources required to be allocated between new transmissions and retransmissions. In some embodiments, to achieve a global optimization, it may be necessary to consider the problem from a cross-layer point of view, with AI being implemented to process a large amount of information available from various sources.
- Intelligent transmission/reception (Tx/Rx) mode adaption: In a network with multiple communicating participants, coordination among them may be key to efficiency. Both the system conditions, such as wireless channel and buffer status, and the behavior of other device may be highly dynamic. In some implementations, AI may help by learning and prediction, e.g. to provide more accuracy, reduce the Tx/Rx mode adaption overhead, and/or improve the overall system performance. In some embodiments, the Tx/Rx mode adaptation is performed by intelligent Tx/Rx mod adaptation 7205.
- Intelligent interference management: In some implementations, AI may learn the interference situation for the TRP and the UEs individually and/or jointly. A global optimal strategy may be configured automatically by the AI in order to bring interference under control, hence possibly increasing spectrum and/or power efficiency. In some embodiments, the interference management is performed by intelligent interference management 7207.
- Intelligent channel resource allocation: The scheduler for channel resource allocation decides the allocation of transmission opportunities, and its performance contributes to system performance. In some implementations, transmission opportunities, as well as other radio resources such as spectrum, antenna port, and/or spreading codes may be managed by AI, possibly together with intelligent TRP management. Coordination of radio resources among multiple base stations may possibly be improved for higher global performance. In some embodiments, the channel resource allocation is performed by intelligent channel resource allocation 7204.
- Intelligent power control: The attenuation of radio signals and/or the broadcasting characteristics of wireless channels may make it necessary to control power in wireless communications. In some embodiments, power control and interference coordination are jointly optimized. However, instead of solving a complicated optimization problem which must be repeated when the environment changes, AI may be implemented to provide an alternative solution. In some embodiments, the power control is performed by intelligent power control 7206.
- Super flexible frame structure and agile signaling: In some embodiments, a super flexible frame structure in a personalized air interface framework may be designed with more flexible waveform parameters and transmission duration, e.g. using AI. These may be tailored to adapt to diverse requirements from a wide range of scenarios, such as for 0.1 ms extreme low latency. As a result, there may be many options for each parameter in the system. In some implementations, a control signaling framework may be implemented that is simplified, e.g. requiring only a few control signaling formats, while the control information may have flexible size. In some implementations, the control signaling is detected with simplified procedures and minimized overhead and UE capability. In some implementations, the control signaling may be forward compatible, with no need to introduce a new format for future developments.
- Native intelligent power saving: In some embodiments, with the use of AI, intelligent MIMO and beam management, intelligent spectrum utilization, intelligent channel prediction, and/or intelligent power control may be supported. These may dramatically reduce power consumption both of devices (e.g. UEs) and network nodes compared with non-AI technologies, especially for data. Some examples are as follows: (i) the data transmission duration may be significantly shortened by an AI implementation, thus possibly reducing the active time; (ii) optimized operating bandwidth may be allocated by the network according to real-time traffic amount and channel information, thus a UE may use a smaller bandwidth to reduce power consumption when there is no heavy traffic; (iii) effective transmission channels may be designed such that control signaling may be optimized and/or the number of state transitions or power mode changes may be minimized in order to achieve maximal power saving for devices (e.g. UEs) and network nodes (e.g. TRPs); (iv) because the air interface is personalized for each UE (or group of UEs) or each service, different types of UEs/services may have different requirements for power consumption, and as a result power saving solutions may be personalized for different types of UEs/services while meeting requirements for communication. Any one, some, or all of the preceding examples may be implemented. In some embodiments, power consumption may be optimized using AI by: optimizing the active time, and/or optimizing the operation bandwidth, and/or optimizing the spectrum range and channel source assignment. The optimization may possibly be according to quality requirement of the services, UE types, UE distribution, UE available power, etc.

Intelligent Spectrum Utilization:

In some embodiments, spectrum utilization may be controlled/coordinated using AI, e.g. by intelligent spectrum utilization 7203. Some example details of intelligent spectrum utilization are as follows.

The potential spectrums for future networks may be low band, mid-band, mmWave bands, THz bands, and possibly even visible light band. In some embodiments, intelligent spectrum utilization may be implemented in association with more flexible spectrum utilization, e.g. in which there may be fewer restrictions and more options for configuring carriers and/or bandwidth parts (BWPs) on a UE-specific basis.

As one example, in some embodiments, there is not necessarily coupling between carriers, e.g. between uplink and downlink carriers. For example, an uplink carrier and a downlink carrier may be independently indicated so as to allow the uplink carrier and downlink carrier to be independently added, released, modified, activated, deactivated, and/or scheduled. As another example, there may be a plurality of uplink and/or downlink carriers, with signaling indicating addition, modification, release, activation, deactivation, and/or scheduling of a particular carrier of the uplink carriers and/or downlink carriers, e.g. on an independent carrier-by-carrier basis. In some implementations, the base station may schedule a transmission on a carrier and/or BWP, e.g. using DCI, and the DCI may also indicate the carrier and/or BWP on which the transmission is scheduled. Through the decoupling, flexible linkage may thereby be provided.

As used herein, "adding" a carrier for a UE refers to indicating, to the UE, a carrier that may possibly be used for communication to and/or from the UE. "Activating" a carrier refers to indicating, to the UE, that the carrier is now available for use for communication to and/or from the UE. "Scheduling" a carrier for a UE refers to scheduling a transmission on the carrier. "Removing" a carrier for a UE refers to indicating, to the UE, that the carrier is no longer available to possibly be used for communication to and/or from the UE. In some embodiments, removing a carrier is the same as deactivating the carrier. In other embodiments, a carrier might be deactivated without being removed. "Modifying" a carrier for a UE refers to updating/changing the configuration of a carrier for a UE, e.g. changing the carrier index and/or changing the bandwidth and/or changing the transmission direction and/or changing the function of the carrier, etc. The same definitions apply to BWPs.

In some implementations, a carrier may be configured for a particular function, e.g. one carrier may be configured for transmitting or receiving signals used for channel measurement, another carrier may be configured for transmitting or receiving data, and another carrier may be configured for transmitting or receiving control information. In some implementations, a UE may be assigned a group of carriers, e.g. via RRC signaling, but one or more of the carriers in the group might not be defined, e.g. the carrier might not be specified as being downlink or uplink, etc. The carrier may then be defined for the UE later, e.g. at the same time as scheduling a transmission on the carrier. In some implementations, more than two carrier groups may be defined for a UE to allow for the UE to perform multiple connectivity, i.e. more than just dual connectivity. In some implementations, the number of added and/or activated carriers for a UE, e.g. the number of carriers configured for UE in a carrier group, may be larger than the capability of the UE. Then, during operation, the network may instruct radio frequency (RF) switching to communicate on a number of carriers that is within UE capabilities.

AI may be implemented to use or take advantage of the flexible spectrum embodiments described above. As one example, if there is decoupling between uplink and downlink carriers, the output of an AI algorithm may independently instruct adding, releasing, modifying, activating, deactivating, and/or scheduling different downlink and uplink carriers, without being limited by coupling between certain uplink and downlink carriers. As another example, if different carriers can be configured for different functions, the output of an AI algorithm may instruct configuration of different functions for different carriers, e.g. for purposes of optimization. As another example, some carriers may support transmissions on an AI-enabled air interface, whereas others may not, and so different UEs may be configured to transmit/receive on different carriers depending upon their AI capabilities.

As another example, the intelligent air interface controller 402 may control one or a group of TRPs, and the intelligent air interface controller 402 may further determine the channel resource assignment for a group of UEs served by the TRP or group of TRPs. In determining the channel resource assignment, the intelligent air interface controller 402 may apply one or more AI algorithms to decide channel resource allocation strategy, e.g. to assign which carrier/BWP to which transmission channels for one or more UEs. The transmission channels may be, for example, any one, some, or all of the following: downlink control channel, uplink control channel, downlink data channel, uplink data channel, downlink measurement channel, uplink measurement channel. The input attributes/parameters to the AI model may be any some or all of the following: the available spectrums (carriers), data rate and/or coverage supported by each carrier, traffic load, UE distribution, service type for each UE, KPI requirement of the service(s), UE power availability, channel conditions of the UE(s) (e.g. whether the UE is located at the cell edge), coverage requirement of the service(s) for the UE(s), number of antennas for TRP(s) and UE(s), etc. The optimization target of the AI model may be meeting all service requirements for all UEs, and/or minimizing power consumption of TRPs and UEs, and/or minimizing inter-UE interference and/or inter-cell interference, and/or maximizing UE experience, etc. In some embodiments, the intelligent air interface controller 402 may run in a distributed manner (individual operation) or in a centralized manner (joint optimization for a group of TRPs). The intelligent air interface controller 402 may be located in one of the TRPs or in a dedicated node. The AI training may be done by an intelligent controller node or by another AI node or by multiple AI nodes, e.g. in the case of multi-node joint training.

The description above equally applies to BWPs. For example, different BWPs may be decoupled from each other and possibly linked flexibly, and an AI algorithm may exploit this flexibility to provide enhanced optimization.

In some embodiments, communication is not limited to the uplink and downlink directions, but may also or instead include device-to-device (D2D) communication, integrated access backhaul (JAB) communication, non-terrestrial communication, and so on. The flexibility described above in relation to uplink and downlink carriers may equally apply to sidelink carriers, unlicensed carriers, etc., e.g. in terms of decoupling, flexible linkage, etc.

In a flexible spectrum utilization embodiment, AI may be used to try to provide a duplexing agnostic technology with adequate configurability to accommodate different communication nodes and communication types. In some implementations, a single frame structure may be designed to support all duplex modes and communication nodes, and resource allocation schemes in the intelligent air interface may be able to perform effective transmissions in multiple air links.

Example Architecture for Implementing Some or all of the Intelligence

For completeness, an example architecture is described in which some or all of the AI described above and herein may be implemented.

Figure 9:
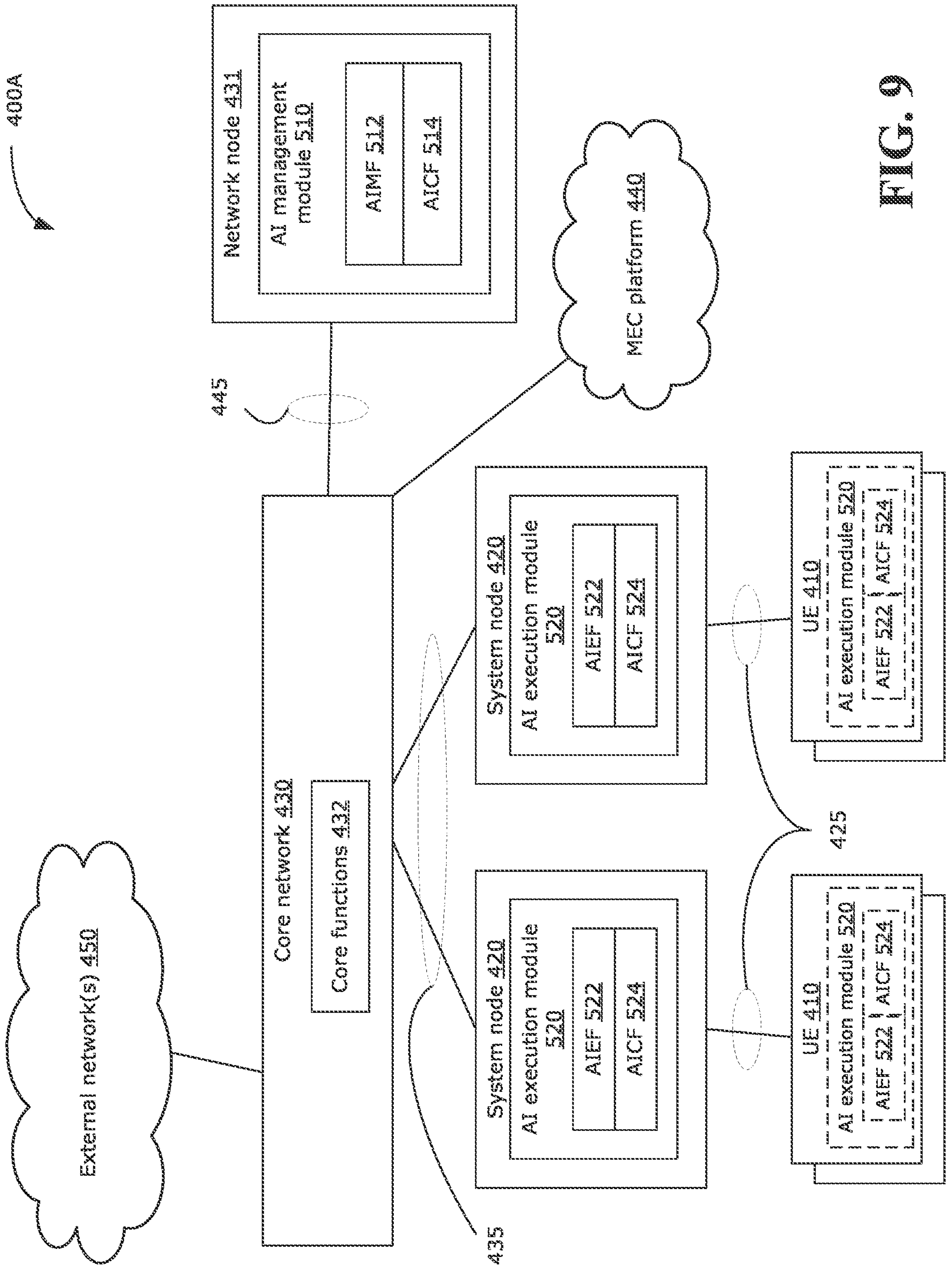
FIGS. 9 to 18 illustrate example network architectures, according to various embodiments.

FIG. 9 illustrates a wireless system 400A implementing an example network architecture, according to one embodiment.

A system node 420 may be any node of an access network (AN) (also referred to as a radio access network (RAN)). For example, a system node 420 may be a base station (BS) of an AN.

In some embodiments, the system node 420 may be a node in the network in FIG. 5. In some embodiments, the system node 420 may be a T-TRP 170 or 172 described earlier.

Each system node 420 is configured to wirelessly interface with one or more of the UEs 410 to enable access to the respective AN.

In some embodiments, a UE 410 may be any of UEs 110, 302, 304, 306, 308 described above.

A given UE 410 may connect with a given system node 420 to enable access to the core network 430, another system node 420, a multi-access edge computing (MEC) platform 440 and/or external network(s) 450. The MEC platform 440 may be a distributed computing platform, in which a plurality of MEC hosts (typically edge servers) provide distributed computing resources (e.g., memory and processor resources). The MEC platform 440 may provide functions and services closer to end users (e.g., physically located closer to the system nodes 420, compared to the core network 430), which may help to reduce latency in provisioning of such functions and services.

The network node 431 may be dedicated to supporting AI capabilities (e.g., dedicated to performing AI management functions as disclosed herein), and may be accessible by multiple entities of the wireless system 400A (including the external networks 450 and MEC platform 440, although such links are not shown in FIG. 9 for simplicity), for example.

In some embodiments, the network node 431 may be, for example, the network device 352 introduced earlier.

It should be noted that, although the present disclosure provides examples in which the network node 431 provides certain AI functionalities (e.g., an AI management module 410, discussed further below), the functionality of the network node 431 or similar AI functionalities (e.g., more execution-focused functionalities and fewer training-focused functionalities) may be provided by a system node 420 or a UE 410. For example, functionalities that are described as being provided at the network node 431 may additionally or alternatively be provided at a system node 420 or UE 410 as an integrated/imbedded function or dedicated AI function. Moreover, the network node 431 may have its own a sensing functionality and/or dedicated sensing node(s) (not shown) to obtain the sensed information (e.g., network data) for AI operations. In some examples, the network node 431 may be an AI-dedicated node that is capable of performing more intense and/or large amounts of computation (which may be required for comprehensive training of AI models). Further, although illustrated as a single network node 431, it should be understood that the network node 431 may in fact be a representation of a distributed computing system (i.e., the network node 431 may in fact be a group of multiple physical computing systems) and is not necessarily a single physical computing system. It should also be understood that the network node 431 may include future network nodes that may be used in future generation wireless technology.

The system nodes 420 communicate with respective one or more UEs 410 over AN-UE interfaces 425, typically air interfaces (e.g. radio frequency (RF), microwave, infrared (IR), etc.). For example, a RAN-UE interface may be a Uu link (e.g., in accordance with 5G or 4G wireless technologies). The UEs 410 may also communicate directly with one another via one or more sidelink interfaces (not shown). The system nodes 420 each communicate with the core network 430 over AN-core network (CN) interfaces 435 (e.g., NG interfaces, in accordance with 5G technologies). The network node 431 may communicate with the core network 430 over a dedicated interface 445, discussed further below. Communications between the system nodes 420 and the core network 430, between two (or more system nodes 420) and/or between the network node 431 and the core network 430 may be over a backhaul link. Communications in the direction from UEs 410 to system nodes 420 to the core network 430 may be referred to as uplink (UL) communications, and communications in the direction from the core network 430 to system nodes 420 to UEs 410 may be referred to as downlink (DL) communications.

AI capabilities in the wireless system 400A are supported by functions provided by an AI management module 510, and at least one AI execution module 520. The AI management module 510 and the AI execution module 520 are software modules, which may be encoded as instructions stored in memory and executable by a processing unit. In some embodiments, the AI management module 510 and/or the AI execution module 520 may be AI module 372 introduced earlier, depending upon the implementation.

In the example shown, the AI management module 510 is located in the network node 431, which may be co-located with or located within the MEC 440 (e.g., implemented on a MEC host, or implemented in a distributed manner over multiple MEC hosts). In other examples, the AI management module 510 may be located in the network node 431 that is a node of an external network 450 (e.g., implemented in a network server of the external network 450). In general, the AI management module 510 may be located in any suitable network node 431, and may be located in a network node 431 that is part of or outside of the core network 430. In some examples, locating the AI management module 510 in a network node 431 that is outside of the core network 430 may enable a more open interface with external network(s) 450 and/or third-party services, although this is not necessary. The AI management module 510 may manage a large number of different AI models designed for different network tasks, as discussed further below. Although the AI management module 510 is shown within a single network node 431, it should be understood that the AI management module 510 may also be implemented in a distributed manner (e.g., distributed over multiple network nodes 431, or the network node 431 is itself a representation of a distributed computing system).

In this example, each system node 420 implements a respective AI execution module 520. For example, the system node 420 may be a BS within an AN, and may implement the AI execution module 520 and perform the functions of the AI execution module 520 on behalf of the entire AN (or on behalf of a portion of the AN). In another example, each BS within an AN may be a system node 420 that implements its own AI execution module 520. Thus, the multiple system nodes 420 shown in FIG. 9 may or may not belong to the same AN. In another example, the system node 420 may be a separate AI-capable node (i.e., not a BS) in the AN, which may or may not be dedicated to providing AI functionality. Although each AI execution module 520 is shown within a single system node 420, it should be understood that each AI execution module 520 may independently and optionally be implemented in a distributed manner (e.g., distributed over multiple system nodes 420, or the system node 420 itself may be a representation of a distributed computing system).

The AI execution module 520 may interact with some or all software modules of the system node 420. For example, the AI execution module 520 may interface with logical layers such as the physical (PHY) layer, media access control (MAC) layer, radio link control (RLC), packet data convergence protocol (PDCP) layer, and/or upper layers (at the system node 420, the logical layers may be functionally split into higher-level centralized unit (CU) layers and lower-level distributed unit (DU) layers) of the system node 420. For example, the AI execution module 520 may interface with control modules of the system node 420 using a common application programming interface (API).

Optionally, a UE 410 may also implement its own AI execution module 520. The AI execution module 520 implemented by a UE 410 may perform functions similar to the AI execution module 520 implemented at a system node 420. Other implementations may be possible. It should be noted that different UEs 410 may have different AI capabilities. For example, all, some, one or none of the UEs 410 in the wireless system 400 may implement a respective AI execution module 520.

In this example the network node 431 may communicate with one or more system nodes 420 via the core network 430 (e.g., using AMF or/and UPF provided by the core functions 432 of the core network 430). The network node 431 may have a communication interface with the core network 430 using the interface 445, which may be a common API interface or a specialized interface dedicated for AI-related communications (e.g., for communications using a AI-related protocol, such as the protocols disclosed herein). It should be noted that the interface 445 enables direct communication between the network node 431 and the core network 430 (regardless of whether the network node 431 is within, near, or outside of the core network 430), bypassing a convergence interface (which may be typically required in this scenario for communications between the core network 430 and all external networks 450). In another embodiment, the network node 431 is within the core network 430 and the interface 445 is an inter communication interface in the core network 430, such as the common API interface. The interface 445 may be a wired or wireless interface, and may be a backhaul link between the network node 431 and the core network 430, for example. The interface 445 may not be typically found in 4G or 5G wireless systems. The core network 430 may thus serve to forward or relay AI-related communications between the AI execution modules 520 at one or more system nodes 420 (and optionally at one or more UEs 410) and the AI management module 510 at the network node 431. In this way, the AI management module 510 may be considered to provide a set of AI-related functions in parallel with the core functions 432 provided by the core network 430.

AI-related communications between the system node 420 and one or more UEs 410 may be via an existing interface such as the Uu link in 5G and 4G network systems, or may be via an AI-dedicated air interface (e.g., using an AI-related protocol on an AI-related logical layer, as discussed herein). For example, AI-related communications between a system node 420 and a UE 410 served by the system node 420 may be over an AI-dedicated air interface, while non-AI-related communications may be over a 5G or 4G Uu link.

Figure 10:
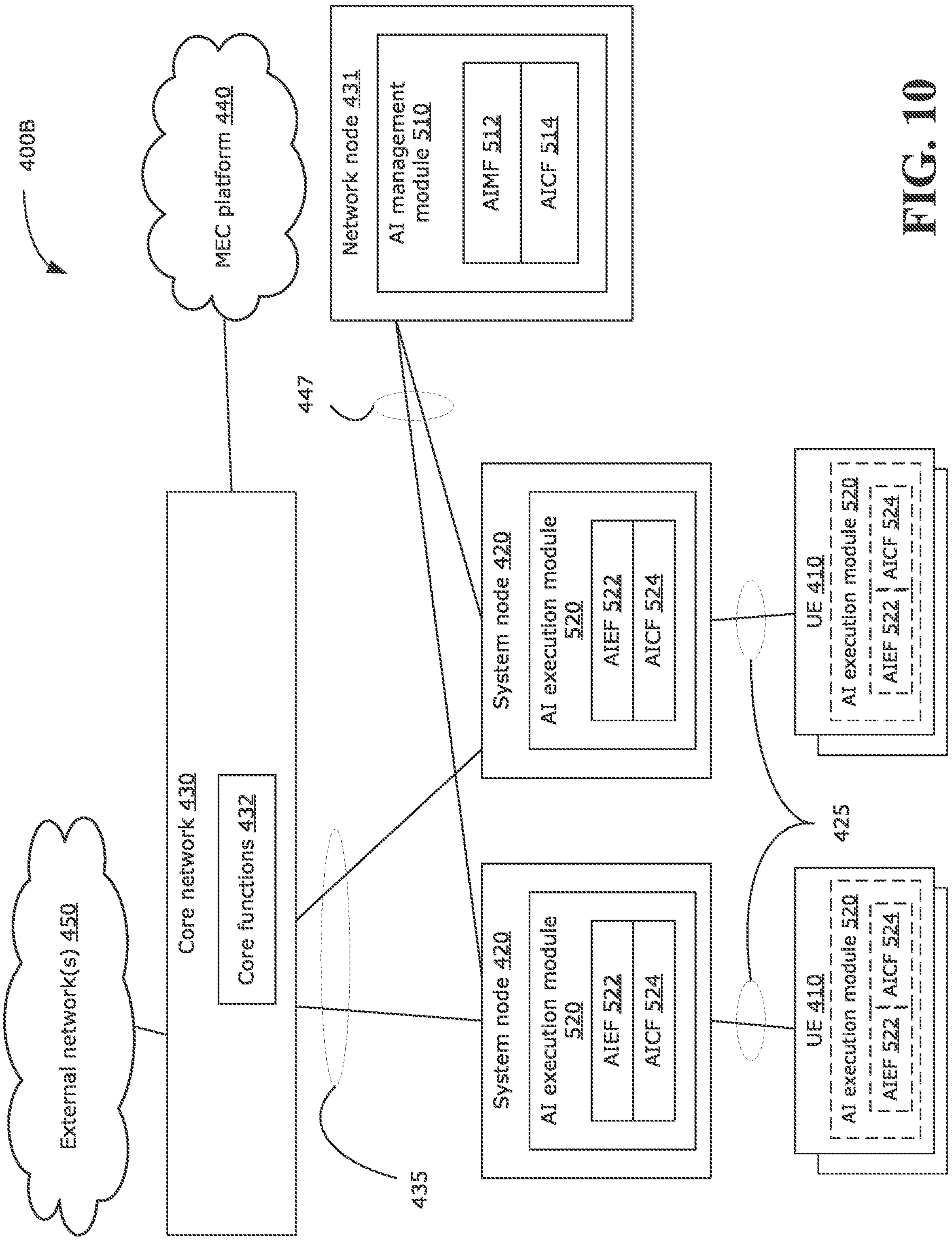
Figure 11:
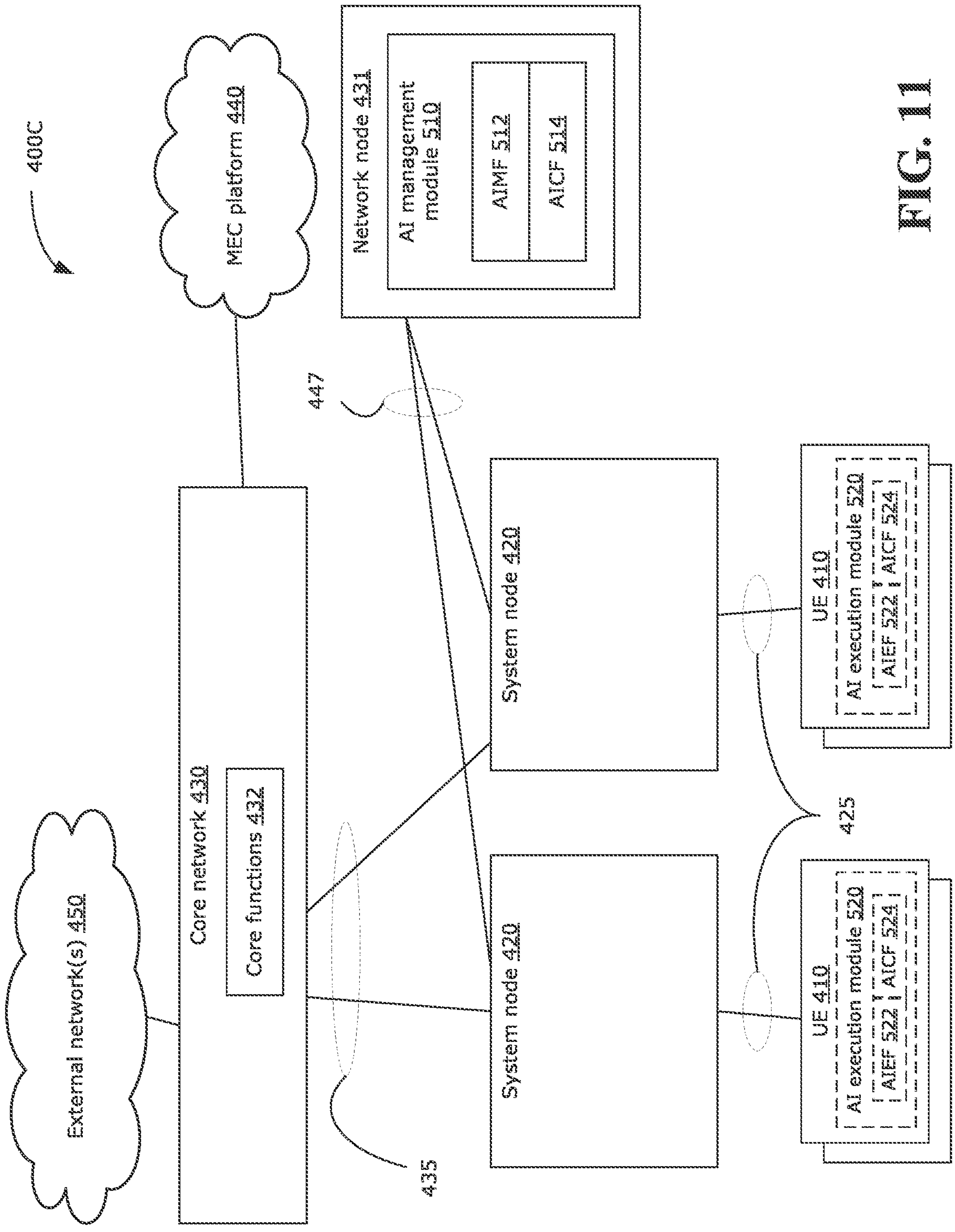

FIG. 9 illustrates an example disclosed architecture in which the AI management module 510 and AI execution modules 520 may be implemented. Other example architectures are now discussed. FIGS. 9 to 11 disclose different possible locations of AI management module 510 and/or AI execution modules 520. Other embodiments herein may define the function of AI management module 510 and/or AI execution modules 520 and how to interface with a UE based on different services/scenarios.

FIG. 10 illustrates a wireless system 400B implementing another example network architecture. It should be appreciated that the network architecture of FIG. 10 has many similarities with that of FIG. 9, and details of the common elements need not be repeated.

Compared to the example shown in FIG. 9, the network architecture of the wireless system 400B of FIG. 10 enables the network node 431, at which the AI management module 510 is implemented, to interface directly with each system node 420 via an interface 447 to each system node 420 (e.g., to at least one system node 420 of each AN). The interface 447 may be a common API interface or a specialized interface dedicated for AI-related communications (e.g., for communications using an AI-related protocol, such as the protocols disclosed herein). It should be noted that the interface 447 enables direct communication between the AI management module 510 and the AI execution module 520 at each system node 420 (regardless of whether the network node 431 is a node in the MEC platform 440 or in an external network 450, or if the network node 431 is part of the core network 430). The interface 447 may be a wired or wireless interface, and may be a backhaul link between the network node 431 and the system node 420, for example. The interface 447 may not be typically found in 4G or 5G wireless systems. The network node 431 in FIG. 10 may also be accessible by the external network(s) 450, the MEC platform 440 and/or the core network 430 (although such links are not shown in FIG. 10 for simplicity).

FIG. 11 illustrates a wireless system 400C implementing another example network architecture, in accordance with embodiments of the present disclosure. It should be appreciated that the network architecture of FIG. 11 has many similarities with that of FIGS. 9 and 10, and details of the common elements need not be repeated. FIG. 11 illustrates an example architecture in which the AI management module 510 is located in a network node 431 that is physically close to the one or more system nodes 420 of the one or more ANs being managed using the AI management module 510. For example, the network node 431 may be co-located with or within the MEC platform 440, or may be co-located with or within an AN.

Compared to the examples shown in FIGS. 9 and 10, the network architecture of the wireless system 400C of FIG. 11 omits the AI execution module 520 from the system nodes 420. One or more local AI models (and optionally a local AI database) that would otherwise be maintained at a local memory of each system nodes 420 may be instead maintained at a memory local to the network node 431 (e.g., in a memory of a MEC host, or in a distributed memory on the MEC platform 440). Although not shown in FIG. 11, the network node 431 may implement one or more AI execution modules 520, or may implement functionalities of the AI execution module 520, in addition to the AI management module 510, for example to enable collection of network data and near-real-time training and execution of AI models, and/or to enable separation of global and local AI models.

Because the network node 431 is located physically close to the system nodes 420, communication between each system node 420 (e.g., from one or more ANs) and the network node 431 may be carried out with very low latency (e.g., latency on the order of only a few microseconds or only a few milliseconds). Thus, communications between the system nodes 420 and the network node 431 may be carried out in near-real-time. Communication between each system node 420 and the network node 431 may be over the interface 447, as described above. The interface 447 may be an AI-dedicated communication interface, supporting low-latency communications.

Details of the AI management module 510 and the AI execution module 520 are now described. The following discussions are equally applicable to the architectures of any of the wireless systems 400A-400C (generally referred to as the wireless system 400) of FIGS. 9-11. It should be understood that the AI management module 510 and the AI execution module 520, as disclosed herein, are not limited by the specific architectures shown in FIGS. 9-11. For example, the AI management module 510 may be implemented at a system node 420 (e.g., at an AI-dedicated node in an AN) to management AI execution modules 520 implemented at other system nodes 420 and/or UEs 410. In another example, an instance of the AI execution module 520 may be implemented at a system node 420 that is an AI-capable node in an AN, separate from the BSs of the AN. In another example, an instance of the AI execution module 520 may be implemented at the network node 431 (e.g., at a network node 431 having data collection capabilities) together with the AI management module 510. In some examples, the AI management module 510 may be implemented in any node of the wireless system 400 (which may or may not be part of a network managed by the core network 430), and the node providing the functions of the AI management module 510 may be referred to as the AI management node (or simply management node). In some examples, the AI execution module 520 may be implemented in any node of the wireless system 400 (including the UE 410, system node 420, or other AI-capable node), and the node providing the functions of the AI execution module 520 may be referred to as the AI execution node (or simply execution node).

Implementation of the AI management module 510 and the AI execution modules 520 provide multi-level (or hierarchical) AI management and control in the wireless system 400. The AI management module 510 provides global or centralized functions to manage and control one or more system nodes 420 (and one or more ANs). In turn, the AI execution module 520 in each system node 420 provides functions to manage and service one or more UEs 410. It should be understood that, in some examples, at least some functions that are described as being provided by the AI management module 510 may additionally or alternatively be provided by the AI execution module 520. Similarly, in some examples, at least some functions that are described as being provided by the AI execution module 520 may additionally or alternatively be provided by the AI management module 510. For example, as previously mentioned, functions of the AI management module 510 may be provided together with at least some execution functions of the AI execution module 520, for example in the system node 420 or UE 410 (in addition to or instead of the network node 431). In another example, data collection and/or execution functions of the AI execution module 520 may be provided together with the functions of the AI management module 510 at a network node 431 having sensing functionality (e.g., capable of collected network data). For ease of understanding, the following discussion describes certain functions at the AI management module 510 and the AI execution module 520; however, it should be understood that this is not intended to be limiting.

The AI management module 510 provides AI management functions (AIMF) 512 and AI-based control functions (AICF) 514. The AI execution module 520 provides AI execution functions 522 and AICF 524. The AICF 524 provided by the AI execution module 520 may be similar to the AICF 514 provided by the AI management module 510. It should be understood that the present disclosure describes the AI management module 510 as having functions provided by the AIMF 512 and AICF 514 for ease of understanding; however, it is not necessary for the functionality of the AI management module 510 to be logically separated into the AIMF 512 and AICF 514 as discussed below (e.g., the functions of the AIMF 512 and the AICF 514 may simply be considered functions of the AI management module 510 as a whole; or some functions provided by the AIMF 512 may instead be functions provided by the AICF 514 and vice versa). In a similar way, the AI execution module 520 is described as having functions provided by the AIEF 522 and the AICF 524 for ease of understanding, but this is not intended to be limiting (e.g., the functions of the AIEF 522 and the AICF 524 may simply be considered functions of the AI execution module 520 as a whole; or some functions provided by the AIEF 522 may instead be functions provided by the AICF 524 and vice versa). The AI management module 510 may perform functions to manage and/or interface with a plurality of AI execution modules 520. In some examples, the AI management module 510 may provide centralized (or global) management of a plurality of AI execution modules 520.

The AIMF 512 may include AI management and configuration functions, AI input processing functions, AI output processing functions, AI modeling configuration functions, AI training functions, AI execution functions and/or AI database functions. A plurality of global AI models may be stored and/or maintained (e.g., trained) by the AI management module 510 using functions of the AIMF 512. In the present disclosure a global AI model refers to an AI model that is implemented at the network node 431. The global AI model has been or is intended to be trained based on globally collected network data. the global AI model may be executed by the AI management module 510 inference output that may be used for setting global configurations (e.g., configurations that are applicable to multiple ANs, or configurations that are applicable to all AI execution modules 520 managed by the AI management module 510). The trained weights of a global AI model may also be further updated at an AI execution module 520, using locally collected network data, as discussed further below.

The AI management module 510 may use functions of the AIMF 512 to maintain a global AI database and/or to access an external AI database (not shown). The global AI database may contain data collected from all the AI execution modules 520 managed by the AI management module 510, and that may be used to train global AI models. The global AI models (and optionally the global AI database) may be stored in a memory coupled to the AI management module 510 (e.g., a memory of a server in which the AI management module 510 is implemented, or a distributed memory on a distributed computing platform in which the AI management module 510 is implemented).

AI management and configuration functions provided by the AIMF 512 may include configuring AI policy (e.g., security-related policies for collection of AI-related data, service-related policies for servicing certain customers, etc.), configuring key performance indicators (KPI) (e.g., latency, quality of service (QoS), throughput, etc.) to be achieved by the wireless system 400, and providing an interface other nodes in the wireless system 400 (e.g., interfacing with the core network 430, the MEC platform 440 and/or an external network 450). The AI management and configuration functions may also include defining an AI model (which may be a global AI model or a local AI model), including defining the network task associated with each global or local AI model. In the present disclosure, the term network task refers to a network performance and/or service to be achieved (e.g., providing high throughput). Further, performing a network task typically involves optimization of more than a single parameter. In some examples, a network task may involve cooperation among multiple nodes to perform an AI-related task. For example, a network task may be to train an AI model (e.g., a global AI model) to perform a task (e.g., to perform object detection and recognition) that requires collection of a large amount of training data. The AI management module 510 may manage multiple AI execution modules 520 at respective system nodes 420 to collaboratively train a global AI model (e.g., similar to federated learning methods). It should be understood that other such network tasks that require cooperation among multiple nodes, which may be managed by the AI management module 510, are within the scope of the present disclosure. As will be discussed further below, one or more AI models may be used together to generate inference data for a particular network task.

Each AI model (which may be a global AI model or a local AI model) may be defined with input attributes (e.g., type and characteristics of data that can be accepted as input to the AI model) and output attributes (e.g., type and characteristics of data that is generated as inference output by the AI model), as well as one or more targeted network task (i.e., the network problem or issue to be addressed by the inference data outputted by the AI model). The input attributes and output attributes of each AI model may be defined from a set of possible input attributes and a set of possible output attributes (respectively) that have been defined for the wireless system 400 as a whole (e.g., standardized according to a network standard). For example, a standard may specify that end-to-end latency can be used as input data to an AI model, but UE-AN latency cannot be used as input data; or a standard may specify that identification of a handover scheme may be inference output by an AI model, but a specific waveform cannot be inference output by an AI model. It may be up to developers of AI models to ensure that each AI model is designed to comply with the standardized input attributes and output attributes.

AI input processing functions provided by the AIMF 512 may include receiving input data (e.g., local data from the UEs 410 and/or the system nodes 420, which may be received via one or more AI execution modules 520), which may be used to train a global AI model. For example, the AI input processing functions may include implementing an AI-based protocol, as disclosed herein, for receiving AI-related input data from an AI execution module 520. The AI input processing functions may also include preprocessing received data (e.g., performing normalization, noise removal, etc.) to enable the data to be used for training and/or execution of a global AI model, and/or prior to storing the data in an AI database (e.g., the global AI database maintained using the AIMF 512, or an external AI database). In some embodiments, the input data may be data received from a UE, e.g. content fed back from the UE in response to a measurement request, such as in the manner described later in relation to FIG. 22.

AI output processing functions provided by the AIMF 512 may include outputting data (e.g., inference data generated by a global AI model, configuration data for configuring a local AI model, etc.). For example, the AIMF 512 may use an AI-based protocol as disclosed herein for communicating AI-related output data. The AI output processing functions may include providing output data to enable radio resource management (RRM). For example, the AI management module 510 may use a trained global AI model to output an inferred control parameter (e.g., transmit power, beamforming parameters, data rates, etc.) for RRM. The AIMF 512 may interface with another function responsible for performing RRM, to provide such AI-generated output. In some embodiments, the output data is sent to the UE in control information, e.g. via the two-stage DCI described later.

AI modeling configuration functions provided by the AIMF 512 may include configuring a global or local AI model. The AIMF 512 may be responsible for configuring global AI models of the AI management module 510, as well as providing configuration data for configuring local AI models (which are maintained by the AI execution module (s) 520 managed by the AI management module 510). Configuring a global or local AI model may include defining parameters of the AI model, such as selecting the global or local AI model to be used for performing a given network task, and may also include setting the initial weights of the global or local AI model. AI modeling configuration functions may also include configuring related relationships among more than one AI model (e.g., in examples of splitting one AI task or operation into sub-task roles or sub-task operations performed by multiple AI models). In some embodiments, the AI model may be configured to implement one or more of the air interface components described herein, e.g. the intelligent PHY 710, intelligent MAC 720, and/or the intelligent protocols 730 descried earlier.

AI training functions provided by the AIMF 512 may include carrying out training of a global AI model (using any suitable training algorithm, such as minimizing a loss function using backpropagation), and may include obtaining training data from a global AI database, for example. AI training functions may also include storing the results of the training (e.g., the trained parameters, such as optimized weights, of the global AI model). The parameters of a trained global AI model (e.g., the optimized weights of a global AI model) may be referred to as global model parameters.

AI execution functions provided by the AIMF 512 may include executing a trained global AI model (e.g., using the trained global model parameters), and outputting the generated inference data (using the AI output processing functions of the AIMF 512). For example, the inference data outputted as a result of execution of the trained global AI model may include one or more control parameters, for use in AI-based RRM.

AI database functions provided by the AIMF 512 may include operations for global data collection (e.g., collecting local data from UEs 410 and/or system nodes 420, which may be communicated via the AI execution module(s) 520 managed by the AI management module 510). The collected data may be stored in a global AI database, and may be used for training global AI models. Data maintained in the global AI database may include network data and may also include model data. In the present disclosure, network data may refer to data that is collected and/or generated by a node (e.g., UE 410 or system node 420, or the network node 431 in the case where the network node 431 has data collection capabilities) in normal real-life usage. Network data may include, for example, measurement data (e.g., measurements of network performance, measurements of traffic, etc.), monitored data (e.g., monitored network characteristics, monitored KPIs, etc.), device data (e.g., device location, device usage, etc.), and user data (e.g., user photographs, user videos, etc.), among others. In the present disclosure, model data may refer to data that is extracted and/or generated by an AI model (e.g., a local AI model or a global AI model). Model data may include, for example, parameters (e.g., trained weights) extracted from an AI model, configuration of an AI model (including identifier of the AI model), and inferred data generated by an AI model, among others. The data in the global AI database may be any data suitable for training an AI model. The AI database functions may also include standard database management functions, such as backup and recovery functions, archiving functions, etc.

The AIEF 522 may include AI management and configuration functions, AI input processing functions, AI output processing functions, AI training functions, AI execution functions and/or AI database functions. Some of the functions of the AIEF 522 may be similar to the functions of the AIMF 512, but performed in a more localized context (e.g., in the local context of the system node 420 (e.g., local to the AN) or in the local context of the UE 410, rather than globally (e.g., across multiple ANs)). One or more local AI models may be stored and/or maintained (e.g., trained) by the AI execution module 520 using functions of the AIEF 522. In the present disclosure a local AI model refers to an AI model that is implemented in a system node 420 (or optionally a UE 410). The local AI model may be trained on locally collected network data. For example, a local AI model may be obtained by adapting a global model to local network data (e.g., by performing further training to update globally-trained parameters, using measurements of the current network performance). A local AI model may be configured similarly to a global AI model (e.g., using global parameters communicated from the AI management module 510 to the AI execution module 520) that is deployed by the AI execution module 520 without further training on local network data (i.e., the local AI model may use the globally trained weights of the global AI model). The AI execution module 520 may also use functions of the AIEF 522 to maintain a local AI database and/or to access an external AI database (not shown). The local AI model(s) (and optionally the local AI database) may be stored in a memory coupled to the AI execution module 520 (e.g., a memory of a BS in which the AI execution module 520 is implemented, or a memory of a UE 410 which the AI execution module 520 is implemented).

AI management and configuration functions provided by the AIEF 522 may include configuring a local AI model (e.g., in accordance with AI model configuration information provided by the AI management module 510), configuring KPIs (e.g., in accordance with KPI configuration information provided by the AI management module 510) to be achieved locally (e.g., at the system node 420 or the UE 410), and updating a local AI model (e.g., updating parameters of the local AI model, based on updated global model parameters communicated by the AI management module 510 and/or based on local training of the local AI model).

AI input processing functions provided by the AIEF 522 may include receiving input data (e.g., network data and/or model data collected from UE(s) 410 serviced by the system node 420 in which the AI execution module 520 is implemented, network data collected by the UE 410 in which the AI execution module 520 is implemented, or network data collected by the system node 420 in which the AI execution module 520 is implemented), which may be used to train a local AI model. AI input processing functions may also include preprocessing received data (e.g., performing normalization, noise removal, etc.) to enable the collected data to be used for training and/or execution of a local AI model, and/or prior to storing the collected data in an AI database (e.g., the local AI database maintained using the AIEF 522, or an external AI database).

AI output processing functions provided by the AIEF 522 may include outputting data (e.g., inference data generated by a local AI model). In some examples, if the AI execution module 520 is implemented in a system node 420 that serves one or more UEs 410, the AI output processing functions may include outputting configuration data to configure a local AI model of a UE 410 served by the system node 420. The AI output processing functions may include providing output data for configuring RRM functions at the system node 420.

AI training functions provided by the AIEF 522 may include carrying out training of a local AI model (using any suitable training algorithm), and may include obtaining real-time network data (e.g., data generated in real-time from real-world operation of the wireless system 400), for example. Training of the local AI model may include initializing parameters the local AI model according to a global AI model (e.g., according to parameters of a global AI model, as provided by the AI management module 510), and updating the parameters (e.g., weights) by training the local AI model on local real-time network data. AI training functions may also include storing the results of the training (e.g., the trained model parameters, such as optimized weights, of the local AI model). The parameters of a trained local AI model (e.g., the optimized weights of a local AI model) may be referred to as local model parameters.

AI execution functions provided by the AIEF 522 may include executing a local AI model (e.g., using locally trained model parameters or using global model parameters provided by the AI management module 510), and outputting the generated inference data (using the AI output processing functions of the AIEF 522). For example, the inference data outputted as a result of execution of the trained local AI model may include one or more control parameters for use in AI-based RRM at the system node 420.

AI database functions provided by the AIEF 522 may include operations for local data collection. For example, if the AI execution module 520 is implemented in a system node 420, the AI database functions may include collecting local data from the system node 420 itself (e.g., network data generated or measured by the system node 420) and/or collecting local data from one or more UEs 410 served by the system node 420 (e.g., network data generated or measured by the UE(s) 410 and/or model data (such as model weights) extracted from local AI model(s) implemented at the UE(s) 410). If the AI execution module 520 is implemented in a UE 410, the AI database functions may include collecting local data from the UE 410 itself (e.g., network data generated or measured by the UE 410 itself). The collected data may be stored in a local AI database, and may be used for training local AI models. Data maintained in the global AI database may include network data (e.g., measurements of network performance, monitored network characteristics, etc.) and may also include model data (e.g., local model parameters, such as model weights). The AI database functions may also include standard database management functions, such as backup and recovery functions, archiving functions, etc.

Each of the AI management module 510 and the AI execution modules 520 also provides AI-base control functions (AICF) 514, 524. As illustrated in FIGS. 9-11, the AICF 514 is generally co-located with the AIMF 512 in the AI management module 510, and the AICF 524 is generally co-located with the AIEF 522 in the AI execution module 520. The AICF 514 of the AI management module 510 and the AICF 524 of the AI execution modules 520 may be similar, differing only in context (e.g., the AICF 514 of the AI management module 510 processes inputs and outputs for the AIMF 512; and the AICF 524 of the AI execution module 520 processes inputs and outputs for the AIEF 520). Accordingly, the AICF 514 of the AI management module 510 and the AICF 524 of the AI execution modules 520 will be discussed together.

The AICF 514, 524 may include functions for converting (or translating) inference data generated by AI model(s) (global AI model(s) in the case of the AICF 514 in the AI management module 510, and local AI model(s) in the case of the AICF 524 in the AI execution module 520) into a format suitable for configuring a control module for wireless communications (e.g., output from an AI model may be in an AI-specific language or format that is not recognizable by the control module). For example, a global AI model may generate inference data that indicates a coding scheme to use, where the coding scheme is indicated by a label or AI model output codeword(s) (e.g., encoded as a one-hot vector). The AICF 514 may convert the label into a coding scheme index that is recognizable by RRM control modules. The AICF 514, 524 may also include providing a general interface for communication with other functions and modules in the wireless system 400. For example, the AICF 514, 524 may provide application programming interfaces (APIs) for communications between the AI management module 510 and the AI execution module 520, between the AI execution module 520 and control modules (e.g., software modules related to wireless communication functionality) of the system node 420, between the AI execution module 520 and one or more UEs 410, etc. In generation, an API is a computing interface that defines interactions between multiple software intermediaries. An API typically defines the calls or requests that can be made, how to make them, and the data formats that should be used.

The AICF 514, 524 may also include distributing control parameters generated by AI model(s) (global AI model(s) in the case of the AICF 514 in the AI management module 510, and local AI model(s) in the case of the AICF 524 in the AI execution module 520) to appropriate system control modules.

The AICF 514, 524 may also facilitate data collection by providing a common interface for communication of AI-related data between the AI execution module 520 and the AI management module 510. For example, the AICF 514, 524 may be responsible for implementing the AI-based protocol as disclosed herein.

The AICF 514, 524 may provide a common interface to enable global and/or local AI models to be managed, owned and/or updated by any other entity in the wireless system 400, including an external network 450 or third-party service.

As previously mentioned, the AI management module 510 and the AI execution modules 520 provide multi-level (or hierarchical) AI management and control in the wireless system 400, where the AI management module 510 is responsible for global (or centralized) operations and the AI execution modules 520 are responsible for local operations. Further, the AI management module 510 manages global AI models, including collection of global data and training the global AI models. Each AI execution module 520 performs operations to collect local data at each system node 420 (and optionally from one or more UEs 410). The local data collected at each system node 420 (and optionally from each UE 410) may be collected by the AI management module 510 (using the AIMF 512 and AICF 514) and aggregated to the global data. It should be noted that the global data is typically collected in a non-real-time (non-RT) manner (e.g., at time intervals on the order of 4 ms to about 4s), and one or more global AI models may be trained (using the AIMF 512) also in a non-RT manner, after the global AI database has been updated with the collected global data. Accordingly, the AI management module 510 may perform operations to train a global AI model to perform inference for baseline (and slow to change) wireless functions, such as inferring global parameters for mobility control and MAC control. A global AI model may also be trained to perform inference for baseline performance of more dynamic wireless functions, for example as a starting point for executing and/or further training of a local AI model.

An example of inference data that may be outputted by a trained global AI model may be inferring power control for MAC layer control (e.g., generating inference output for the expected received power level Po, compensation factor alpha, etc.). Another example may be using a trained global AI model to infer parameters for performing massive multiple-input multiple-output (massive MIMO) (e.g., generating inference output for rank, antenna, pre-coding, etc.). Another example may be using a trained global AI model to infer parameters for beamforming optimization (e.g., generating inference output for configuring multiple beam directions, gain configurations, etc.). Other examples of inference data that may be outputted by a trained global AI model my include inferring parameters for inter-RAN or inter-cell resource allocation to enhance resource utilization efficiency or reduce the inter-cell/RAN interference, MAC scheduling in one cell or cross-cell scheduling, among other possibilities.

Compared to the global data collection and global AI model training performed by the AI management module 510, the local data collection and local AI model training performed by the AI execution module 520 may be considered to be dynamic and in real-time or near-real-time (near-RT). The local AI model may be trained to adapt to the varying conditions of the local, dynamic network environment, to enable timely and responsive adjustment of parameters. The collection of local network data and training of local AI models by the AI execution module 520 is typically performed in real-time or near-RT (e.g., at time intervals on the order of several microseconds to several milliseconds). Training of local AI models may be performed using relatively quick training algorithms (e.g., requiring fewer training iterations compared to training of global AI models). For example, a trained local AI model may be used to infer parameters for radio resource control for the functionalities of the CU and DU logical layers of a system node 420 (e.g., parameters for controlling functionalities such as mobility control, RLC MAC, as well as PHY parameters such as remote radio unit (RRU)/antenna configurations). The AI execution module 520 may configure control parameters semi-statically (e.g., using RRC signaling), based on inference data generated by a local AI model and/or based on configuration information in a configuration message from the AI management module 510.

In general, the AI management module 510 and the AI execution module 520 may be used to implement AI-based wireless communications, in particular AI-based control of wireless communication functionalities. The AI management module 510 is responsible for global (or centralized training) of global AI models, to generate global (or baseline) control parameters. The AI management module 510 is also responsible for setting the configuration of local AI model(s) (e.g., implemented by the AI execution module 520) as well as the configuration for local data collection. The AI management module 510 may provide model parameters for deploying a local AI model at an AI execution module 520. For example, the AI management module 510 may provide global model parameters, including coarsely tuned or baseline-trained parameters (e.g., model weights) that may be used to initialize a local AI model and that may be further updated to adapt to the local network data collected by the AI execution module 520.

Configuration information (e.g., configuration information for implementing local AI model(s), configuration information for collection of local data, etc.) from the AI management module 510 may be communicated to a system node 420 in the form of configuration message(s) (e.g., radio resource control (RRC) or downlink control information (DCI) message(s)) that can be received and recognized by the AI execution module 520. The AI execution module 520 may (e.g., using the AICF 524) convert the configuration information from the AI management module 510 into standardized configuration control to be implemented by the system node 420 itself and/or one or more UEs 410 associated with the system node 420. Configuration information communicated by the AI management module 510 may include parameters for configuring individual control modules of the system node 420 and/or UE 410, and may also include parameters for configuration of the system node 420 and/or UE 410 (e.g., configuration of operations to measure and collect local data). As will be discussed further below, communications between the AI management module 510 and the AI execution module 520 enable continuous collection of data and continuous updating of AI models, to enable responsive control of wireless functionality in a dynamically varying network environment.

The explanation herein describes global AI models and local AI models (generally referred to as AI models) designed to generate inference data related to optimization of wireless communication functionalities. It should be understood that, in the context of the present disclosure, an AI model may be designed to generate inference data that is not related to just a single, specific optimization feature (e.g., using an AI module to perform channel estimation). Rather, an AI model may be designed and deployed to generate inference data that may optimize control parameters for one or more control modules related to wireless communications. Each AI model may be defined by an associated network task that the AI model is designed for. Further, each AI model may be defined by a set of one or more input-related attributes (defining the type or characteristic of data that can be used as input by the AI model) and also may be defined by a set of one or more output-related attributes (defining the type or characteristic of data is generated by the AI model as output). Some examples are discussed below, however these are not intended to be limiting.

In the context of the present disclosure, a requested service is considered to be a type of requested network task (i.e., the network task is to provide the requested service). Accordingly, the term network task in the present disclosure should be understood to include providing a service. A given network task may have multiple requirements to be satisfied, which may include satisfying multiple KPIs. For example, an ultra-reliable low-latency communication (URLLC) service in a wireless network may need to satisfy associated KPIs including latency (e.g., latency of no more than 5 ms end-to-end) and reliability (e.g., reliability of 99.9999% or higher) requirements. One or more AI models may be associated with respective one or more network tasks for achieving the requirements. The network task associated with a given AI model may be defined at the time the AI model is developed, for example. Tasks may include or involve implementing one or more air interface components, and performing the measurement and feedback described later (e.g. in relation to FIG. 22), etc.

The AI management module 510 has access to multiple global AI models (e.g., 400 different global AI models or more), each defined by an associated network task. For example, the AI management module 510 may manage or have access to a repository of global AI models that have been developed for various network tasks. The AI management module 510 may receive a task request (e.g., from a customer of the wireless system 400, or from a node within the wireless system 400), which may be associated with one or more task requirements such as one or more KPIs to be satisfied (e.g., a required latency, required QoS, required throughput, etc.), an application type to service, a traffic type to service, or other such requirements. The AI management module 510 may analyze the requirements (including KPI requirements) associated with the task request, and select one or more global AI models that are associated with a respective network task for achieving the requirements. The selected one or more global AI models may individually or together generate inferred control parameters for achieving the requirements. The selection of which global AI model(s) to use for a given network task may be based on not only the associated network task defined for each global AI model, but also may be based on the set of input-related attributes and/or the set of output-related attributes defined for each global AI model. For example, if a given network task relates to a specific traffic type (e.g., video traffic), then the AI management module 510 may select a global AI model whose input-related attributes indicate that measurements of video traffic network data are accepted as input data to the global AI model.

The set of input-related attributes associated with a given AI model may be a subset of all possible input-related attributes accepted by the AI management module 510 (e.g., as defined by a network standard). For example, the AI management module 510 may provide an interface (e.g., using functions of the AICF 514) to accept input data having attributes are defined by a network standard. For example, input-related attributes may define one or more of: what type(s) of raw data generated by the wireless network may be accepted as input data; what output(s) generated by one or more other AI models may be accepted as input data; what type(s) of network data or measurement collected from a UE 410 and/or system node 420 may be used for training (e.g., pilot signals, decoded sidelink control information (SCI), latency measurement, throughput measurement, signal-to-inference-plus-noise ratio (SiNR) measurement, interference measurement, etc.); acceptable format(s) of input data for training; one or more APIs for interacting with other software modules (e.g., to receive input data); which system node(s) 420 and/or UE(s) 410 can participate in providing input data to the AI model; and/or one or more data transfer protocols to be used for communicating input data; among others.

The set of output-related attributes associated with a given AI model may be a subset of all possible output-related attributes for the AI management module 510 (e.g., as defined by a network standard). For example, the AI management module 510 may provide an interface (e.g., using functions of the AICF 514) to output data having attributes are defined by a network standard. For example, output-related attributes may define one or more of: which system node(s) 420 and/or UE(s) 410 are the target of the inference output; and/or which control parameter(s) of are the target of the inference output (e.g., mobility control parameters, inter-AN resource allocation parameters, intra-AN resource allocation parameters, power control parameters, MAC scheduling parameters, modulation and coding scheme (MCS) options, automatic repeat request (ARQ) or hybrid ARQ (HARQ) scheme options, waveform options, MIMO or antenna configuration parameters, beamforming configuration parameters and/or other MIMO related parameters, TRP layout parameters, beam management parameters, spectrum utilization parameters, channel resource allocation parameters, interference management parameters, etc.; among others).

Based on the associated task defined for a global AI model, and optionally also based on the set of input-related attributes and/or the set of output-related attributes defined for the global AI model, the AI management module 510 may identify one or more global AI models for performing a network task, in accordance with a task request. The AI management module 510 may train the selected global AI model(s) on non-RT global data, and execute the trained global AI model(s) to generate one or more globally inferred control parameters. The globally inferred control parameter (s) may be communicated as configuration information to one or more AI execution modules 520, to configure one or more system nodes 420 and/or UEs 410. The AI management module 510 may also communicate the trained global model parameters (e.g., trained weights) of the global AI model(s) as part of the configuration information. The model parameters may be used at the one or more AI execution modules 520 to configure corresponding local AI model(s) (e.g., to initialize the model parameters of local AI model (s)). The configuration information may also configure the one or more AI execution modules 520 to collect local network data relevant to the network task. The control parameter(s) and the model parameters communicated by the AI management module 510 may be sufficient to configure the system node(s) 420 and/or UE(s) 410 to satisfy the network task (i.e., without the AI execution module(s) 520 performing further training of the local AI model(s) using local network data). In other example, the AI execution module(s) 520 may perform near-RT training of the local AI model(s), using collected local network data, to adapt the local AI model(s) to the dynamic local network environment and to generate updated local control parameter(s) that may better satisfy the network task locally.

For example, if the AI management module 510 receives a task request for low latency service, a global AI model designed to control for latency sensitivity may be selected to infer control parameters for associated control modules (e.g., control parameters for MAC scheduling, power control, beamforming, mobility control, etc.). The AI management module 510 may perform baseline, non-RT training of the selected global AI model(s) to generate one or more globally inferred control parameters related to latency. The trained global model parameters (e.g., trained weights) and/or globally inferred control parameter(s) may then be communicated by the AI management module 510 to be implemented in one or more system nodes 420. For example, the global model parameters may be implemented in corresponding local AI model(s) by the AI execution module 520 at a given system node 420. The local AI model(s) may be executed (using the global model parameters) to generate local control parameter(s) related to latency. The local AI model(s) may be optionally updated (using near-RT training) using local network data collected at the system node 420. The updated local AI model(s) may then be executed to infer updated local control parameter(s) to control for latency, according to the dynamic local environment of the system node 420.

It should be understood that the present disclosure is not intended to be limited by the inference data that may be generated by an AI model (whether a global AI model or a local AI model) or the network task that may be addressed by an AI model in the context of a wireless network. Further, it should be understood that an AI model may be designed and trained to output an inference data that optimizes more than one parameter (e.g., to infer optimized parameters for multiple power control parameters), and the present disclosure should not be limited to any specific type of AI model.

Thus, in some embodiments, there is a network task-driven approach to defining AI models (including global AI models and local AI models). In addition to the network task (which may include network services) defined for each AI model, each AI model may be defined by a set of input-related attributes and a set of output-related (or inference-related) attributes. Defining an AI model based on the network task to be addressed, the inputs and the outputs may enable any AI developer to develop and provide an AI model according to the definition. This may simplify the process of developing and implementing new AI models, and may enable greater participation from third-party AI services.

Figure 12:
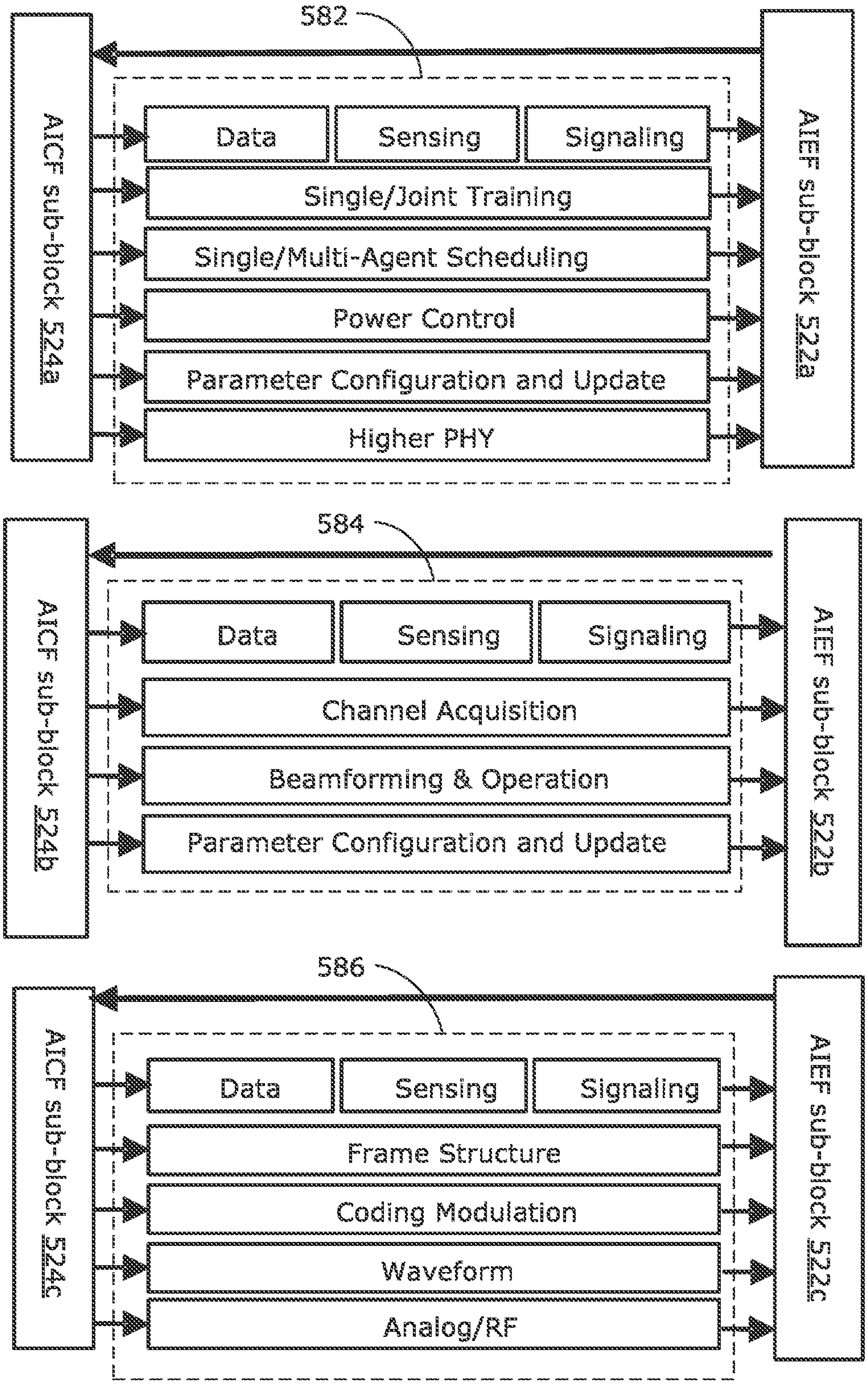
Figure 13:
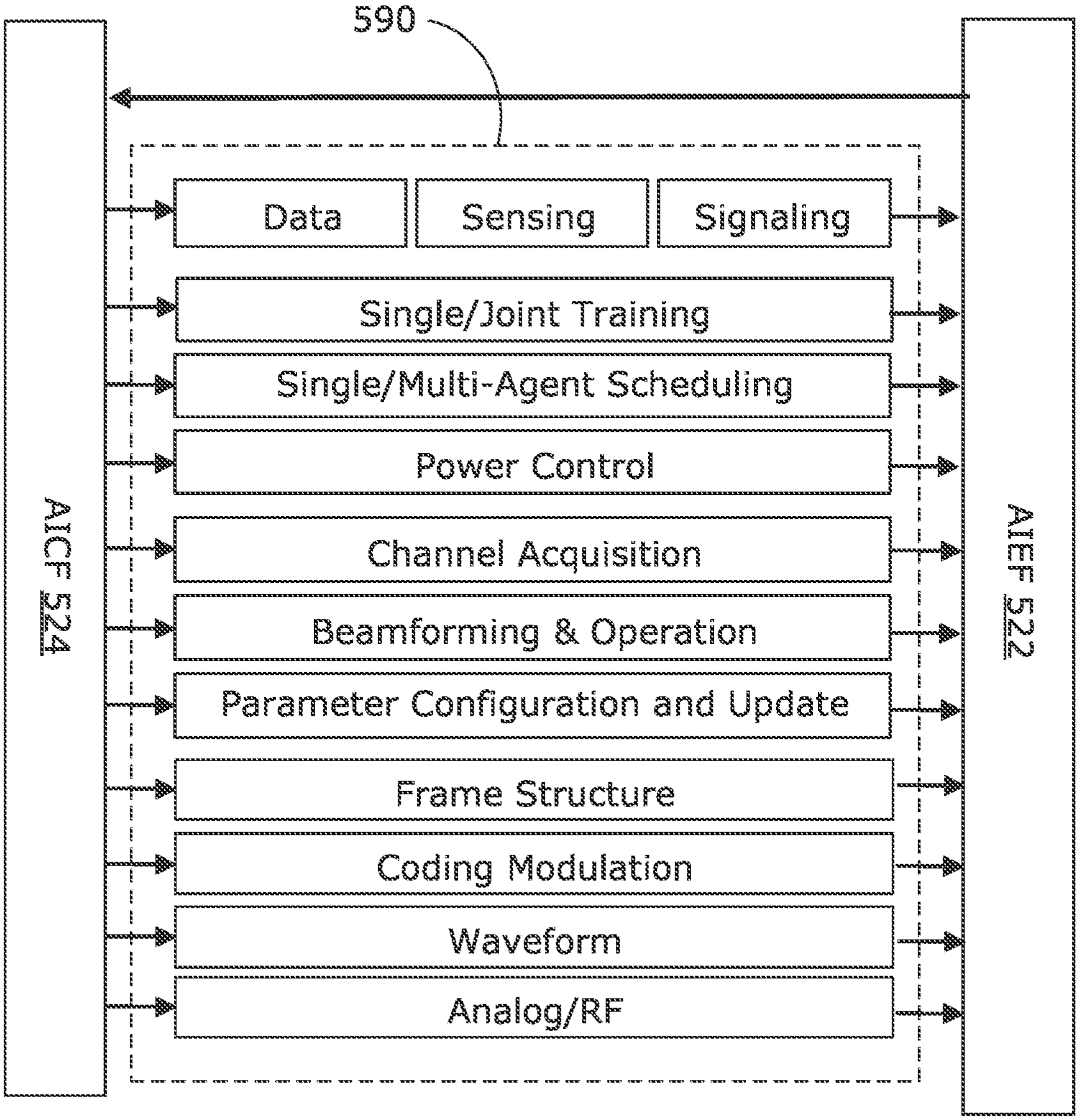
Figure 14:
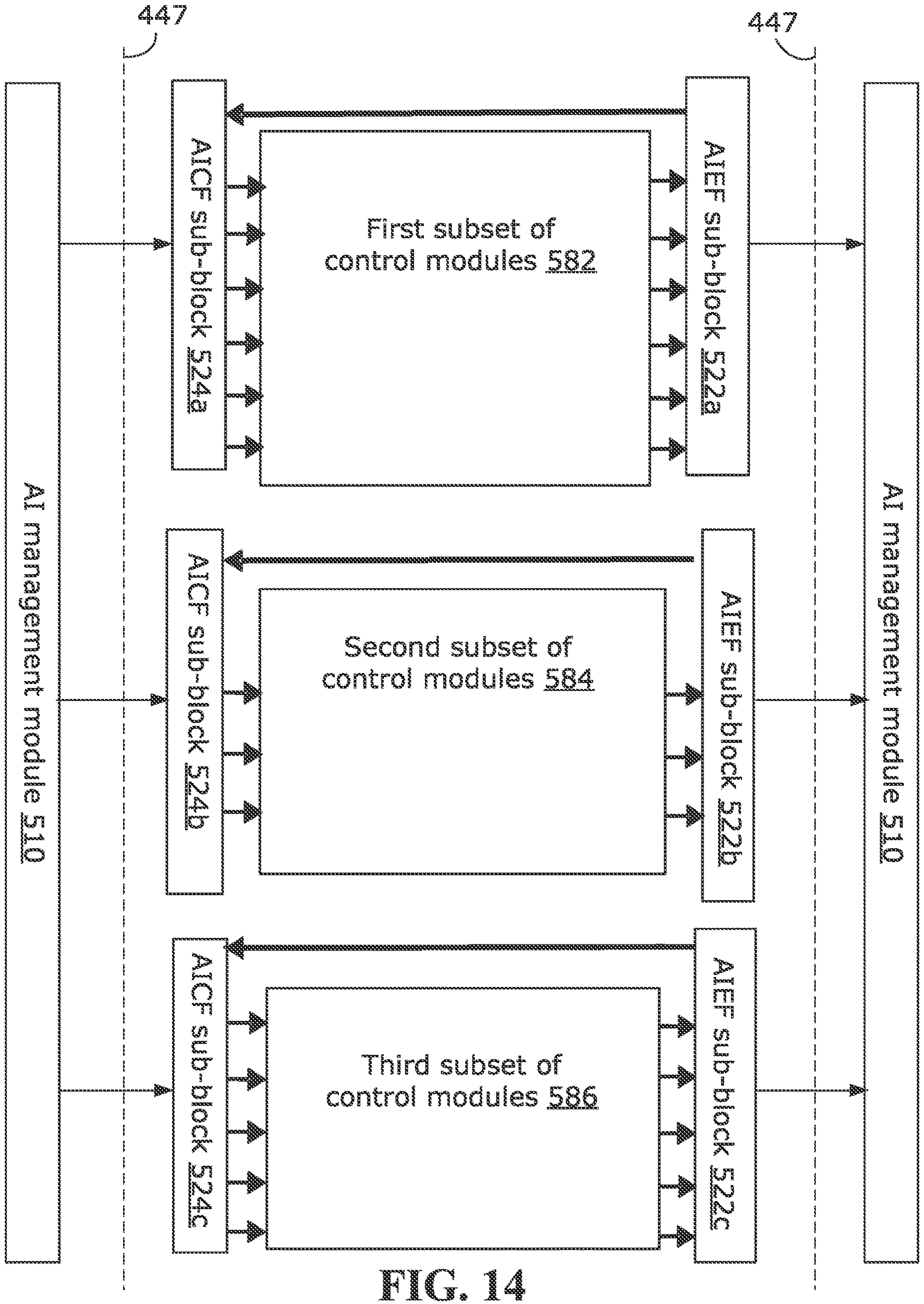

FIGS. 12-14 illustrate examples of how logical layers of a system node 420 or UE 410 may communicate with the AI execution module 520. For ease of understanding, the AIEF 522 and the AICF 524 of the AI execution module 520 are illustrated as separated blocks (and in some cases illustrated as separate sub-blocks). However, it should be understood that the AIEF 522 and the AICF 524 blocks and sub-blocks are not necessary independent functional blocks, and that the AIEF 522 and the AICF 524 blocks and sub-blocks may be intended to function together within AI execution module 520.

FIG. 12 shows an example of a distributed approach to controlling the logical layers. In this example, the AIEF 522 and AICF 524 are logically divided into sub-blocks 522*a-c* and 524*a-c*, respectively, to control the control modules of the system node 420 or UE 410 corresponding to different logical layers. The sub-blocks 522*a-c* may be logical divisions of the AIEF 522, such that the sub-blocks 522*a-c* all perform similar functions but are responsible for controlling a defined subset of the control modules of the system node 420 or UE 410. Similarly, the sub-blocks 524*a-c* may be logical divisions of the AICF 524, such that the sub-blocks 524*a-c* all perform similar functions but are responsible for communicating with a defined subset of the control modules of the system node 420 or UE 410. This may enable each sub-block 522*a-c* and 524*a-c* to be located more closely to the respective subset of control modules, which may allow for faster communication of control parameters to the control modules.

In the example of FIG. 12, a first logical AIEF sub-block 522*a* and a first logical AICF sub-block 524*a* provide control to a first subset of control modules 582. For example, the first subset of control modules 582 may control functions of the higher PHY layers (e.g., single/joint training functions, single/multi-agent scheduling functions, power control functions, parameter configuration and update functions, and other higher PHY functions). In operation, the AICF sub-block 524*a* may output one or more control parameters (e.g., received from the AI management module 510 and/or generated by one or more local AI models and outputted by the AIEF sub-block 522*a*) to the first subset of control modules 582. Data generated by the first subset of control modules 582 (e.g., network data collected by the control modules 582, such as measurement data and/or sensed data, which may be used for training local and/or global AI models) are received as input by the AIEF sub-block 522*a*. The AIEF sub-block 522*a* may, for example, preprocess this received data and use the data as near-RT training data for one or more local AI models maintained by the AI execution module 520. The AIEF sub-block 522*a* may also output inference data generated by one or more local AI models to the AICF sub-block 524*a*, which in turn interfaces (e.g., using a common API) with the first subset of control modules 582 to provide the inference data as control parameters to the first subset of control modules 582.

A second logical AIEF sub-block 522*b* and a second logical AICF sub-block 524*b* provide control to a second subset of control modules 584. For example, the second subset of control modules 584 may control functions of the MAC layer (e.g., channel acquisition functions, beamforming and operation functions, and parameter configuration and update functions, as well as functions for receiving data, sensing and signaling). The operation of the AICF sub-block 524*b* and the AIEF sub-block 522*b* to control the second subset of the control modules 584 may be similar to that described above.

A third logical AIEF sub-block 522*c* and a third logical AICF sub-block 524*c* provide control to a third subset of control modules 586. For example, the third subset of control modules 586 may control functions of the lower PHY layers (e.g., controlling the frame structure, coding modulation, waveform, and analog/radiofrequency (RF) parameters). The operation of the AICF sub-block 524*c* and the AIEF sub-block 522*c* to control the third subset of the control modules 586 may be similar to that described above.

FIG. 13 shows an example of an undistributed (or centralized) approach to controlling the logical layers. In this example, the AIEF 522 and AICF 524 control all control modules 590 of the system node 420 or UE 410, without division by logical layer. This may enable more optimized control of the control modules. For example, a local AI model may be implemented at the AI execution module 520 to generate inference data for optimizing control at different logical layers, and the generated inference data may be provided by the AIEF 522 and AICF 524 to the corresponding control modules, regardless of the logical layer.

The AI execution module 520 may implement the AIEF 522 and AICF 524 in a distributed manner (e.g., as shown in FIG. 12) or an undistributed manner (e.g., as shown in FIG. 13). Different AI execution modules 520 (e.g., implemented at different system nodes 420 and/or different UEs 410) may implement the AI execution module 520 in different ways. The AI management module 510 may communicate with the AI execution module 520 via an open interface whether a distributed or undistributed approach is used at the AI execution module 520.

Figure 16:
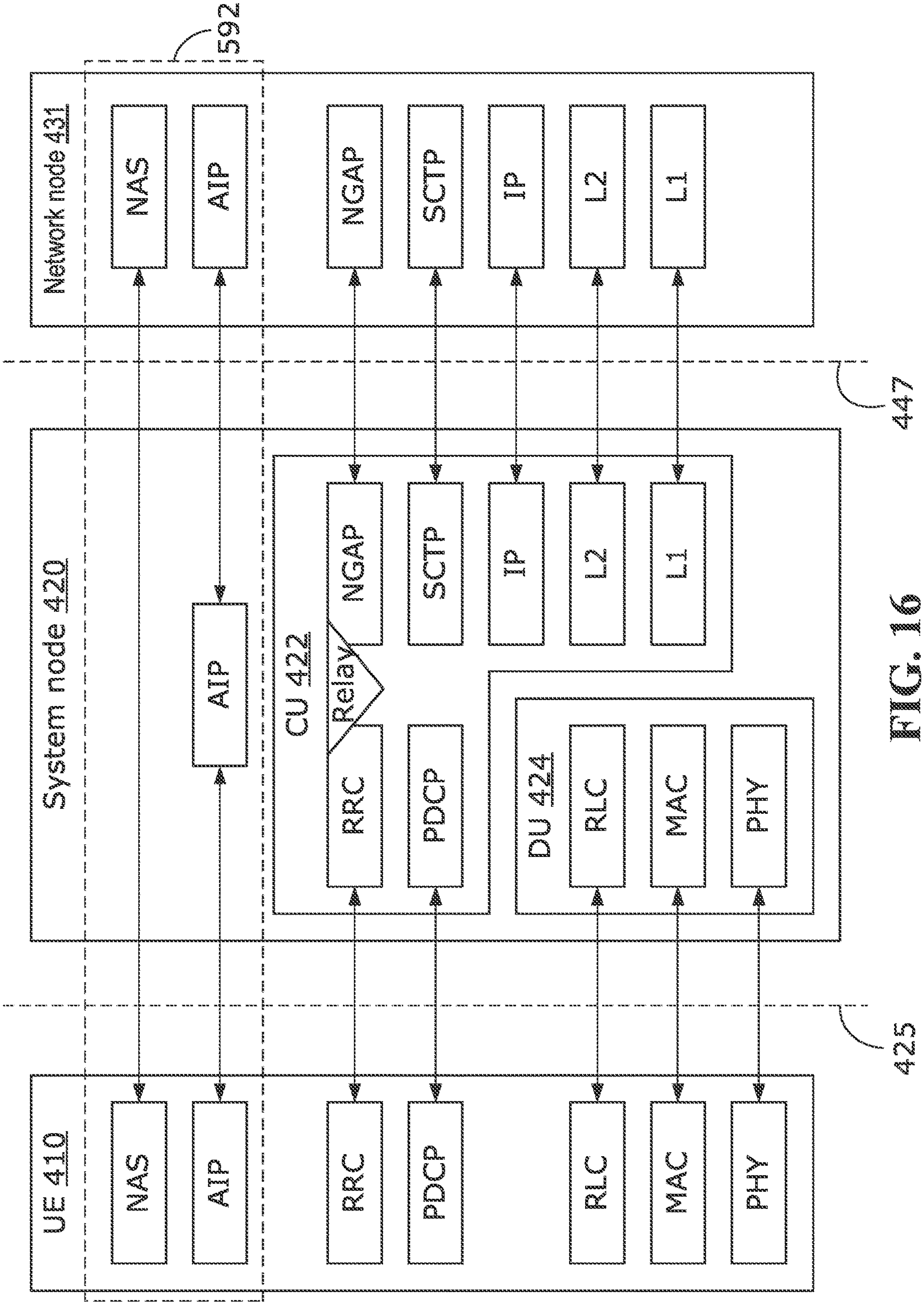
Figure 17:
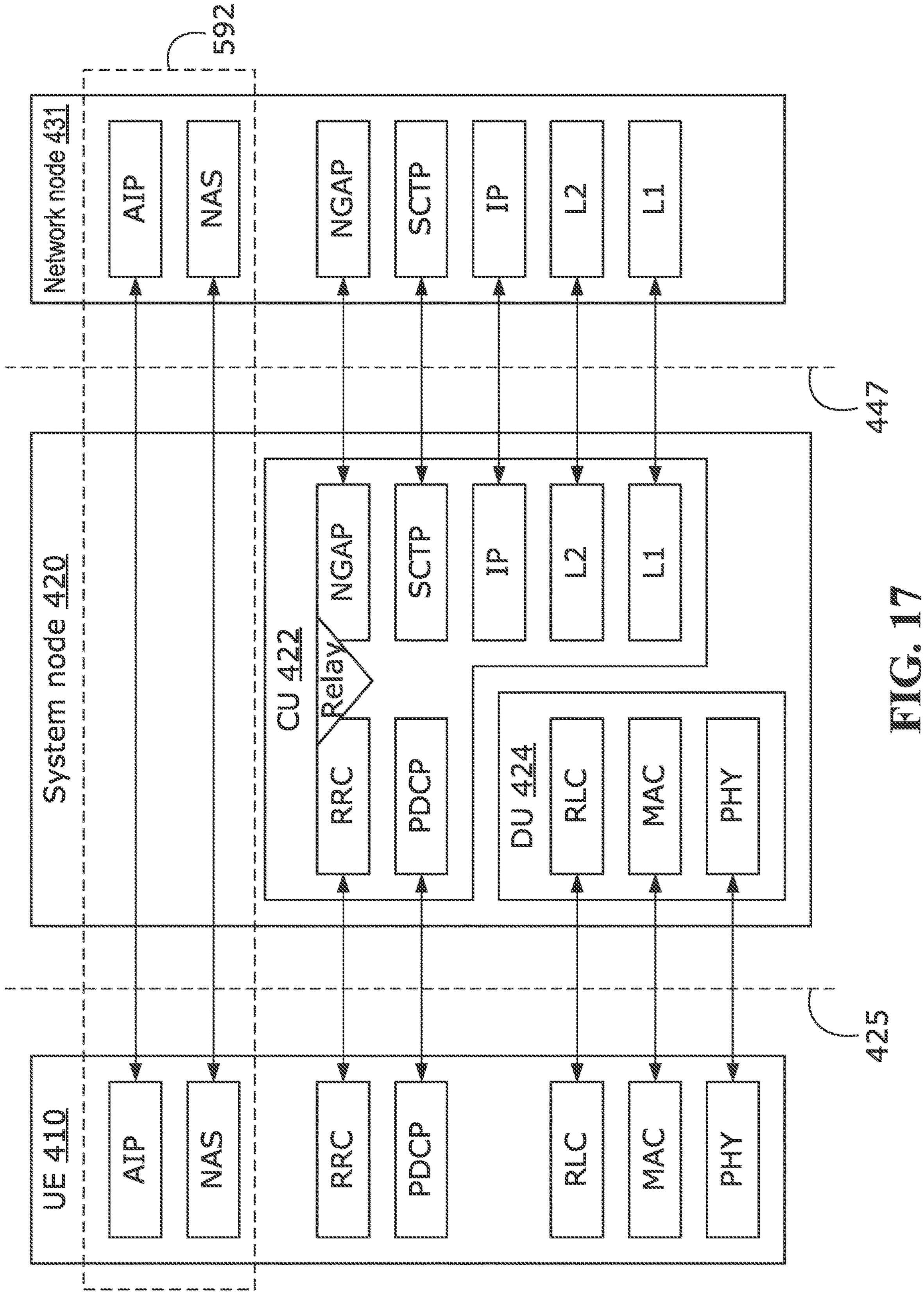

FIG. 14 illustrates an example of the AI management module 510 communicating with the sub-blocks 522*a-c* and 524*a-c* via an open interface, such as the interface 447 as illustrated in FIG. 16 or FIG. 17 (although the interface 447 is shown, it should be understood that other interfaces may be used). In this example, the AIEF 522 and AICF 524 are implemented in a distributed manner, and accordingly the AI management module 510 provides distributed control of the sub-blocks 522*a-c* and 524*a-c* (e.g., the AI management module 510 may have knowledge of which sub-blocks 522*a-c* and 524*a-c* communicate with which subset of control modules). It should be noted that FIG. 14 shows two instances of the AI management module 510 in order to illustrate the flow of communication, however there may be only one instance of the AI management module 510 in actual implementation. Data from the AI management module 510 (e.g., control parameters, model parameters, etc.) may be received by the AICF sub-blocks 524*a-c* via the interface 447, and used to control the respective control modules. Data from the AIEF sub-blocks 522*a-c* (e.g., model parameters of local AI models, inference data generated by local AI models, collected local network data, etc.) may be outputted to the AI management module 510 via the interface 447.

Communication of AI-related data (e.g., collected network data, model parameters, etc.) may be performed over an AI-related protocol. The present disclosure describes an AI-related protocol that is communicated over a higher level AI-dedicated logical layer. In some embodiments of the present disclosure, an AI control plane is disclosed.

Figure 15:
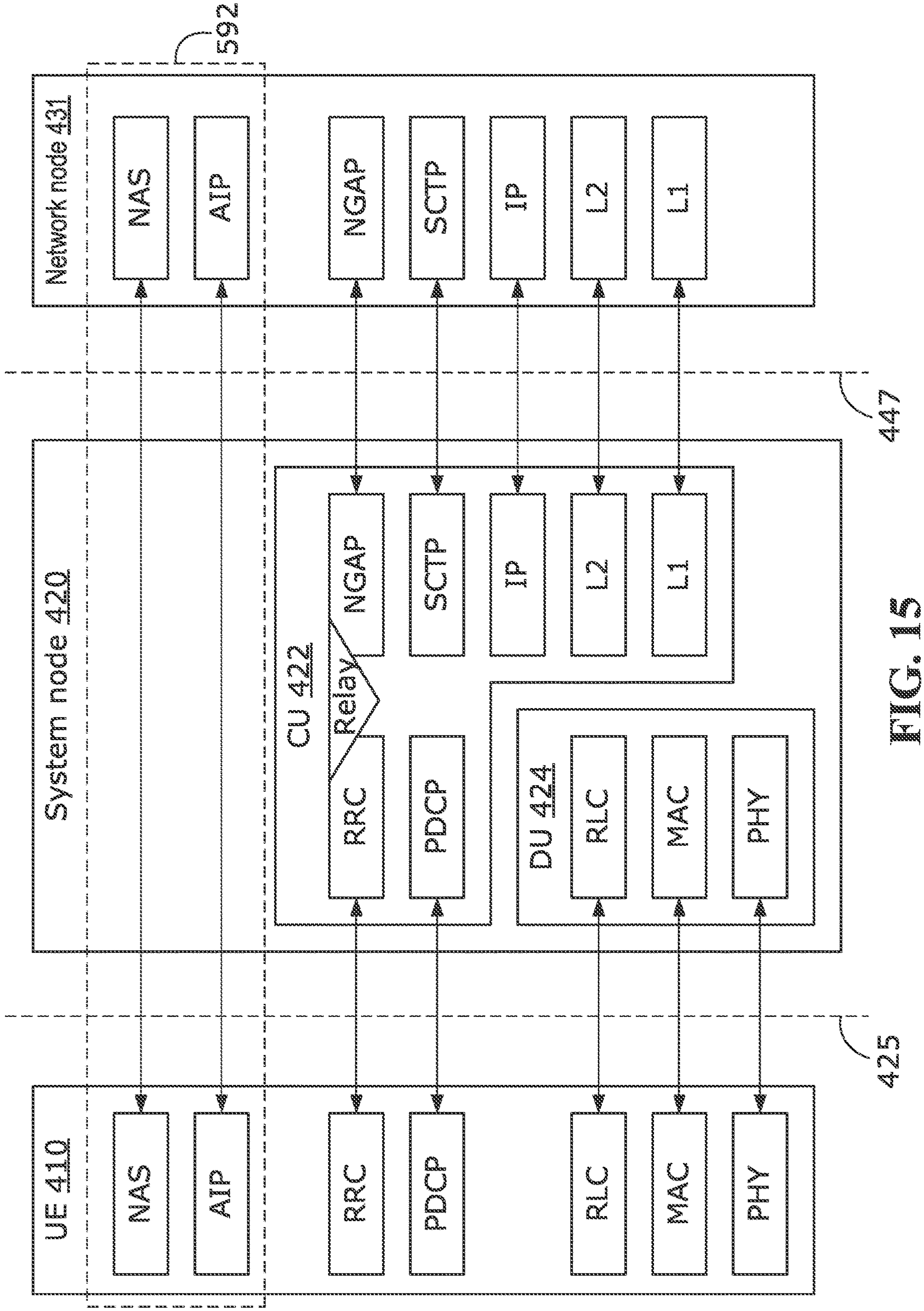

FIG. 15 is a block diagram illustrating an example implementation of an AI control plane (A-plane) 592 on top of the existing protocol stack as defined in 5G standards. In existing 5G standards, the protocol stack at the UE 410 includes, from the lowest logical level to the highest logical level, the PHY layer, the MAC layer, the RLC layer, the PDCP layer, the RRC layer, and the non-access stratum (NAS) layer. At the system node 420, the protocol stack may be split into the centralized unit (CU) 422 and the distributed unit (DU) 424. It should be noted that the CU 422 may be further split into CU control plane (CU-CP) and CU user plane (CU-UP). For simplicity, only the CU-CP layers of the CU 422 are shown in FIG. 15. In particular, the CU-CP may be implemented in a system node 420 that implements the AI execution module 520 for the AN. In the example shown, the DU 424 includes the lower level PHY, MAC and RLC layers, which facilitate interactions with corresponding layers at the UE 410. In this example, the CU 422 includes the higher level RRC and PDCP layers. These layers of the CU 422 facilitate control plane interactions with corresponding layers at the UE 410. The CU 422 also includes layers responsible for interactions with the network node 431 in which the AI management module 510 is implemented, including (from low to high) the L1 layer, the L2 layer, the internet protocol (IP) layer, the stream control transmission protocol (SCTP) layer, and the next-generation application protocol (NGAP) layer (each of which facilitates interactions with corresponding layers at the network node 431). A communication relay in the system node 420 couples the RRC layer with the NGAP layer. It should be noted that the division of the protocol stack into the CU 422 and the DU 424 may not be implemented by the UE 410 (but the UE 410 may have similar logical layers in the protocol stack).

FIG. 15 shows an example in which the UE 410 (where the AI execution module 520 is implemented at the UE 410) communicates AI-related data with the network node 431 (where the AI management module 510 is implemented), where the system node 420 is transparent (i.e., the system node 420 does not decrypt or inspect the AI-related data communicated between the UE 410 and the network node 431). In this example, the A-plane 592 includes higher layer protocols, such as an AI-related protocol (AIP) layer as disclosed herein, and the NAS layer (as defined in existing 5G standards). The NAS layer is typically used to manage the establishment of communication sessions and for maintaining continuous communications between the core network 430 and the UE 410 as the UE 410 moves. The AIP may encrypt all communications, ensuring secure transmission of AI-related data. The NAS layer also provides additional security, such as integrity protection and ciphering of NAS signaling messages. In existing 5G protocol stacks, the NAS layer is the highest layer of the control plane between the UE 410 and the core network 430, and sits on top of the RRC layer. In the present disclosure, the AIP layer is added, and the NAS layer is included with the AIP layer in the A-plane 592. At the network node 431, the AIP layer is added between the NAS layer and the NGAP layer. The A-plane 592 enables secure exchange of AI-related information, separate from the existing control plane and data plane communications. It should be noted that, in the present disclosure, AI-related data that may be communicated to the network node 431 (e.g., from the UE 410 and/or system node 420) may include raw (i.e., unprocessed or minimally processed) local data (e.g., raw network data) as well as processed local data (e.g., local model parameters, inferred data generated by local AI model(s), anonymized network data, etc.). Raw local data may be unprocessed network data that can include sensitive user data (e.g., user photographs, user videos, etc.), and thus it may be important to provide a secure logical layer for communication of such sensitive AI-related data.

The AI execution module 520 at the UE 410 may communicate with the system node 420 over an existing air interface 425 (e.g., a Uu link as currently defined in 5G wireless technology), but over the AIP layer to ensure secure data transmission. The system node 420 may communicate with the network node 431 over an AI-related interface (which may be a backhaul link currently not defined in 5G wireless technology), such as the interface 447 shown in FIG. 15. However, it should be understood that communication between the network node 431 and the system node 420 may alternatively be via any suitable interface (e.g., via interfaces to the core network 430, as shown in FIG. 15). The communications between the UE 410 and the network node 431 over the A-plane 592 may be forwarded by the system node 420 in a completely transparent manner.

FIG. 16 illustrates an alternative embodiment. FIG. 16 is similar to FIG. 15, however the AI execution module 520 at the system node 420 is involved in communications between the AI execution module 520 at the UE 410 and the AI management module 510 at the network node 431. As shown in FIG. 16, the system node 420 may process AI-related data using the AIP layer (e.g., decrypt, process and re-encrypt the data), as an intermediary between the UE 410 and the network node 431. The system node 420 may make use of the AI-related data from the UE 410 (e.g., to perform training of a local AI model at the system node 420. The system node 420 may also simply relay the AI-related data from the UE 410 to the network node 430. This may expose UE data (e.g., network data locally collected at the UE 410) to the system node 420 as a tradeoff for the system node 420 taking on the role of processing the data (e.g., formatting the data into an appropriate message) for communication to the AI management module 510 and/or to enable the system node 420 to make use of the data from the UE 410. It should be noted that communication of AI-related data between the UE 410 and the system node 420 may also performed using the AIP layer in the A-plane 592 between the UE 410 and the system node 420.

FIG. 17 illustrates another alternative embodiment. FIG. 17 is similar to FIG. 15, however the NAS layer sits directly on top of the RRC layer at the UE 410, and the AIP layer sits on top of the NAS layer. At the network node 431, the AIP layer sits on top of the NAS layer (which sits directly on top of the NGAP layer). This embodiment may enable the existing protocol stack configuration to be largely preserved, while separating the NAS layer and the AIP layer into the A-plane 592. In this example, the system node 420 is transparent to the A-plane 592 communications between the UE 410 and the network node 431. However, the system node 420 may also act as an intermediary to process AI-related data, using the AIP layer, between the UE 410 and the network node 431 (e.g., similar to the example shown in FIG. 16).

Figure 18:
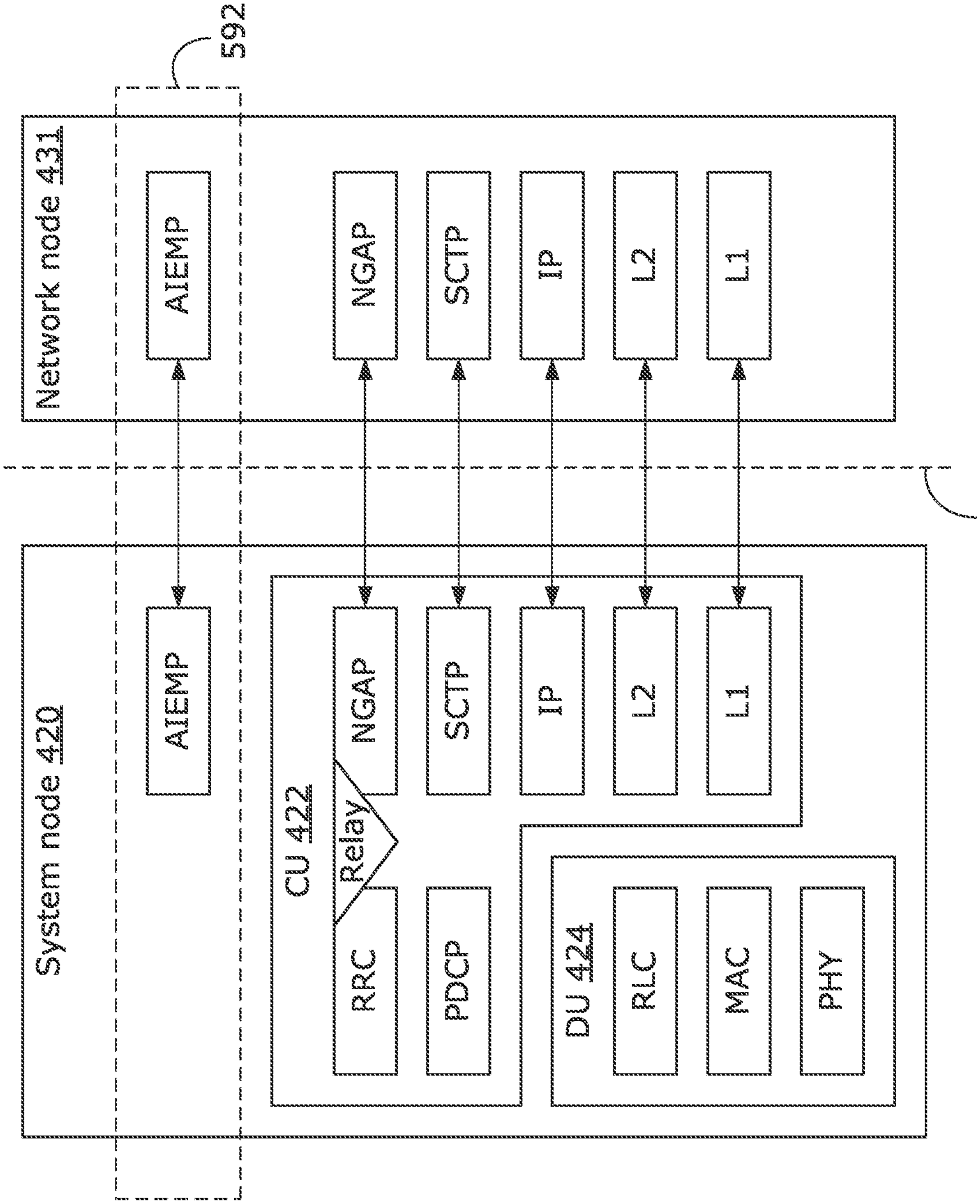

FIG. 18 is a block diagram illustrating an example of how the A-plane 592 is implemented for communication of AI-related data between the AI execution module 520 at the system node 420 and the AI management module 510 at the network node 431. The communication of AI-related data between the AI execution module 520 at the system node 420 and the AI management module 510 at the network node 431 may be over an AI execution/management protocol (AIEMP) layer. The AIEMP layer may be different from the AIP layer between the UE 410 and the network node 431, and may provide an encryption that is different from or similar to the encryption performed on the AIP layer. The AIEMP may be a layer of the A-plane 592 between the system node 420 and the network node 431, where the AIEMP layer may be the highest logical layer, above the existing layers of the protocol stack as defined in 5G standards. The existing layers of the protocol stack may be unchanged. Similarly to the communication of AI-related data from the UE 410 to the network node 431 (e.g., as described with respect to FIG. 15), the AI-related data that is communicated from the system node 420 to the network node 431, using the AIEMP layer, may include raw local data and/or processed local data. FIGS. 15-18 illustrate communication of AI-related data over the A-plane 592 using the interfaces 425 and 447, which may be wireless interfaces. In some examples, communication of AI-related data may be over wireline interfaces. For example, communication of AI-related data between the system node 420 and the network node 431 may be over a backhaul wired link.

Example Control for AI and Non-AI Capable Devices

As discussed earlier, for devices (e.g. UEs) capable of implementing AI in relation to one or more air interface components, there are different possible modes of operation. For example, AI mode 1 and AI mode 2 are discussed earlier. There may also or instead be additional and/or different modes relating to training, and/or different modes related to which components are implemented using AI, and/or related to whether components are jointly or individually optimized, etc. Moreover, a device having AI capabilities may sometimes need or desire to operate using a non-AI conventional air interface, e.g. for the purpose of power savings, or when the AI is not delivering adequate results, or during training. For example, a non-AI conventional air interface may be required to transmit and/or receive training related information. Moreover, different devices may have different capabilities or requirements, and some devices might not be AI-capable at all. One example was explained earlier in relation to FIG. 6 in which four UEs 302, 304, 306, and 308 have four different capabilities associated with implementing an air interface. A control signaling mechanism associated with indicating and switching between different modes in desired.

Figure 19:
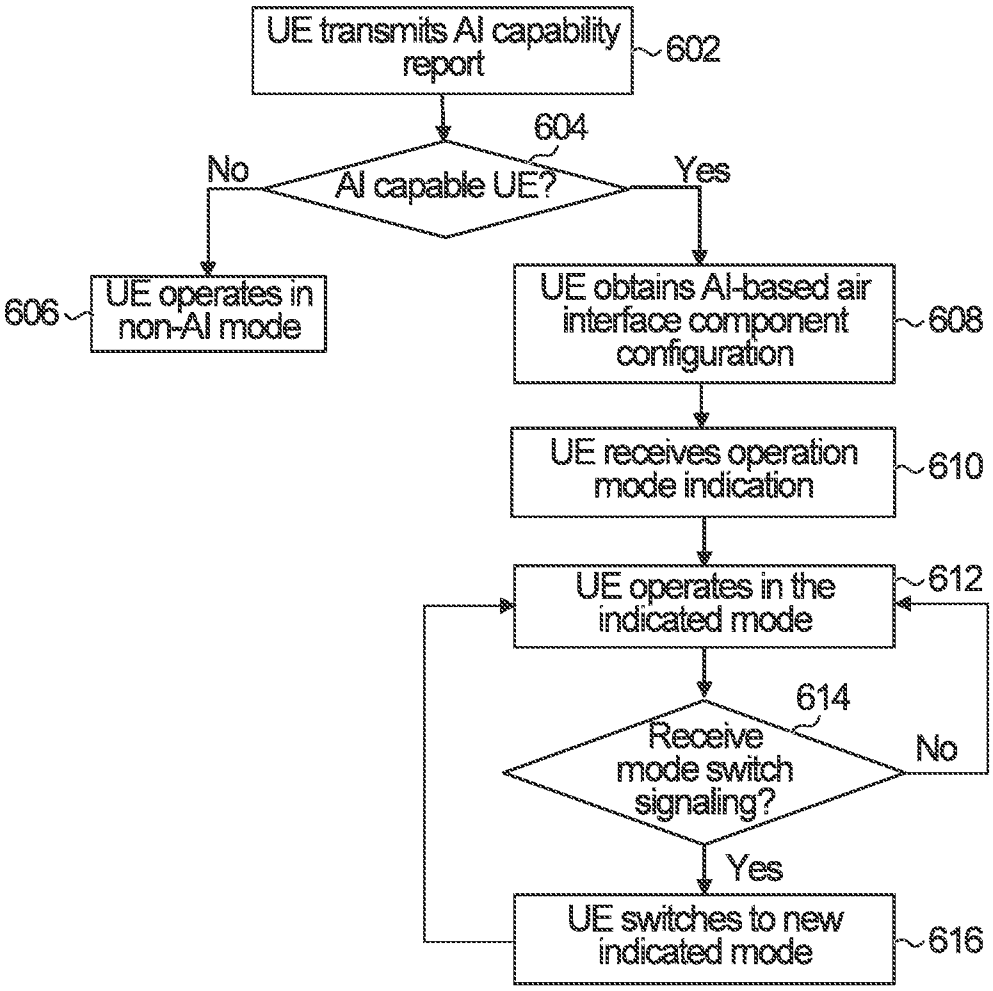
FIGS. 19 and 20 illustrate methods for mode adaptation/switching, according to various embodiments.

FIG. 19 illustrates a method for mode adaptation/switching, according to one embodiment. In the method of FIG. 19, the switching of the UE from one mode to another is initiated by the network, e.g. by network device 352.

In step 602, the UE transmits a capability report to the network indicating the UE's AI capability. In some embodiments, the capability report may be transmitted during an initial access procedure. In some embodiments, the capability report may also or instead be sent by the UE in response to a capability enquiry from a TRP. The capability report indicates whether or not the UE is capable of implementing AI in relation to one or more air interface components. If the UE is AI capable, the capability report may provide additional information, such as (but not limited to): an indication of which mode or modes of operation the UE is capable of operating in (e.g. AI mode 1 and/or AI mode 2 described earlier); and/or an indication of the type and/or level of complexity of AI the UE is capable of supporting, e.g., which function/operation AI can support, and/or what kind of AI algorithm or model can be supported (e.g., autoencoder, reinforcement learning, neural network (NN), deep neural network (DNN), how many layers of NN can be supported, etc.); and/or an indication of whether the UE can assist with training; and/or an indication of the air interface components for which the UE supports an AI implementation, which may include components in the physical and/or MAC layer; and/or an indication of whether the UE supports AI joint optimization of one or more components of the air interface. In some embodiments, there may be a predefined number of modes/capabilities within AI, and the modes/capabilities of the UE may be signaled by indicating particular patterns of bits.

At step 604, the network device 352 receives the capability report and determines whether the UE is even AI capable. If the UE is not AI capable, then the method proceeds to step 606 in which the UE operates in a non-AI mode, e.g. an air interface is implemented in a conventional non-AI way, such as according to the signaling, measurement, and feedback protocols defined in a standard that does not incorporate AI.

If the UE is AI capable, then at step 608 the UE receives, from the network, an AI-based air interface component configuration. Step 608 may be optional in some implementations, e.g. if the UE performs learning at its end and does not receive a component configuration from the network, or if certain AI configurations and/or algorithms have been predefined (e.g. in a standard) such that a component configuration does not need to be received from the network. The component configuration is implementation specific and depends upon the capabilities of the UE and the air interface components being implemented using AI. The component configuration may relate to a configuration of parameters for physical layer components, the configuration of a protocol, e.g. in the MAC layer (such as a retransmission protocol), etc. In some embodiments, before the component configuration is determined, training may occur on the network and/or UE side, which may involve the transmission of training related information from the UE to the network, or vice versa.

At step 610, the UE receives, from the network, an operation mode indication. The operation mode indication provides an indication of the mode of operation the UE is to operate in, which is within the capabilities of the UE. Different modes of operation may include: AI mode 1 described earlier, AI mode 2 described earlier, a training mode, a non-AI mode, an AI mode in which only particular components are optimized using AI, an AI mode in which joint optimization of particular components is enabled or disabled, etc. Note that in some embodiments, step 610 and steps 608 may be reversed. In some embodiments, step 610 may inherently occur as part of the configuration in step 608, e.g. the configuration of particular AI-based air interface component(s) is indicative of the operation mode in which the UE will operate.

Also, just because the UE is AI capable and/or just because the UE obtains an AI-based air interface component configuration in step 608, it does not mean that the UE is necessarily initially instructed to operate in an AI mode in step 610. For example, the network device 352 may initially instruct the UE to operate over a predefined conventional non-AI air interface, e.g. because this is associated with lower power consumption and may possibly achieve adequate performance.

At step 612, the UE operates in the indicated mode, implementing the air interface in the way configured for that mode of operation.

If, during operation, the UE receives mode switch signaling from the network (at step 614), then at step 616, the UE switches to the new mode of operation indicated in the switch signaling. Switching to the new mode of operation might or might not require reconfiguration of one or more air interface components, depending upon the implementation.

In some embodiments, the mode switch signaling may be sent from the network to the UE semi-statically (e.g. in RRC signaling or in a MAC CE) or dynamically (e.g. in DCI). In some embodiments, the mode switch signaling might be UE-specific, e.g. unicast. In other embodiments, the mode switch signaling might be for a group of UEs, in which case the mode switch signaling might be group-cast, multicast or broadcast, or UE-specific. For example, the network device may disable/enable an AI mode for a particular group of UEs, for a particular service/application, and/or for a particular environment. In one example, the network device may decide to completely turn off AI (i.e. switch to non-AI conventional operation) for some or all UEs, e.g. when the network load is low, when there is no active service or UE that needs AI based air interface operation, and/or if the network needs to control power consumption. Broadcast signaling may be used to switch the UEs to non-AI conventional operation.

In the method in FIG. 19, the network device 352 determines to switch the mode of operation of the UE and issues an indication of the new mode in the form of mode switch signaling for transmission to the UE. A few examples of reasons why switching might be triggered are as follows.

In one example, the network device 352 initially configures the UE (via the operation mode indication in step 610) to operate over a predefined conventional non-AI air interface, e.g. because the conventional non-AI air interface is associated with lower power consumption and may provide suitable performance. Then, one or more KPIs for the UE may be monitored by the network device 352 (e.g. error rate, such as BLER or packet drop rate or other service requirements). If the monitoring reveals that performance is not acceptable (e.g. falls within a certain range or below a particular threshold), then the network device 352 may switch the UE to an AI enabled air interface mode to try to improve performance.

In another example, the network device 352 instructs the UE to switch into a non-AI mode for one, some, or all of the following reasons: power consumption is too high (e.g. power consumption of UE or network exceeds a threshold); and/or the network load drops (e.g. fewer UEs being served) such that it is expected that a conventional non-AI air interface will provide suitable performance; and/or service type change such that it is expected that a conventional non-AI air interface will provide suitable performance; and/or the channel between the UE and a TRP is (or is predicted to be) of high quality (e.g. above a particular threshold) such that it is expected that a conventional non-AI air interface will provide suitable performance; and/or the channel between the UE and a TRP has improved (or is predicted to improve) because, for example, the UE's moving speed reduces, the SINR improves, the channel types changes (e.g. from non-LoS to LoS or multi-path effect reduces, etc.) such that it is expected that a conventional non-AI air interface will provide suitable performance; and/or a KPI is not meeting expectations (e.g. a KPI drops below a particular threshold or falls within a particular range), indicating low performance of the AI (e.g. performance of the AI degrading and falling below a particular threshold); and/or system capacity is constrained; and/or training or retraining of the AI needs to be performed, etc.

As another example, the service or traffic type or scenario of the UE may change, such that the current mode of operation is no longer a best match. For example, the UE switches to a service requiring brief simple communication of low amounts of traffic, and as a result the network device 352 switches the UE mode to a conventional non-AI air interface. As another example, the UE switches to a service requiring higher/tighter performance requirements such as better latency, reliability, data rate, etc., and as a result the network device 352 upgrades the UE from a non-AI mode to an AI mode (or to a higher AI mode if the UE is already in an AI mode).

As another example, the intelligent air interface controller 402 in the network device 352 may enable, disable, or switch modes, prompting an associated mode switch for the UE.

Figure 20:
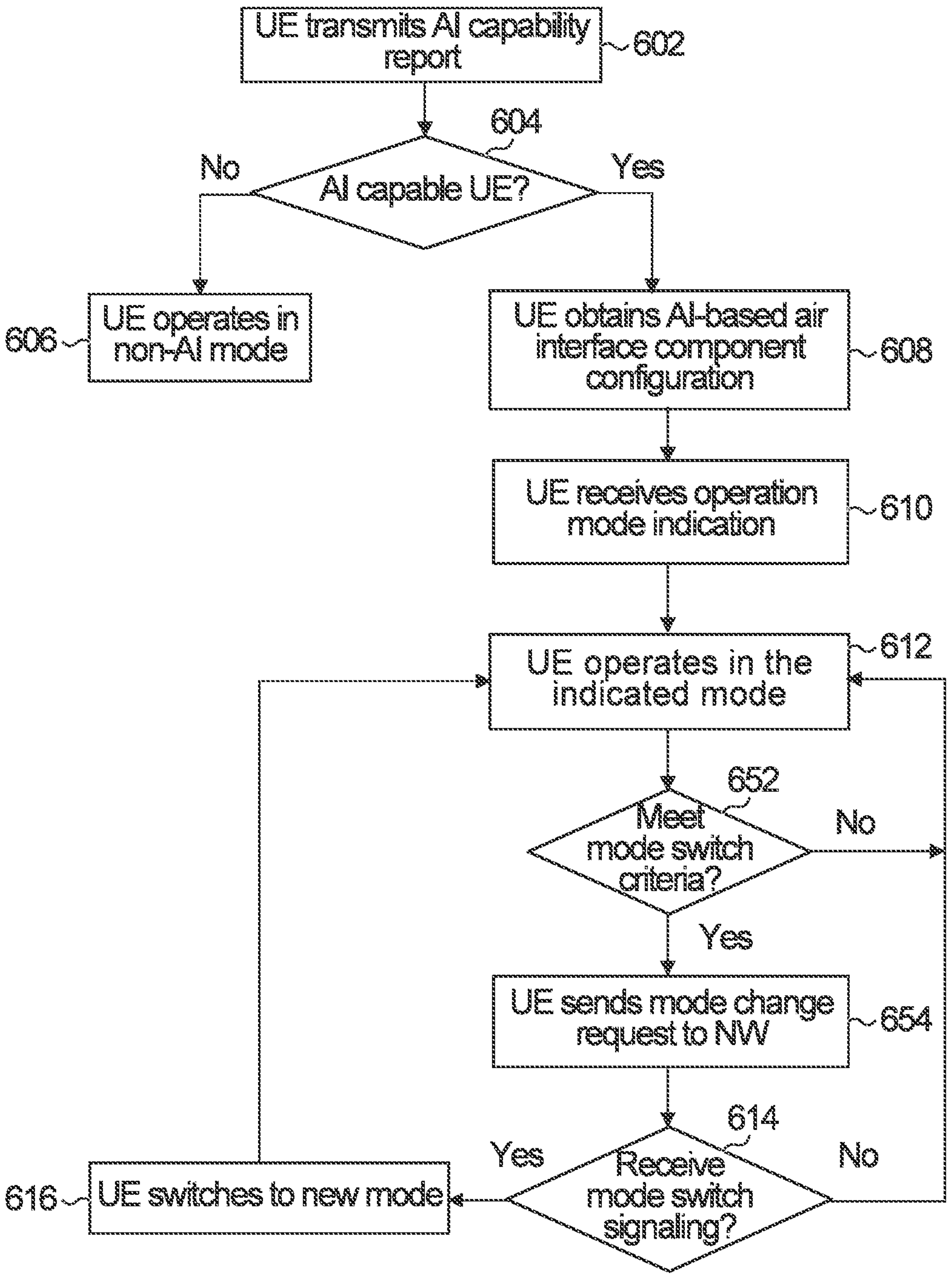

FIG. 20 illustrates a variation of FIG. 19 in which additional steps 652 and 654 are added, which allows for the UE to initiate a request to change its operation mode. Steps 602 to 612 are the same as FIG. 19. If during operation in a particular mode the UE determines mode switching criteria is met (in step 602), then at step 654 the UE sends a mode change request message to the network, e.g. by sending the request to a TRP serving the UE. The mode change request may indicate the new mode of operation to which the UE wishes to switch. Steps 614 and 616 are the same as in FIG. 19, except an additional reason the network might send mode switch signaling is to switch the UE to the mode requested by the UE in step 654.

In another example, the mode change request message sent in step 654 may indicate that a mode switch is needed or requested, but the message may not indicate the new mode of operation to which the UE wishes to switch. In some such instances, the mode change request message sent in step 654 might simply include an indication of whether the UE wishes to upgrade or downgrade the operation mode.

A few examples of reasons why the UE may request to switch modes are as follows. In one example, the UE is operating in a non-AI mode or a lower-end AI mode (e.g. with only basic optimizations), but the UE begins experiencing poor performance, e.g. due to a change in channel conditions. In response, the UE requests to switch to a more advanced mode (e.g. more sophisticated AI mode) to try to better optimize one or more air interface components. In another example, the UE must or desires to enter a power saving mode (e.g. because of a low battery), and so the UE requests to downgrade, e.g. switch to a non-AI mode, which consumes less power than an AI mode. In another example, the power available to the UE increases, e.g. the UE is plugged into an electrical socket, and so the UE requests to upgrade, e.g. switch to a sophisticated high-end AI mode that is associated with higher power consumption, but that aims to jointly optimize several air interface components to increase performance. In another example, a KPI of the UE (e.g. throughput, error rate) fall within a range of performance that is unacceptable, which triggers the UE to request to upgrade, e.g. switch to an AI mode (or to a higher AI mode if the UE is already in an AI mode). In another example, a service or traffic scenario or requirement for the UE changes, which is better suited to a different mode of operation.

When switching from one mode of operation to another, the air interface components are reconfigured appropriately. For example, the UE may be operating in a mode in which MCS and the retransmission protocol are implemented using AI, with the result of better performance and the transmission of less control information post-training. If the UE is instructed to switch (fall back) to conventional non-AI mode, then the UE adapts the MCS and retransmission air interface components to follow the conventional predefined non-AI scheme, e.g. the MCS is adjusted using link adaptation based on channel quality measurement, and the retransmission returns to a conventional HARQ retransmission protocol.

Different operating modes may require different content and/or amount of control information to be exchanged. As an example, an air interface may be implemented between a first UE and the network in which a non-AI conventional HARQ retransmission protocol is used. In the execution of the HARQ retransmission protocol, a HARQ process ID and/or redundancy version (RV) may need to be signaled in control information, e.g. in DCI. Another air interface may be implemented between a second UE and the network in which an AI-based retransmission protocol is used. The AI-based retransmission protocol might not require transmission of a process ID or RV. The content and frequency of the control information exchanged might be more during training and less post-training. As another example, an air interface implemented in one instance may rely on regular transmission of a measurement report (e.g. indicating CSI), whereas another air interface implemented in another instance, and that is AI-enabled, might not rely on transmission of reference signals or measurement reports, or might not rely on their transmission as often.

In some embodiments, a unified control signaling procedure may be provided that can accommodate both AI-enabled and non-AI enabled interfaces, with accommodation of different amounts and content of control information that may need to be transmitted. The same unified control signaling procedure may be implemented for both AI-capable and non-AI capable devices.

In some embodiments, the unified control signaling procedure is implemented by having a first size and/or format allotted for transmission of first control information regardless of the mode of operation or AI capability, and a second size and/or format carrying different content depending upon the mode of operation and specific control information that needs to be transmitted. In some embodiments, the second size and content may be implementation specific and vary depending upon whether AI is implemented and the specifics of the AI implementation. Some examples will be presented below in the context of two-stage DCI.

A DCI structure may include one stage DCI and two stage DCI. In one stage DCI structure, the DCI has a single part and is carried on a physical channel, e.g. a control channel, such as a physical downlink control channel (PDCCH). A UE receives the DCI on the physical channel and decodes the DCI to obtain the control information. The control information may schedule a transmission in a data channel. In a two stage DCI structure, the DCI structure includes two parts, i.e. first stage DCI and corresponding second stage DCI. In some embodiments, the first stage DCI and the second stage DCI are transmitted in different physical channels, e.g. the first stage DCI is carried on a control channel (e.g. a PDCCH) and the second stage DCI is carried on a data channel (e.g. a PDSCH). In some embodiments, the second stage DCI is not multiplexed with UE downlink data, e.g. the second stage DCI is transmitted on a PDSCH without downlink shared channel (DL-SCH), where the DL-SCH is a transport channel used for the transmission of downlink data. That is, in some embodiments, the physical resources of the PDSCH used to transmit the second stage DCI are used for a transmission including the second stage DCI without multiplexing with other downlink data. For example, where the unit of transmission on the PDSCH is a physical resource block (PRB) in frequency-domain and a slot in time-domain, an entire resource block in a slot may be available for second stage DCI transmission. This may allow maximum flexibility in terms of the size of the second stage DCI, with fewer constraints on the amount of control information that could be transmitted in the second stage DCI. This also avoids the complexity of rate matching for downlink data if the downlink data is multiplexed with the second stage DCI.

In some embodiments, the second stage DCI is carried by a PDSCH without data transmission (e.g. as mentioned above), or the second stage DCI is carried in a specific physical channel (e.g. a specific downlink data channel, or a specific downlink control channel) only for the second stage DCI transmission.

In some embodiments, the first stage DCI indicates control information for the second stage DCI, e.g. time/frequency/spatial resources of the second stage DCI. Optionally, the first stage DCI can indicate the presence of the second stage DCI. In some embodiments, the first stage DCI includes the control information for the second stage DCI and the second stage DCI includes additional control information for the UE; or the first stage DCI includes the control information for the second stage DCI and partial additional control information for the UE, and the second stage DCI includes other additional control information for the UE.

In some embodiments, the second stage DCI may indicate at least one of the following for scheduling data transmission for a UE:

- scheduling information for one PDSCH in one carrier/BWP;
- scheduling information for multiple PDSCHs in one carrier/BWP;
- scheduling information for one PUSCH in one carrier/BWP;
- scheduling information for multiple PUSCHs in one carrier/BWP;
- scheduling information for one PDSCH and one PUSCH in one carrier/BWP;
- scheduling information for one PDSCH and multiple PUSCHs in one carrier/BWP;
- scheduling information for multiple PDSCHs and one PUSCH in one carrier/BWP;
- scheduling information for multiple PDSCHs and multiple PUSCHs in one carrier/BWP;
- scheduling information for sidelink in one carrier/BWP;
- partial scheduling information for at least one PUSCH and/or at least one PDSCH in one carrier/BWP, where the partial scheduling information is an update to scheduling information in the first stage DCI;
- partial scheduling information for at least one PUSCH and/or at least one PDSCH, where remaining scheduling information for the at least one PUSCH and/or at least one PDSCH is included in the first stage DCI;
- configuration information related to an AI function;
- configuration information related to a non-AI function.

In some embodiments, the UE receives the first stage DCI (for example by receiving a physical channel carrying the first stage DCI) and performs decoding (e.g. blind decoding) to decode the first stage DCI. Scheduling information for the second stage DCI, within the PDSCH, is explicitly indicated by the first stage DCI. The result is that the second stage DCI can be received and decoded by the UE without the need to perform blind decoding, based on the scheduling information in the first stage DCI. As compared to scheduling a PDSCH carrying downlink data, in some embodiments more robust scheduling information is used to schedule a PDSCH carrying second stage DCI, increasing the likelihood of that the receiving UE can successfully decode the second stage DCI.

Because the second stage DCI is not limited by constraints that may exist for PDCCH transmissions, the size of the second stage DCI is more flexible and may be used to carry control information having different formats, sizes, and/or contents dependent upon the mode of operation of the UE, e.g. whether or not the UE is implementing an AI-enabled air interface, and (if so) the specifics of the AI implementation.

Figure 21:
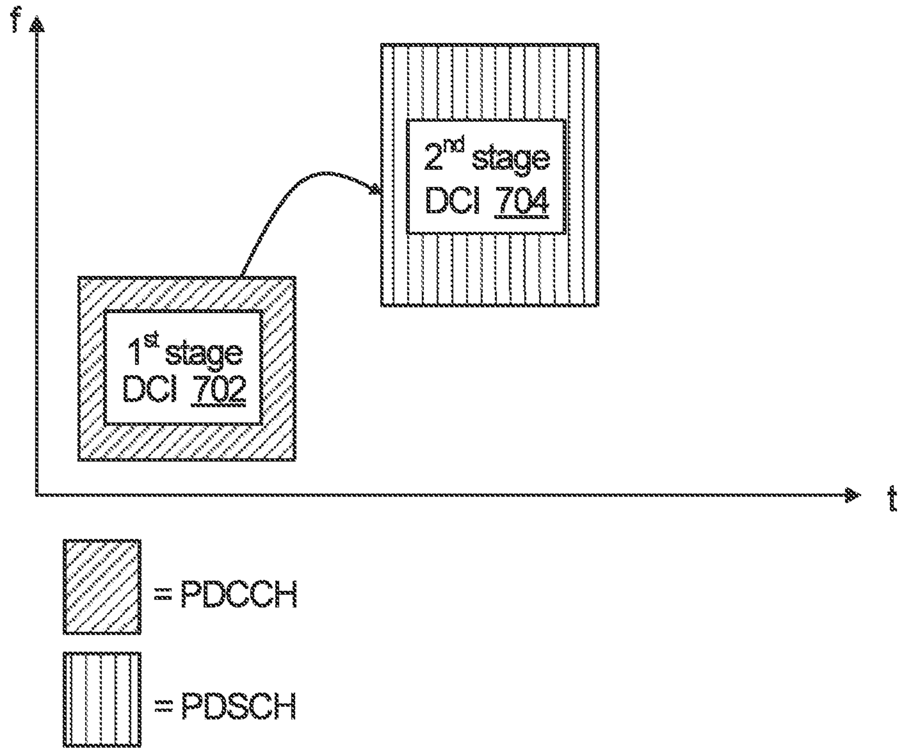
FIG. 21 illustrates one example of a two-stage DCI design.

FIG. 21 illustrates one example of a two-stage DCI design. A time-frequency axis is illustrated defining time-frequency resources. The time domain (e.g, orthogonal frequency division multiplexing (OFDM) symbol durations) is in the horizontal axis, and frequency domain (e.g, OFDM subcarriers) is in the vertical axis. A first stage DCI 702 is transmitted at a particular time-frequency resource in a control channel, e.g. in a PDCCH. The first stage DCI 702 is of a predefined length/format, or at least is one of a predefined number of lengths/formats. The first stage DCI 702 includes information that schedules a second stage DCI 704 at another time-frequency resource in a data channel, e.g. in a PDSCH. The second stage DCI 704 is illustrated as being scheduled at a different time-frequency resource from the first stage DCI 702, but this is only an example. In general, a time and/or frequency resource of the second stage DCI 704 may possibly overlap with a time and/or frequency resource of the first stage DCI 702. For example, the first stage DCI 702 and second stage DCI 704 may be time division multiplexed (as illustrated), or may be frequency divisional multiplexed. In some embodiments, if the frequency resource is the same for the first stage DCI 702 and the second stage DCI 704, then the scheduling information of the second stage DCI 704 contained in the first stage DCI 702 does not include information about a frequency resource. In some embodiments, if the time resource is the same for the first stage DCI 702 and second stage DCI 704, then the scheduling information of the second stage DCI 704 contained in the first stage DCI 702 does not include information about a time resource.

The scheduling information in the first stage DCI 702 may include information such as the time-frequency location of the second stage DCI 704, and/or the modulation order of the second stage DCI 704, and/or the coding rate of the second stage DCI 704. The first stage DCI 702 may be in a dynamic control channel and blindly detected by the UE. In some embodiments, the first stage DCI 702 may be configured in a manner such that blind detection efforts by a UE are reduced or minimized. For example, for some services a dedicated resource for the first stage DCI 702 may be assigned to the UE. As another example, there may be limited formats for the first stage DCI 702 so that the UE only needs to blindly decode a limited DCI size. The second stage DCI 704 is not blindly detected because the first stage DCI 702 provides the scheduling information for the second stage DCI 704.

In some embodiments, the first stage DCI 702 has a length and/or format that is independent of the mode of operation of the air interface, e.g. independent of whether AI is or is not being implemented for one or more components of the air interface. However, the second stage DCI 704 may be different in content and/or size and may be customized, at least in part, based on the specific mode of air interface operation between the network and a UE. The second stage DCI 704 may schedule one or more resources (e.g. time-frequency resources) for transmission in an uplink data channel (e.g. in a PUSCH) and/or downlink data channel (e.g. in a PDSCH). However, this is not necessary. In some scenarios or implementations, the second stage DCI 704 may carry control information specific to the mode of operation (e.g. specific to the AI implementation) without necessarily scheduling a transmission.

In one example, the second stage DCI 704 may be one of two different formats: a first format for carrying control information for a non-AI enabled air interface, or a second format for carrying control information for an AI-enabled air interface. In some embodiments, the first stage DCI 702 may include an indication (e.g. bit) indicating whether the second stage DCI 704 is of the first format or the second format. In some embodiments, the first format may have a predefined size/format or may be selected from a set of different predefined sizes/formats. In some embodiments, the second format may possibly have varying content and payload sizes.

By utilizing a two-stage DCI design, e.g. as explained in the example in FIG. 21, different sizes and contents of control information may be dynamically indicated, possibly on a UE-specific basis, where the format and size/content may be dependent upon the specific air interface configuration between the UE and the network. The content/size that varies is included in the second stage DCI, with the first DCI size/format being independent of the specific air interface configuration between the UE and the network.

For example, an air interface implementing link adaptation using AI may not need to indicate coding rate in DCI, whereas an air interface that implements link adaptation in a conventional non-AI manner may need to indicate coding rate in DCI. In such a situation, the first stage DCI 702 may be the same format and/or size in both instances, but the second stage DCI 704 may be different, e.g. different format and/or size and different content. For the AI implementation, the second stage DCI 704 might omit the indication of the coding rate, whereas for the conventional non-AI implementation, the second stage DCI 704 indicates the coding rate. As another example, an air interface implementing a retransmission protocol using AI may not need to indicate some HARQ-related configuration information (e.g. RV may not need to be indicated), whereas an air interface that implements HARQ retransmission in a conventional non-AI manner may need to indicate such HARQ-related configuration information. In such a situation, the first stage DCI 702 may be the same format and/or size in both instances, but the second stage DCI 704 may be different, e.g. different format and/or size and different content. For the AI implementation, the second stage DCI 704 omits the HARQ-related configuration information, whereas for the conventional non-AI implementation, the second stage DCI 704 indicates the HARQ-related configuration information. As another example, the first stage DCI 702 may be the same in size and/or format for both AI and non-AI enabled air interfaces. The second stage DCI 704 may potentially exclude some information (e.g. scheduling information) for an AI-enabled air interface.

In some embodiments, the second stage DCI 704 may include at least one of the following: frequency/time domain resource allocation; modulation order; coding scheme; new data indicator; redundancy version; HARQ related information; transmit power control; PUCCH resource indicator; antenna port(s); transmission configuration indication; code block group indicator; pre-emption indication; cancellation indication; availability indicator; or resource pool index. One, some, or all of the foregoing may relate to scheduling information being provided in the second stage DCI 704.

In some embodiments, the second stage DCI 704 may itself contain an indication (e.g. dynamic indication) of whether information in the second stage DCI 704 is of AI or non-AI implementation. For example, instead of a 1-bit AI/non-AI indication in the first stage DCI 702, such an indication may be present in the second stage DCI 704.

An example of a one-bit field to indicate whether a scheduling information field in the second stage DCI 704 is for an AI mode or non-AI mode is as follows:

| AI Indicator | AI Mode |
|---|---|
| 0 | Non-AI mode |
| 1 | AI mode |

When there are multiple possible AI modes, in some embodiments the second stage DCI 704 may include a dynamic indication indicating one of the multiple AI modes. In some embodiments, when an AI mode applies, the value in a scheduling information field in the second stage DCI 704 may be used as an input to an AI inference engine to determine the meaning.

In some embodiments, for some of the scheduling information fields included in the second stage DCI 704, a respective AI indicator field may be included for each scheduling information field of the multiple fields. Alternatively, a given AI indicator field may apply to multiple scheduling information fields included in the second stage DCI 704. In some embodiments, when an AI mode applies to a scheduling information field, the value of the field does not indicate the scheduling information directly, but rather serves as an input to an AI inference engine that calculates a meaning of the scheduling information. On the other hand, when an AI mode does not apply to a scheduling information field, the value of the field can be mapped directly to a meaning of the scheduling information field, for example using table lookup.

In one example, the second stage DCI 704 includes a modulation and coding scheme (MCS) field, and the second stage DCI 704 may indicate whether the MCS field in the second stage DCI 704 is for AI implementation or non-AI implementation. For example, if it is for non-AI implementation, the MCS field may consist of M1 bits (e.g. 5 bits) to indicate the modulation order and coding rate from a list of options; otherwise, the MCS field may consist of M2 bits to indicate the input of an AI module (e.g. AI inference engine) at the UE side, where M2 could be different than M1 (e.g. M2 is 3 bits and M1 is 5 bits). In an AI implementation, the UE uses the value of the M2 bits as the AI input to infer the exact value of modulation order and coding rate. An example of a bit field that may be in the second stage DCI 704 is below:

| Bit field | AI for MCS indication |
|---|---|
| 0 | Non-AI |
| 1 | AI enabled |

Modulation and coding scheme (1+M1 or 1+M2 bits):
- AI indicator: 1 bit
- MCS:
  - M1 bits if indicated as non-AI mode, where the M1 bits may be used to select an index from an MCS table;
  - M2 bits if indicated as AI mode, where the M2 bits may be the input to an AI inference engine at the UE side to determine the MCS.
  - The value of M1 and M2 can be same or different.

A similar approach can be used for other types of scheduling information.

Alternatively, the AI indicator bit(s) may be present in the first stage DCI 702.

The AI indicator bit(s) may allow dynamic switching between AI and non-AI modes, e.g. if the network device 352 notices that the AI mode is not efficient or effective, the network device 352 may switch to a conventional non-AI method, and possibly indicate a retraining procedure, thereby pivoting dynamically to try to maintain the UE's performance.

In some embodiments, using two stage DCI there may be dynamic indication of joint AI or separate AI for multiple control information.

For example, in some embodiments, for multiple control information fields (for example multiple scheduling information fields) in the second stage DCI 704, the second stage DCI 704 can indicate one of:
- non-AI mode applies to the at least two scheduling information fields;
- AI mode applies to one of the at least two scheduling information fields and non-AI mode applies to another of the at least two scheduling information fields;
- separate AI mode applies to each of the at least two scheduling information fields;
- joint AI mode applies to the at least two scheduling fields collectively.

This may be used for fields relating to resource assignment (RA). For instance, for a first field comprising a time domain resource assignment (e.g. a field named "time-domain resource assignment") and a second field comprising frequency domain resource assignment (e.g. a field named "frequency domain resource assignment") in the second stage DCI 704, a set of X bits can be used to indicate whether joint AI applies to the two fields, separate AI applies to the two fields, or AI applies to one field but not the other, or AI applies to neither field.

When separate AI applies, each input is processed by a respective AI inference engine/module. When joint AI applies, a single input or multiple inputs to an inference engine, or a pair of jointly optimized inference engines/modules, is used to generate values/meanings for multiple types of scheduling information. The single input may include bits from one or both of the fields in the DCI. For example, if the DCI contains an N1 bit field for a first control information field, and an N2 bit field for a second control information field, the N1 bits and N2 bits together can be viewed as an N1+N2 bit field, and the N bits for joint AI may be N bits from the N1+N2 bit field. On the other hand, when separate AI applies, the N1 bit field and the N2 bit field have separate functions, wherein the N1 bit field does not indicate the control information associated to the N2 bit field.

One example is shown in the table below where an X=3 bit field is used for AI indication:

| Bit field | AI indicator | Time/Frequency domain RA |
|---|---|---|
| 000 | Joint AI for time-frequency domain resource assignment (RA) | N bits |
| 001 | Separate AI for time and frequency domain RA | N1 bits for time RA, N2 bits for frequency RA |
| 010 | AI for time domain RA, non-AI for frequency domain RA | N1 bits for time RA, M2 bits (e.g. resource block group (RBG), resource indicator value (RIV)) for frequency RA |
| 011 | Non-AI for time domain RA, AI for frequency domain RA | M1 bits (time RA table) for time RA, N2 bits for frequency RA |
| 100 | Non-AI for time domain RA, non-AI for frequency domain RA | M1 bits for time RA, M2 bits for frequency RA |
| 101 | Reserved | Reserved |
| 110 | Reserved | Reserved |
| 111 | Reserved | Reserved |

In the table above:
- For joint AI, the network device 352 may use N bits to indicate the AI input for time-frequency resource assignment at the UE side. After receiving the second stage DCI 704, the UE may use the value of the N bits as the AI input to infer the exact time and frequency resources assigned by the network.

For separate AI indication, N1 bits are used for the UE to infer the time domain resources by AI at UE side, and N2 bits are used for the UE to infer the frequency domain resources by AI at UE side.

For non-AI implementations, for frequency domain resource assignment, the resource block (RB) or RBG locations may be indicated to UEs in the second stage DCI 704. For non-AI implementations, for time domain resource assignment, the allocated symbols may be indicated to the UE, e.g. choosing from a time resource assignment table.

Alternatively, the bit field in the table above may be present in the first stage DCI 702.

Benefits possibly include a unified design for UEs with different AI capabilities and implementation.

Embodiments relating to mode switching are described earlier, e.g. in relation to FIGS. 19 and 20. In some embodiments, it might be the case that the first stage DCI is used or reused for indicating a mode switch. If the first stage DCI indicates a mode switch, then the content of that first stage DCI may be different from the content of a regular first stage DCI (not used for mode switch). In some embodiments, when the first stage DCI indicates a mode switch, a second stage DCI might not be scheduled by the first stage DCI or sent. Alternatively, or additionally, another DCI different from the first stage DCI may be used to indicate a mode switch. This other DCI may be of a more compact format. A second stage DCI might not be needed when DCI is transmitted indicating a mode switch. In any case, in some embodiments, the indication of mode switch in DCI may be to trigger a new measurement mechanism, to prepare AI training or updating, and/or to trigger operation of an AI module.

Some examples of variations/alternatives are as follows.

In some embodiments, the second stage DCI may be multiplexed with UE downlink data in the data channel (e.g. in the PDSCH).

In some embodiments, rather than (or in addition to) a two stage DCI, a two step DCI may be provided, e.g. in which both DCI portions are in a control channel (e.g. a PDCCH). Varying content, format, or size might be implemented for the second DCI portion (e.g. depending upon whether AI is implemented and the details of the implementation), but there might be constraints in flexibility due to the second DCI portion also being in the control channel.

Although embodiments describing two stage DCI and two step DCI are presented above, it is important to note that two stage DCI or two step DCI does not necessarily need to be implemented to transmit control information, including to transmit AI indications. For example, the AI bit field indicators described in the tables above do not necessarily need to be transmitted in two stage DCI or two step DCI. AI indications and/or other control information may be transmitted in one stage DCI or in other information that may be transmitted dynamically (e.g. in physical layer control signaling) or semi-statically (e.g. in RRC signaling or MAC CE).

In some embodiments, there may be a new control channel defined for AI, e.g. an "AI-control channel (AICCH)" or the like, in which control information related to an AI implementation is transmitted and/or received. In some embodiments, the control information in the control channel may be transmitted dynamically, e.g. in physical layer control signaling, such as in UCI and/or DCI (which may be one stage DCI, two stage DCI, two step DCI, etc. as described earlier).

Unified Measurement and Feedback Signaling

During operation of the air interface, different measurement and/or feedback may be needed depending upon whether or not an air interface is AI-enabled, and if it is AI-enabled, the specific AI implementation/mode of operation.

For example, conventional non-AI enabled air interfaces often have regular transmission of signals that are used for measurement, along with feedback related to the result of the measurement. As an example, a TRP may transmit to a UE a reference signal or a synchronization signal. An example of a reference signal is a CSI reference signal (CSI-RS). An example of a synchronization signal is a primary synchronization signal (PSS) and/or a secondary synchronization signal (SSS). The reference signal and/or synchronization signal may be used by the UE to perform a measurement and thereby obtain a measurement result. Examples of possible measurements include: measuring CSI, such as information related to scattering, fading, power decay and/or signal-to-noise ratio (SNR) in the channel; and/or measuring signal-to-interference-plus-noise ratio (SINR), which is sometimes instead called signal-to-noise-plus-interference ratio (SNIR); and/or measuring Reference Signal Receive Power (RSRP); and/or measuring Reference Signal Receive Quality (RSRQ); and/or measuring channel quality, e.g. to obtain a channel quality indicator (CQI). Performing a measurement on a received signal may include extracting waveform parameters from the signal, such as (but not limited to) amplitude, frequency, noise and/or timing of the waveform. The result may be the measurement. The result of the measurement is referred to as the measurement result, e.g. the measurement result may be the measured SNR, SINR, RRSP, and/or RSRQ. A measurement report may then be transmitted from the UE back to the TRP. The measurement report may report some or all of the measurement result. The measurement result may be used by the network to perform link adaptation, radio resource management (RRM), etc. Instead of a measurement report, other content dependent upon the measurement result may be transmitted back to the TRP, e.g. the UE may transmit an indication of a codebook and/or rank indicator for use by the TRP for precoding. In another example, the UE may perform an inter-UE or inter-layer interference measurement, and report information back in a measurement report. In another example, sensing may be performed and sensing results reported. In the uplink, a UE may transmit a reference signal to a TRP, e.g. a sounding reference signal (SRS). The reference signal may be used by the network to perform a measurement and thereby obtain a measurement result. The measurement result may be used to configure certain parameters for a downlink transmission to the UE and/or to perform RRM or handover, etc.

The feedback does not necessarily need to be an explicit indication of a channel quality, but might instead be content that was selected or derived based on the measurement result, e.g. an indication of a MCS, an indication of a codebook and/or rank indicator for precoding, etc.

Therefore, many different items of information may be fed back in signaling during operation of a conventional non-AI air interface, typically based on measurement of a received signal. For example, information fed back from one device to another may include CSI, CQI, SNR, SINR, RRSP, RSRQ, codebook/rank indicator for precoding, indication of MCS, etc.

However, in an AI-enabled air interface, it might not be necessary to transmit a reference signal (or other type of signal), perform measurement, and/or transmit feedback based on the measurement. Alternatively, measurement and feedback might occur, but perhaps not as often or only during training. As one example, sensing and positioning information collected by the network may be used to predict the wireless channel between a TRP and a UE, such that reference signals need not be transmitted as regularly (or perhaps at all, e.g. post-training) compared to a non-AI air interface implementation. In some implementations, a MCS scheme may be established during training and perhaps adjusted post-training based on the channel tracking/prediction by the network, such that a reference signal does not need to be regularly transmitted and/or such that feedback of an indication of MCS does not need to be regularly explicitly transmitted. In some implementations, precoding parameters may be determined based on the channel tracking/prediction by the network, such that a reference signal does not need to be regularly transmitted and/or such that feedback of an indication of channel quality or precoding parameters does not need to be regularly explicitly transmitted. In another example, a network device implements a neural network that uses sensing information and/or positioning information. During operation post-training, perhaps only a relatively small amount of information needs to be periodically transmitted back from the UE to the network, e.g. just bit error rate (BER) fed back to allow the network to monitor and/or adjust the performance of the neural network.

A few other examples of situations in which feedback may be different for AI-enabled versus non-AI enabled air interfaces is as follows.

In one example, the contents and/or the number of bits of the Uplink Control Information (UCI) sent by a UE depends on whether AI is enabled. When AI is not enabled, the UE measures and reports some CSI types to the TRP. When AI is enabled, the UE measures and reports fewer CSI types to the TRP, e.g. a subset the CSI types sent when AI is not enabled.

In another example, when AI is not enabled, feedback content may include rank indicator (RI), precoding matrix indicator (PMI), CQI, and/or CSI resource indicator, where the PMI is used to indicate a pre-coding matrix. When AI is enabled, the UE reports AI compressed channel information to the TRP, where the compressed channel information explicitly indicates the amplitude and phase information of the channel between transmit antennas and receiving antennas.

In another example, AI is used for compressing CSI so that the CSI feedback content is different compared to a non-AI mode.

In another example, feedback content may different for sensing versus non-sensing. For TRP with sensing capability, sensing may assist communication. For example, sensing may provide useful information to the TRP, such as UE locations, Doppler, beam directions, and images. When the TRP can sense such information, it may be that less feedback information from the UE is required. In some embodiments, the TRP sensing capability, for example, in terms of whether sensing is enabled or disabled at the TRP, is indicated to the UE, e.g. by master information block (MIB), system information (SI), RRC signaling, MAC CE, or DCI. In some embodiments, the contents or the number of bits of the UCI sent by the UE depends on whether sensing is enabled. CSI is one type of UCI, which may include (or be represented by) one or some of several types: PMI (Precoding Matrix Indication), RI (Rank Indication), LI (Layer Indicator), CQI (Channel Quality Information), CRI (CSI-RS resource indicator), SSBRI (SS/PBCH (Physical broadcast channel) Resource Block Indicator), RSRP (Reference Signal Received Power). When sensing is not enabled, the UE measures and reports some CSI types to the TRP. When sensing is enabled, the UE measures and reports less CSI types to the TRP, e.g. a subset the CSI types sent when sensing is not enabled. In a specific example, a UE measures and reports PMI, RI, CQI when sensing is not enabled. When sensing is enabled, a UE measures and reports PMI and RI, but CQI is obtained by sensing capability.

Therefore, in different modes of operation, different sizes and/or contents of information may need to be reported, and the measurements performed may be implementation specific to the mode of operation.

In some embodiments, it may be the case that in some AI-enabled air interface schemes, more bits of feedback (compared to a conventional non-AI implementation) are needed during a training phase. Then, post-training, fewer bits of feedback (compared to a conventional non-AI implementation) might only be required. For example, the feedback during training might include channel measurement results (e.g. CSI, etc.) and/or might include other items not necessarily transmitted in a non-AI air interface implementation, e.g. throughput, latency, power consumption, bit error rate, log likelihood ratio (LLR) values, indications of a change in direction, sequences or other information for training purposes, measurement results, etc. Post-training, there may be less feedback in the AI-enabled interface, e.g. only information indicative of an error rate, such as BER, block error rate (BLER), or packet error rate.

A wide variety of different possible content may be communicated (e.g. fed back) in AI-enabled air interfaces, possibly just during training, or post-training. Other examples include the subcarrier spacing (SCS), modulation scheme, Euclidian distance, new coding scheme parameter (s), power control parameter(s), which carrier to use (e.g. carrier number), error rate (e.g. BLER), etc. Thus, different content may be fed back, e.g. transmitted from the TRP to the UE or vice versa. The content fed back might be dynamic (e.g. transmitted in a physical downlink or uplink control channel). Alternatively, the content fed back might be in a data channel, e.g. at a resource in a data channel that is configured or predefined. The amount and/or content of information is implementation specific. The requirement of how often a reference signal needs to be transmitted and measured is implementation specific.

To accommodate the wide variety of implementations, in some embodiments, a unified measurement and feedback method is provided that may be the same in operation regardless of whether a device is or is not AI capable, and (if the device is AI capable) regardless of the specific measurements that need to be performed and regardless of the content that needs to be fed back. This may allow for a single protocol that can support a wide variety of air interface implementations, possibly all within a same network.

In one embodiment, the unified protocol operates as follows. A measurement request is transmitted (e.g. on-demand), with measurement feedback being provided in response to (and according to) the measurement request. A resource (e.g. a feedback channel) may be configured for transmitting the feedback derived from the measurement. The configuration may be indicated at least partially in the measurement request.

Figure 22:
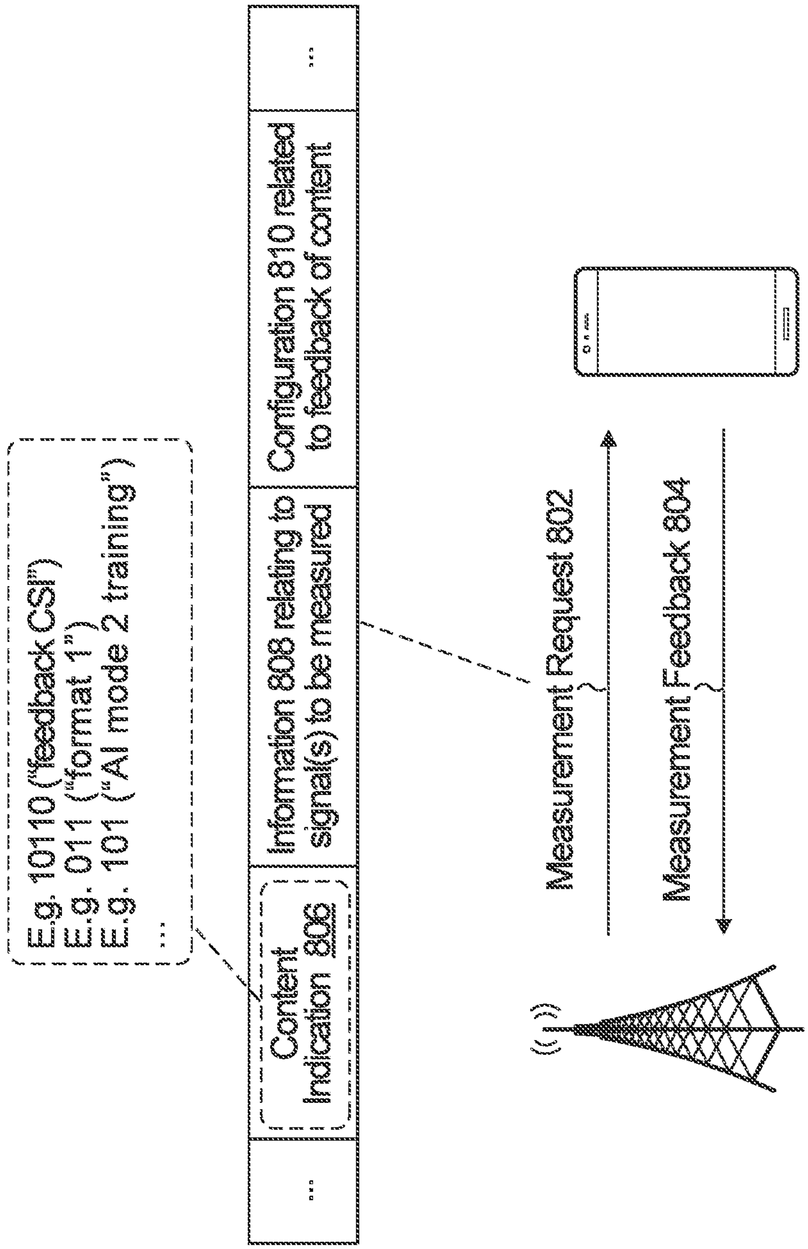
FIG. 22 illustrates a UE providing measurement feedback to a base station, according to one embodiment.

FIG. 22 illustrates a UE providing measurement feedback to a base station, according to one embodiment. The base station transmits a measurement request 802 to the UE. In response, the UE performs the configured measurement and transmits content in the form of measurement feedback 804. Measurement feedback 804 refers to content that is based on a measurement. Depending upon the implementation, the content might be an explicit indication of channel quality (e.g. channel measurement results, such as CSI, SNR, SINR) or precoding matrix/codebook. In other implementations, the content might additionally or instead be other information that is ultimately at least partially derived from the measurement, e.g.: output from an AI algorithm or intermediate or final training output; and/or performance KPI, such as throughput, latency, spectrum efficiency, power consumption, coverage (successful access ratio, retransmission ratio etc.); and/or error rate in relation to certain signal processing components, e.g. Mean Squared Error (MSE), BLER, BER, LLR, etc.

In some embodiments, the measurement request 802 is sent on-demand, e.g. in response to an event. A non-exhaustive list of example events may include: training is required; and/or feedback on the channel quality is required; and/or channel quality (e.g. SINR) is below a threshold; and/or performance KPI (e.g. error rate) is below a threshold; etc. In some embodiments, instead of or in addition to being sent based on an event, the measurement request 802 might be sent at predefined or preconfigured time intervals, e.g. periodically, semi-persistently, etc. The measurement request 802 acts as a trigger for measurement and feedback to occur. In some embodiments, the measurement request 802 may be sent dynamically, e.g. in physical layer control signaling, such as DCI. In some embodiments, the measurement request 802 may be sent in higher-layer signaling, such as in RRC signaling, or in a MAC CE.

As discussed above, different devices may need to perform measurements at different intervals, e.g. depending upon whether the air interface is AI-enabled, and if it is AI-enabled, depending upon the specific AI implementation. The measurement request 802 may therefore be sent at different times, as needed, for different UEs, depending upon the measurement/feedback needs for each UE. As also discussed above, different content may need to be fed back for different UEs, depending upon the air interface implementation. Therefore, in some embodiments, the measurement request 802 includes an indication of the content the UE is to transmit to in the feedback 804.

FIG. 22 illustrates an example measurement request carrying an indication 806 of the content that is to be transmitted back to the base station. In some embodiments, the indication 806 might be an explicit indication of what needs to be fed back, e.g. a bit pattern that indicates "feedback CSI". In some embodiments, the indication 806 might be an implicit indication of what needs to be fed back. For example, the measurement request 802 may indicate a particular one of a plurality of formats for feedback, where each one of the formats is associated with transmitting back respective particular content, and the association is predefined or preconfigured prior to transmitting the measurement request 802. As another example, the indication 806 may indicate a particular one of a plurality of operating modes, where each one of the operating modes is associated with transmitting back respective particular content, and the association is predefined or preconfigured prior to transmitting the measurement request 802. For example, if the indication 806 is a bit pattern that indicates "AI mode 2 training", then the UE knows that it is to feedback particular content (e.g. output from an AI algorithm) to the base station.

In addition to indication 806, or instead of indication 806, the measurement request 802 may include information 808 related to the signal(s) to be measured, e.g. scheduling and/or configuration information for the one or more signals that is/are to be transmitted by the network and measured by the UE. For example, the information 808 might include an indication of the time-frequency location of a reference signal, possibly one or more characteristics or properties of the reference signal (e.g. the format or identity of the reference signal), etc.

The measurement request 802 might also or instead include a configuration 810 relating to transmission of the content that is derived based on the measurement. For example, the configuration 810 may be a configuration of a feedback channel. In some embodiments, the configuration 810 might include any one, some, or all of the following: a time location at which the content is to be transmitted; a frequency location at which the content is to be transmitted; a format of the content; a size of the content; a modulation scheme for the content; a coding scheme for the content; a beam direction for transmitting the content; etc.

In some embodiments, the measurement request 802 is a one-shot measurement request, e.g. the measurement request 802 instructs the UE to only perform a measurement once (e.g. based on a single reference signal transmitted by the network) and/or the UE is configured to send only a single transmission of feedback information associated with or derived from the measurement. If the measurement request 802 is a one-shot measurement request, the information in the measurement request may include:

(1) An indication of a time-frequency location at which the reference signal will be transmitted in the downlink channel, e.g. an indication that the reference signal will start at (and/or be within) resource block (RB) #3. This information may be part of information 808.

and/or (2) An indication of feedback timing for when the content derived using the reference signal is to be fed back in the uplink, e.g. 1 ms after receiving the reference signal. In some embodiments, the feedback timing may be an absolute time or relative time, e.g. a slot indicator, a time offset from a time domain reference, etc. This information may part of configuration 810. In some implementations, the frequency location of where to send the content may also or instead need to be indicated, e.g. if the UE does not know in advance the frequency location of where to send the feedback in the uplink channel.

In some embodiments, the measurement request 802 is a multiple measurement request, e.g. the measurement request configures the UE to perform multiple measurements at different times (e.g. based on a series of reference signals transmitted by the network) and/or the measurement request configures the UE to transmit measurement feedback multiple times. If the measurement request 802 is a multiple measurement request, the information in the measurement request may include:

(1) An indication of the configuration of resources at which a series of reference signals are to be transmitted in the downlink, e.g. first reference signal transmitted at RB #2, and subsequent reference signal sent every 1 ms thereafter for 10 ms. This information may be part of information 808.

and/or (2) An indication of feedback channel resources to use to send the feedback, e.g. starting and finishing time for the feedback and/or feedback interval, e.g. start feedback 0.5 ms after receiving first reference signal and feedback every 1 ms thereafter for 10 times. This information may part of configuration 810.

In some embodiments, there may be different predefined or preconfigured formats for feeding back the content, e.g. a first feedback format 1 corresponding to a one-shot measurement feedback and a second feedback format 2 corresponding to a multiple measurement feedback. In some embodiments, some or all of information 808 and/or 810 may be indicated implicitly, e.g. by indicating a particular format that maps to a known configuration. In some embodiments, the format may be indicated in content indication 806, in which case it might be that a single indication of a format indicates to the UE one, some, or all of the following: (i) the configuration of the signals to be measured, e.g. their time-frequency location; (ii) which content is to be derived from the measurement and fed back; and/or (iii) the configuration of resources for sending the content, e.g. the time-frequency location at which to feed back the content.

In some embodiments, the measurement request is of a same format regardless of whether the air interface is implemented with or without AI, e.g. to have a unified measurement request format. For example, measurement request 802 includes fields 806, 808, and 810. These fields may be the same format, location, length, etc. for all measurement requests 802, with the contents of the bits being different on a UE-specific basis, e.g. depending upon whether or not AI is implemented in the air interface and the specifics of the implementation. For example, a measurement request of the same format may be sent to a UE implementing a conventional non-AI air interface, and to another UE implementing an AI-enabled air interface, but with the following differences: the measurement request sent to the UE implementing the AI-enabled air interface may be sent less often (post training) and may indicate different content to feedback compared to the UE implementing the conventional non-AI air interface. The feedback channels may be configured differently for each of the two UEs, but this may be done by way of different indications in the measurement request of unified format.

In some embodiments, the network configures different parameters of the feedback channel, such as the resources for transmitting the feedback. The resources may be or include time-frequency resources in a control channel and/or in a data channel. Some or all of the configuration may be in a measurement request (e.g. in configuration 810), or configured in another message (e.g. preconfigured in higher-layer signaling). In some embodiments, the resources and/or formats of the feedback channel for AI/sensing/positioning or non-AI/non-sensing/non-positioning may be separately configured. In some embodiments, upon the TRP transmitting an indication and/or configuration of a dedicated feedback channel for fallback mode (non-AI air interface operation), the network knows the UE will enter into the fallback mode. In some embodiments, the contents or the number of bits of the feedback depends upon whether AI/sensing/positioning is enabled. For example, with AI/sensing/positioning, a small number of bits or small feedback types/formats may be reported, and a more robust resource may be used for the feedback, e.g. coding with more redundancy.

In some embodiments, the reference signal/pilot settings for measurement may be preconfigured or predefined, e.g. the time-frequency location of a reference signal and/or pilot may be preconfigured or predefined. In some embodiments, the measurement request may include a starting and/or ending time of the measurement, e.g. the measurement request may indicate that a reference signal may be sent from time A to time B, where time A and time B may be absolute times and/or relative times (e.g. slot number). In some embodiments, the measurement request may include a starting and/or ending time of when feedback is to be transmitted, e.g. the measurement request may indicate that the feedback is to be transmitted from time C to time D, where time C and time D may be absolute times and/or relative times (e.g. slot number). Time C and time D might or might not overlap with time A and/or time B.

In some embodiments, when a measurement is to occur, the air interface falls back to a conventional non-AI air interface, e.g. for transmission of the measurement request and/or for transmission of the reference signal(s) and/or for transmission of the feedback.

Although the embodiments above assume a signal (e.g. a reference signal) is transmitted that is measured and used to derive content to be fed back, in other embodiments it might be the case that a signal for measurement is not sent, e.g. if content for feedback is derived from channel sensing.

The use of measurement requests and a configurable feedback channel may allow for the support of different formats, configurations, and contents (e.g. feedback payloads) for the measurement and the feedback. Measurement and feedback for a UE implementing an air interface that is not AI-enabled may be different from measurement and feedback for another UE implementing an AI-enabled air interface, and both may be accommodated. For example, the non-AI enabled air interface may utilize measurement requests that configure multiple measurements, whereas the AI-enabled air interface may utilize one-shot measurement requests.

Example Methods

Figure 23:
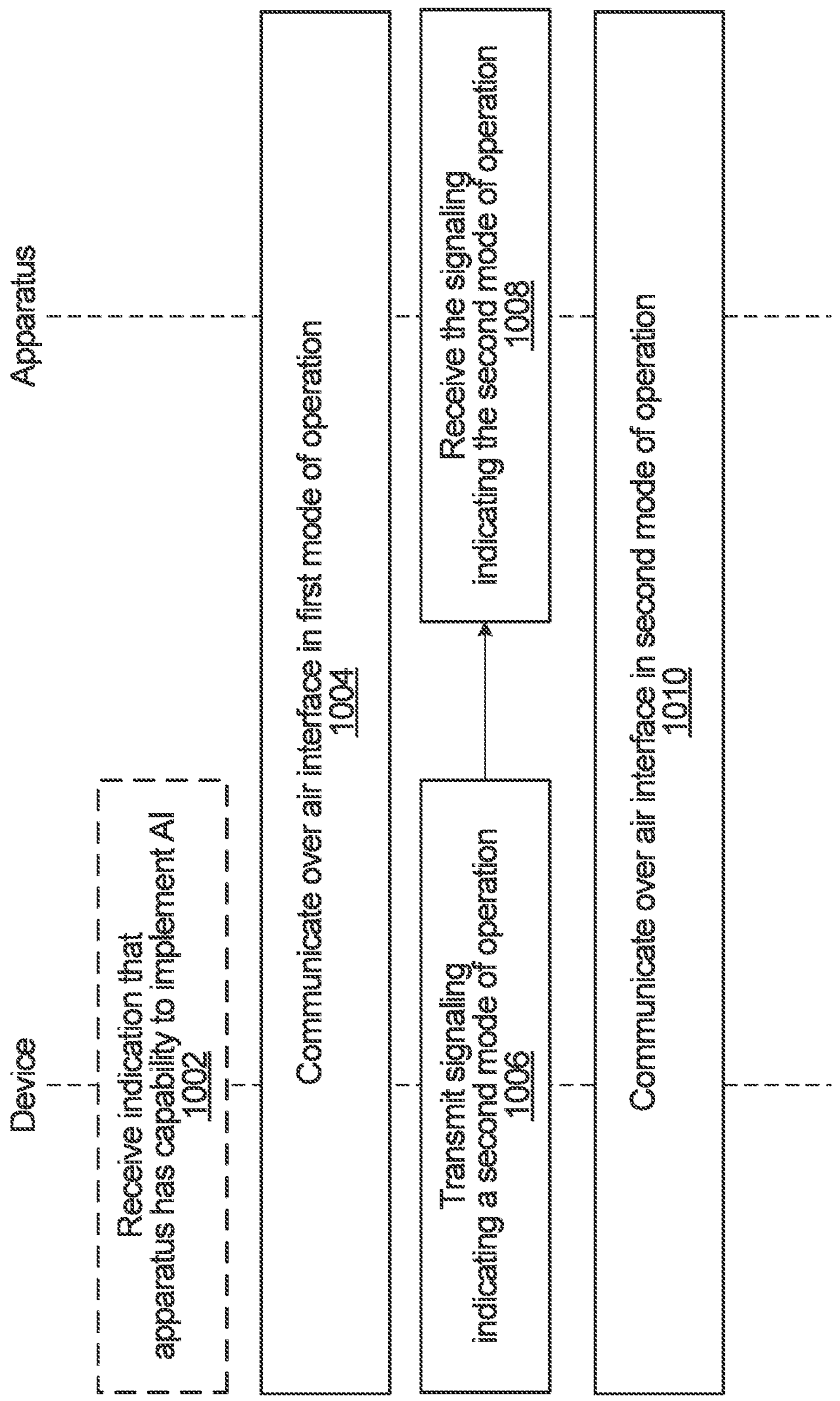
FIGS. 23 and 24 illustrate methods performed by an apparatus and a device, according to various embodiments.

FIG. 23 illustrates a method performed by an apparatus and a device, according to one embodiment. The apparatus may be an ED 110, e.g. a UE, although not necessarily. The device may be a network device, e.g. a TRP or network device 352, although not necessarily.

Optionally, at step 1002, the device receives, e.g. from the apparatus, an indication that the apparatus has a capability to implement AI in relation to an air interface. Step 1002 is optional because in some embodiments the AI capability of the apparatus might already be known in advance of the method. If step 1002 is implemented, the indication may be in a capability report, e.g. like described earlier in relation to step 602 of FIG. 19.

At step 1004, the apparatus and device communicate over an air interface in a first mode of operation. At step 1006, the device transmits, to the apparatus, signaling indicating a second mode of operation that is different from the first mode of operation. At step 1008, the apparatus receives the signaling indicating the second mode of operation. At step 1010, the apparatus and device subsequently communicate over the air interface in the second mode of operation.

In one example, the first mode of operation is implemented using AI and the second mode of operation is not implemented using AI. In another example, the first mode of operation is not implemented using AI and the second mode of operation is implemented using AI. In either case, in the method of FIG. 23 there is a switch between a mode having AI implementation and a mode not having AI implementation. In another example, the first and second modes both implement AI, but possibly different levels of AI implementation (e.g. one mode might be AI mode 1 described earlier, and the other mode might be AI mode 2 described earlier).

By performing the method of FIG. 23, the device (e.g. network device) has the ability to control the switching of modes of operation for the air interface, possibly on a UE-specific basis. More flexibility is thereby provided. For example, depending upon the scenario encountered for an apparatus, that apparatus may be configured to implement AI, possibly implement different types of AI, and fall back to a non-AI conventional mode in relation to communicating over an air interface. Specific example scenarios are discussed above in relation to FIGS. 19 and 20. Any of the examples explained in relation to FIGS. 19 and 20 may be incorporated into the method of FIG. 23.

In some embodiments, the apparatus is configured to operate in the first mode based on the apparatus's AI capability and/or based on receiving an indication of the first mode.

In some embodiments, the signaling indicating the second mode and/or signaling indicating the first mode comprises at least one of: one stage DCI; two stage DCI; RRC signaling; or a MAC CE.

Some embodiments are now set forth from the perspective of the apparatus.

In some embodiments, the method of FIG. 23 may include receiving first stage DCI, decoding the first stage DCI to obtain scheduling information for second stage DCI, and receiving the second stage DCI based on the scheduling information. As described earlier, by having two stage DCI, it may allow for flexibility in the size, content and/or format of the control information transmitted, e.g. by having the flexibility in the second stage DCI, thereby accommodating the different types, contents, and sizes of control information that may need to be transmitted for different AI and non-AI implementations.

Examples of two stage DCI are described earlier, e.g. in relation to FIG. 21, and any of the examples described earlier may be implemented in relation to FIG. 23. For example, in some embodiments, the second stage DCI may carry control information relating to the first mode of operation or the second mode of operation. In some embodiments, the first stage DCI and/or the second stage DCI may include an indication of whether the second stage DCI carries control information relating to the first mode of operation or the second mode of operation.

In some embodiments, prior to receiving the signaling in step 1008, the method of FIG. 23 includes transmitting a message requesting a mode of operation different from the first mode, and receiving the signaling is in response to the message. In this way, the apparatus may initiate a mode change, rather than having to rely on the device, which may provide more flexibility. On the other hand, in some embodiments, the transmission of the signaling is triggered by the device (e.g. a network device) without an explicit message from the apparatus requesting a mode of operation different from the first mode.

In some embodiments, transmission of the signaling in step 1006 is in response to at least one of: entering or leaving a training or retraining mode; power consumption falling within a particular range; network load falling within a particular range; a key performance indicator (KPI) falling within a particular range; channel quality falling within a particular range; or a change in service and/or traffic type for the apparatus.

In some embodiments, the method of FIG. 23 may include the apparatus receiving additional signaling indicating a third mode of operation, where the third mode of operation is implemented using AI. In response to receiving the additional signaling, the apparatus communicates over the air interface in the third mode of operation. In some embodiments, the apparatus performs learning in the first mode or second mode, but not in the third mode. In other embodiments, the apparatus performs learning in the third mode and not in the first mode or second mode.

In some embodiments, at least one air interface component is implemented using AI in the first mode of operation, and the at least one air interface component is not implemented using AI in the second mode of operation. In other embodiments, at least one air interface component is implemented using AI in the second mode of operation, and the at least one air interface component is not implemented using AI in the first mode of operation. In any case, in some embodiments, the at least one air interface component includes a physical layer component and/or a MAC layer component.

Some embodiments are now set forth from the perspective of the device.

In some embodiments, the apparatus is configured, by the device, to operate in the first mode or the second mode based on the apparatus's AI capability.

In some embodiments, the signaling indicating the second mode and/or signaling indicating the first mode includes at least one of: one stage DCI; two stage DCI; RRC signaling; ora MAC CE.

In some embodiments, the method of FIG. 23 may include the device transmitting first stage DCI that carries scheduling information for second stage DCI, and transmitting the second stage DCI based on the scheduling information. Examples of two stage DCI are described earlier, e.g. in relation to FIG. 21, and any of the examples described earlier may be implemented in relation to FIG. 23. For example, in some embodiments, the second stage DCI carries control information relating to the first mode of operation or the second mode of operation. In some embodiments, the first stage DCI and/or the second stage DCI includes an indication of whether the second stage DCI carries control information relating to the first mode of operation or the second mode of operation.

In some embodiments, prior to transmitting the signaling in step 1006, the method of FIG. 23 includes receiving a message from the apparatus, the message requesting a mode of operation different from the first mode. Transmitting the signaling is then in response to the message. In other embodiments, transmission of the signaling in step 1006 is triggered without an explicit message from the apparatus requesting a mode of operation different from the first mode.

In some embodiments, transmission of the signaling in step 1006 is in response to at least one of: entering or leaving a training or retraining mode; power consumption falling within a particular range; network load falling within a particular range; a key performance indicator (KPI) falling within a particular range; channel quality falling within a particular range; or a change in service and/or traffic type for the apparatus.

In some embodiments, the method of FIG. 23 includes: the device transmitting additional signaling indicating a third mode of operation, where the third mode of operation is also implemented using AI; and subsequent to transmitting the additional signaling, communicating over the air interface in the third mode of operation. In some embodiments, the apparatus is to perform learning in the second mode or first mode and not the third mode. In other embodiments, the apparatus is to perform learning in the third mode and not in the first mode or the second mode.

In some embodiments, at least one air interface component is implemented using AI in the first mode of operation, and the at least one air interface component is not implemented using AI in the second mode of operation. In other embodiments, the at least one air interface component is implemented using AI in the second mode of operation, and the at least one air interface component is not implemented using AI in the first mode of operation. In any case, in some embodiments, the at least one air interface component includes a physical layer component and/or a MAC layer component.

Figure 24:
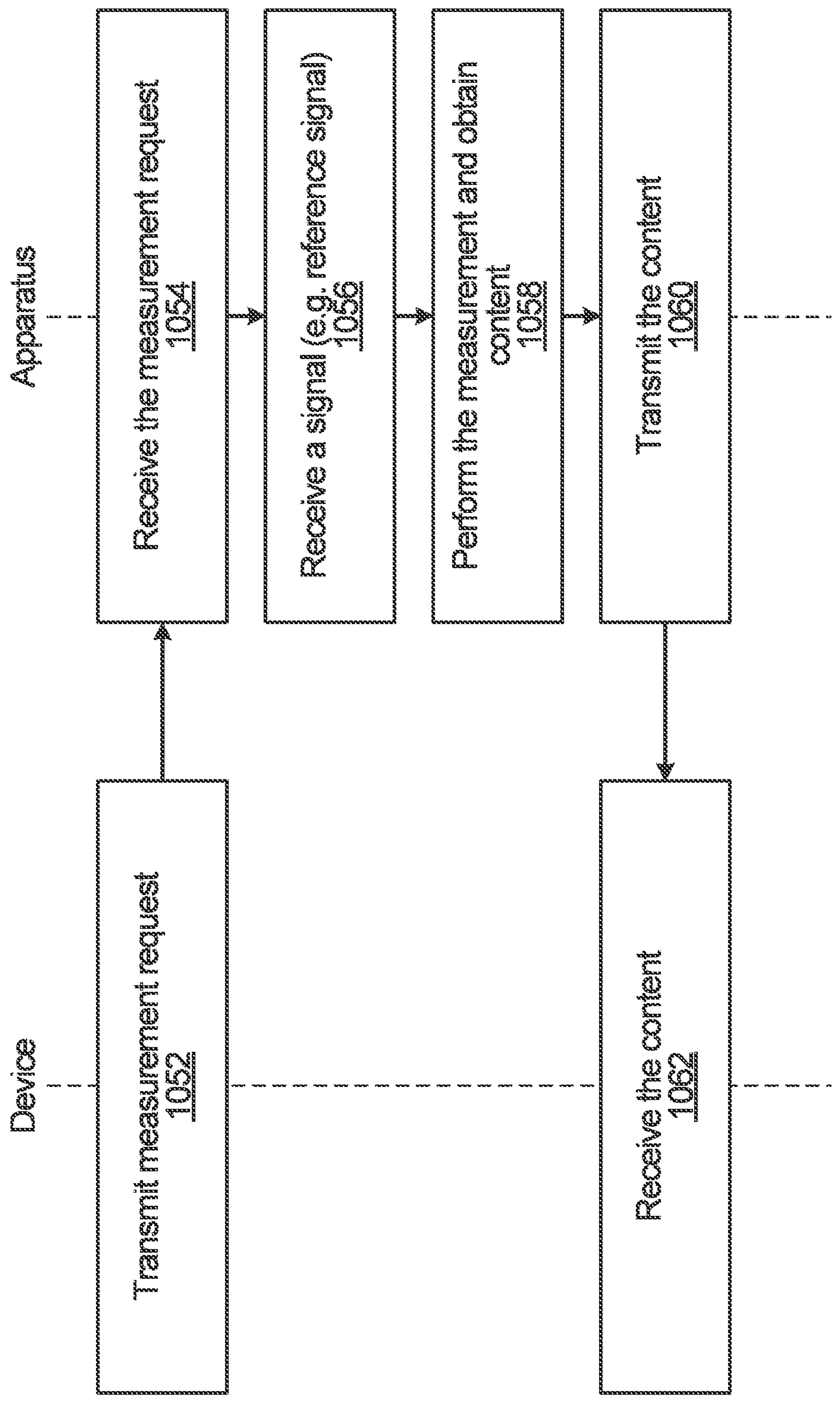

FIG. 24 illustrates a method performed by an apparatus and a device, according to another embodiment. The apparatus may be an ED 110, e.g. a UE, although not necessarily. The device may be a network device, e.g. a TRP or network device 352, although not necessarily.

At step 1052, the device transmits a measurement request to the apparatus. The measurement request includes an indication of content to be transmitted by the apparatus. The content is to be obtained from a measurement performed by the apparatus.

At step 1054, the apparatus receives the measurement request. At step 1056, the apparatus receives a signal, e.g. from the device. The signal may be, for example, a reference signal. At step 1058, the apparatus performs the measurement using the signal and obtains the content based on the measurement.

At step 1060, the apparatus transmits the content to the device. At step 1062, the device receives the content from the apparatus.

By performing the method of FIG. 24, measurement may be performed on demand, with different apparatuses (e.g. different UEs) possibly being instructed to perform measurements at different times or different intervals, and possibly transmitting back different content. Different modes of operation, including a non-AI mode and different AI implementations may be accommodated. For example, measurement and feedback for a UE implementing an air interface that is not AI-enabled may be different from measurement and feedback for another UE implementing an AI-enabled air interface, and both may be accommodated via a single unified mechanism.

In some embodiments, the content is different depending upon whether or not the apparatus communicates over an air interface that is implemented using AI. For example, as discussed earlier, an AI-enabled air interface may require different bits of information fed back compared to an air interface operating in a conventional non-AI manner. The AI implementation may possibly require fewer bits to be fed back and/or feedback less often compared to an air interface operating in a conventional non-AI manner. Content of varying sizes and types may be accommodated.

In some embodiments, the measurement request is of a same format regardless of whether the air interface is implemented with or without AI. An example is described in relation to FIG. 22. This may provide a unified mechanism for measurement and feedback for varying AI and non-AI implementations.

More generally, many different examples are explained earlier, e.g. in relation to FIG. 22, and any of those examples may be incorporated into the method of FIG. 24.

For example, in some embodiments, the measurement request indicates the content by indicating one of a plurality of modes. The plurality of modes may include: (i) a first mode for communicating over an air interface that is implemented using AI, and (ii) a second mode for communicating over an air interface that is not implemented using AI. An example of indicating content by indicating one of a plurality of modes is "101—AI mode 2 training" in FIG. 22.

In some embodiments, the measurement request indicates the content by instead or additionally indicating one of a plurality of formats for transmitting feedback. The plurality of formats for transmitting feedback may include: (i) a first format for communicating feedback relating to an air interface that is implemented using AI, and (ii) a second format for communicating feedback relating to an air interface that is not implemented using AI. An example of indicating content by indicating one of a plurality of formats is "011—format 1" in FIG. 22.

In some embodiments, the measurement request may indicate at least one of: a time location at which the content is to be transmitted; a frequency location at which the content is to be transmitted; a format of the content; a size of the content; a modulation scheme for the content; a coding scheme for the content; or a beam direction for transmitting the content. For example, such information may be included as configuration 810 of FIG. 22. By indicating such information, a feedback channel for transmitting the content may be flexibly configured for the apparatus.

In some embodiments, the transmission of the measurement request is in response to at least one of: channel quality dropping below a threshold; a KPI falling within a particular range; or training occurring or needing to occur in relation to at least one air interface component implemented using AI.

In some embodiments, the measurement request may include: (i) an indication of a time-frequency location at which the signal is to be transmitted to the apparatus; and/or (ii) a configuration of a feedback channel for transmitting the content. In some such embodiments, the measurement request may indicate a plurality of different time-frequency locations, each of which for transmission of a respective different signal of a plurality of signals. The configuration of the feedback channel may include an indication of at least a plurality of different time locations, each of which for transmission of respective content derived from a corresponding different one of the signals. Such information may be in fields 808 and/or 810 of the example of the measurement request in FIG. 22.

In some embodiments, the measurement request may be transmitted in at least one of: DCI, RRC signaling, or a MAC CE.

Examples of an apparatus (e.g. ED or UE) and a device (e.g. TRP or network device) to perform the various methods described herein are also disclosed.

The apparatus may include a memory to store processor-executable instructions, and a processor to execute the processor-executable instructions. When the processor executes the processor-executable instructions, the processor may be caused to perform the method steps of the apparatus as described herein, e.g. in relation to FIGS. 23 and/or 24. As one example, the processor may receive signaling indicating a mode of operation (e.g. receive the signaling at the input of the processor), and cause the apparatus to communicate over the air interface in the indicated mode of operation (e.g. the first or second mode). The processor may cause the apparatus to communicate over the air interface in a mode of operation by implementing operations consistent with that mode of operation, e.g. performing necessary measurements and generating content from those measurements, as configured for the mode of operation, implementing the air interface components (possibly using AI), preparing uplink transmissions and processing downlink transmissions, e.g. encoding, decoding, etc., and configuring and/or instructing transmission/reception on an RF chain. In another example, operations of the processor may include receiving (e.g. at the input of the processor) a measurement request, decoding the measurement request to obtain the information in the measurement request, subsequently receiving a signal (e.g. a reference signal) possibly in accordance with the information in the measurement request, performing the measurement using the signal, obtaining content based on the measurement, and causing the apparatus to transmit the content, e.g. by preparing the transmission (e.g. encoding the content, etc.), implementing the air interface components (possibly using AI), and/or instructing transmission on the RF chain.

The device may include a memory to store processor-executable instructions, and a processor to execute the processor-executable instructions. When the processor executes the processor-executable instructions, the processor may be caused perform the method steps of the device as described above, e.g. in relation to FIGS. 23 and/or 24. As an example, the processor may receive (e.g. at the input of the processor) an indication that an apparatus has a capability to implement AI in relation to an air interface. The processor may cause the device to communicate over the air interface in a mode of operation by implementing operations consistent with that mode of operation, e.g. implementing the air interface components (possibly using AI), configuring an air interface component and/or sending signaling based on information fed back from the apparatus in that mode of operation, processing uplink transmissions and preparing downlink transmissions, e.g. encoding, decoding, etc., and configuring and/or instructing transmission/reception on an RF chain. The processor may output signaling for transmission to the apparatus, where the signaling indicates a different mode of operation (e.g. switching to a second mode of operation). The processor may cause and/or instruct transmission of that signaling, e.g. prepare the transmission by encoding, etc., instruct the RF chain to send the transmission, etc. In another example, the processor may output a measurement request for transmission to the apparatus. The processor may cause and/or instruct transmission of that measurement request, e.g. prepare the transmission by encoding, etc., instruct the RF chain to send the transmission, etc. The processor may receive (e.g. at the input of the processor) the content from the apparatus. The content may be processed by the processor, e.g. decoded to obtain the information of the content.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. A method performed by an apparatus, the method comprising:

communicating over an air interface in a first mode of operation, wherein, in the first mode of operation, at least one air interface component in a physical layer and/or in a medium access control (MAC) layer is implemented using artificial intelligence (AI);

receiving signaling indicating a second mode of operation different from the first mode of operation, wherein in the second mode of operation the at least one air interface component in the physical layer and/or in the MAC layer is not implemented using AI; and in response to receiving the signaling, communicating over the air interface in the second mode of operation.

2. The method of claim 1, wherein the apparatus is configured to operate in the first mode based on the apparatus's AI capability and/or based on receiving an indication of the first mode.

3. The method of claim 1, wherein the signaling indicating the second mode and/or signaling indicating the first mode comprises at least one of: one stage downlink control information (DCI); two stage DCI; radio resource control (RRC) signaling; or a medium access control (MAC) control element (CE).

4. The method of claim 1, comprising:

receiving first stage DCI;

decoding the first stage DCI to obtain scheduling information for second stage DCI; and receiving the second stage DCI based on the scheduling information; wherein the second stage DCI carries control information relating to the first mode of operation or the second mode of operation.

5. The method of claim 4, wherein the first stage DCI or the second stage DCI includes an indication of whether the second stage DCI carries control information relating to the first mode of operation or the second mode of operation.

6. The method of claim 1, wherein prior to receiving the signaling, the method comprises transmitting a message requesting a mode of operation different from the first mode, and wherein receiving the signaling is in response to the message.

7. The method of claim 1, wherein transmission of the signaling is triggered by a network device without an explicit message from the apparatus requesting a mode of operation different from the first mode.

8. The method of claim 1, wherein transmission of the signaling is in response to at least one of: leaving a training or retraining mode; power consumption falling within a particular range; network load falling within a particular range; a key performance indicator (KPI) falling within a particular range; channel quality falling within a particular range; or a change in service and/or traffic type for the apparatus.

9. The method of claim 1, comprising:

receiving additional signaling indicating a third mode of operation, wherein the third mode of operation is implemented using AI; and in response to receiving the additional signaling, communicating over the air interface in the third mode of operation; wherein the apparatus performs learning in the third mode, and wherein the apparatus does not perform learning in the first mode or the second mode.

10. A method performed by a device, the method comprising:

receiving, from an apparatus, an indication that the apparatus has a capability to implement artificial intelligence (AI) in relation to an air interface;

communicating with the apparatus over the air interface in a first mode of operation, wherein in the first mode of operation at least one air interface component in a physical layer and/or in a medium access control (MAC) layer is implemented using AI;

transmitting, to the apparatus, signaling indicating a second mode of operation different from the first mode of operation, wherein in the second mode of operation the at least one air interface component in the physical layer and/or in the MAC layer is not implemented using AI; and subsequent to transmitting the signaling, communicating with the apparatus over the air interface in the second mode of operation.

11. The method of claim 10, comprising configuring the apparatus to operate in the first mode and the second mode based on the apparatus's AI capability.

12. The method of claim 10, wherein the signaling indicating the second mode and/or signaling indicating the first mode comprises at least one of: one stage downlink control information (DCI); two stage DCI; radio resource control (RRC) signaling; or a medium access control (MAC) control element (CE).

13. The method of claim 10, comprising:

transmitting first stage DCI that carries scheduling information for second stage DCI; and transmitting the second stage DCI based on the scheduling information; wherein the second stage DCI carries control information relating to the first mode of operation or the second mode of operation.

14. The method of claim 13, wherein the first stage DCI or the second stage DCI includes an indication of whether the second stage DCI carries control information relating to the first mode of operation or the second mode of operation.

15. The method of claim 10, wherein prior to transmitting the signaling, the method comprises receiving a message from the apparatus, the message requesting a mode of operation different from the first mode, and wherein transmitting the signaling is in response to the message.

16. The method of claim 10, wherein transmission of the signaling is triggered without an explicit message from the apparatus requesting a mode of operation different from the first mode.

17. An apparatus comprising:

a processor; and a memory storing processor-executable instructions that, when executed, cause the processor to:

cause communication over an air interface in a first mode of operation, wherein in the first mode of operation at least one air interface component in a physical layer and/or in a medium access control (MAC) layer is implemented using artificial intelligence (AI);

receive signaling indicating a second mode of operation different from the first mode of operation, wherein in the second mode of operation the at least one air interface component in the physical layer and/or in the MAC layer is not implemented using AI; and in response to receiving the signaling, cause communication over the air interface in the second mode of operation.

18. A device comprising:

a processor; and a memory storing processor-executable instructions that, when executed, cause the processor to:

receive, from an apparatus, an indication that the apparatus has a capability to implement artificial intelligence (AI) in relation to an air interface;

cause communication with the apparatus over the air interface in a first mode of operation, wherein in the first mode of operation at least one air interface component in a physical layer and/or in a medium access control (MAC) layer is implemented using AI;

output, for transmission to the apparatus, signaling indicating a second mode of operation different from the first mode of operation, wherein in the second mode of operation the at least one air interface component in the physical layer and/or in the MAC layer is not implemented using AI; and subsequent to transmission of the signaling, cause communication with the apparatus over the air interface in the second mode of operation.

19. The method of claim 1, wherein the air interface includes a plurality of components, including the at least one air interface component in the physical layer and/or in the MAC layer, that collectively specify how a wireless transmission is sent and/or received over a wireless channel.

20. The method of claim 10, wherein the air interface includes a plurality of components, including the at least one air interface component in the physical layer and/or in the MAC layer, that collectively specify how a wireless transmission is sent and/or received over a wireless channel.

* * * * *